US011003150B2

United States Patent
Wada et al.

(10) Patent No.: US 11,003,150 B2
(45) Date of Patent: May 11, 2021

(54) SIMULATION METHOD, RECORDING MEDIUM WHEREIN SIMULATION PROGRAM IS STORED, SIMULATION DEVICE, AND SYSTEM

(71) Applicant: OMRON Corporation, Kyoto (JP)

(72) Inventors: Junichi Wada, Kyoto (JP); Taro Iwami, Kyoto (JP); Yumi Tsutsumi, Kyoto (JP)

(73) Assignee: Omron Corporation, Kyoto (JP)

( * ) Notice: Subject to any disclaimer, the term of this patent is extended or adjusted under 35 U.S.C. 154(b) by 1072 days.

(21) Appl. No.: 14/889,595

(22) PCT Filed: Mar. 12, 2014

(86) PCT No.: PCT/JP2014/056532
§ 371 (c)(1),
(2) Date: Nov. 6, 2015

(87) PCT Pub. No.: WO2014/185141
PCT Pub. Date: Nov. 20, 2014

(65) Prior Publication Data
US 2016/0109867 A1 Apr. 21, 2016

(30) Foreign Application Priority Data
May 14, 2013 (JP) .............................. JP2013-102628

(51) Int. Cl.
G05B 17/02 (2006.01)
G05B 23/02 (2006.01)
G05D 23/19 (2006.01)

(52) U.S. Cl.
CPC ......... *G05B 17/02* (2013.01); *G05B 23/0221* (2013.01); *G05D 23/1917* (2013.01)

(58) Field of Classification Search
CPC . G05B 17/02; G05D 23/1917; G05D 23/0221
See application file for complete search history.

(56) References Cited

U.S. PATENT DOCUMENTS 4,064,392 A * 12/1977 Desalu .................... G09B 9/00
376/217
4,387,763 A *  6/1983 Benton .............. G05D 23/1902
165/238

(Continued)

FOREIGN PATENT DOCUMENTS

JP    H01-267021 A    10/1989
JP    2000-058466 A    2/2000

(Continued)

OTHER PUBLICATIONS

Toshiba, Simulation System of a multi-zone Temperature Control System (Translation), 1989, Toshiba Machine Co., pp. 1-7 (Year: 1989).*

(Continued)

*Primary Examiner* — Omar F Fernandez Rivas
*Assistant Examiner* — Bernard E Cothran
(74) *Attorney, Agent, or Firm* — Osha Bergman Watanabe & Burton LLP

(57) ABSTRACT

A simulation method run on a computer simulating the characteristics of a real controlled device including a heating apparatus that changes a heating value in accordance with a first manipulated value, includes creating a controlled-device model representing the real controlled device where a first manipulated value is an input and a process value for the real controlled device is an output, acquiring a first time-related characteristic as input to the controlled-device model, and calculating a second time-related characteristic from the output from the controlled device model with respect to the input of the first time-related characteristic. The controlled-device model includes a heating component corresponding to the heating apparatus for increasing the process value in accordance with the size of a first manipulated value.

15 Claims, 41 Drawing Sheets

(56) References Cited

U.S. PATENT DOCUMENTS

| | | | | |
|---|---|---|---|---|
| 4,455,268 A | * | 6/1984 | Hinrichs | B29C 35/0288 |
| | | | | 264/236 |
| 5,060,890 A | * | 10/1991 | Utterback | B61K 9/06 |
| | | | | 246/169 A |
| 6,493,596 B1 | | 12/2002 | Martin et al. | |
| 6,711,531 B1 | | 3/2004 | Tanaka et al. | |
| 2003/0166317 A1 | | 9/2003 | Blersch et al. | |

FOREIGN PATENT DOCUMENTS

| | | |
|---|---|---|
| JP | 2001-290516 A | 10/2001 |
| JP | 2002-124481 A | 4/2002 |
| JP | 2009-157691 A | 7/2009 |
| JP | 2011-123001 A | 6/2011 |
| WO | 023160 A1 | 1/2002 |

OTHER PUBLICATIONS

Omron, Adjusting Control Parameter in Temperature Control (Translation), 2009, Omron Corporation, pp. 1-6 (Year: 2009).*

Zhu et al., Methods of Analysis and Failure Predictions for Adhesively Bonded Joints of Uniform and Variable Bondline Thickness, May 2005, U.S. Department of Transportation, pp. 1-1-6-4 (Year: 2005).*

International Search Report issued in PCT/JP2014/056532 dated Apr. 15, 2014 (1 page).

Extended European Search Report in counterpart European Application No. 14 797 461.2 dated Jan. 5, 2017 (8 pages).

* cited by examiner

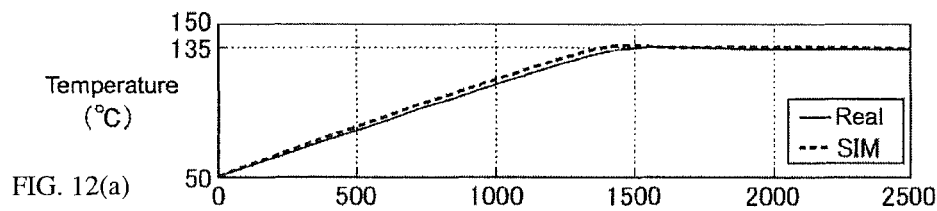
FIG. 12(a)
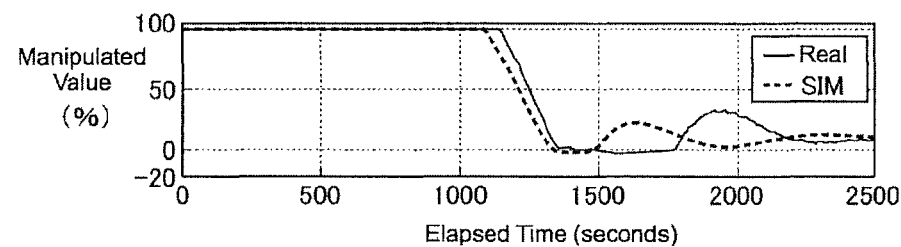
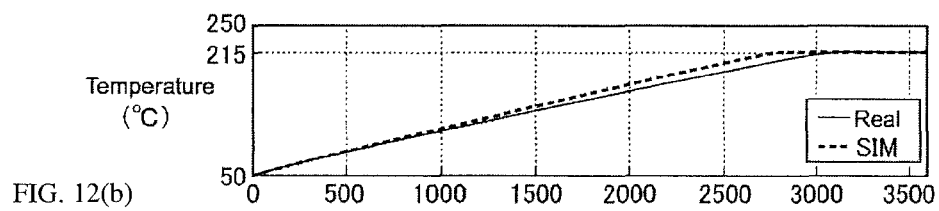
FIG. 12(b)
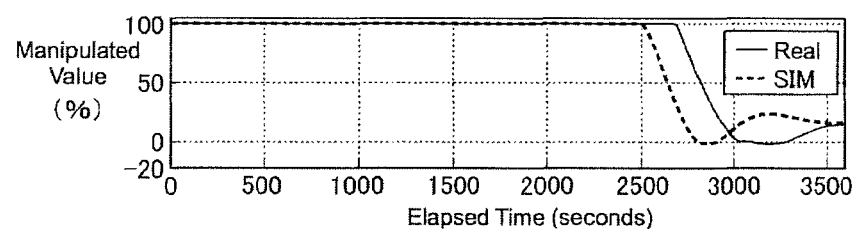
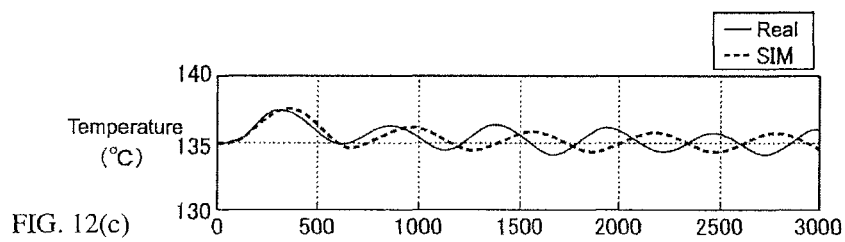
FIG. 12(c)
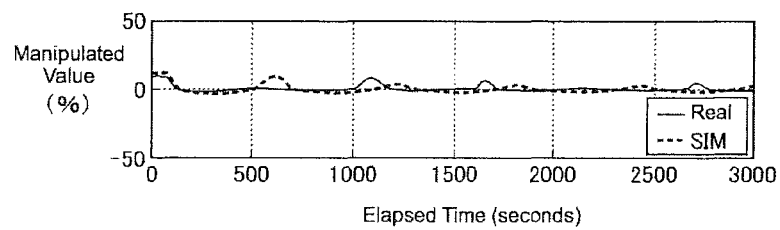

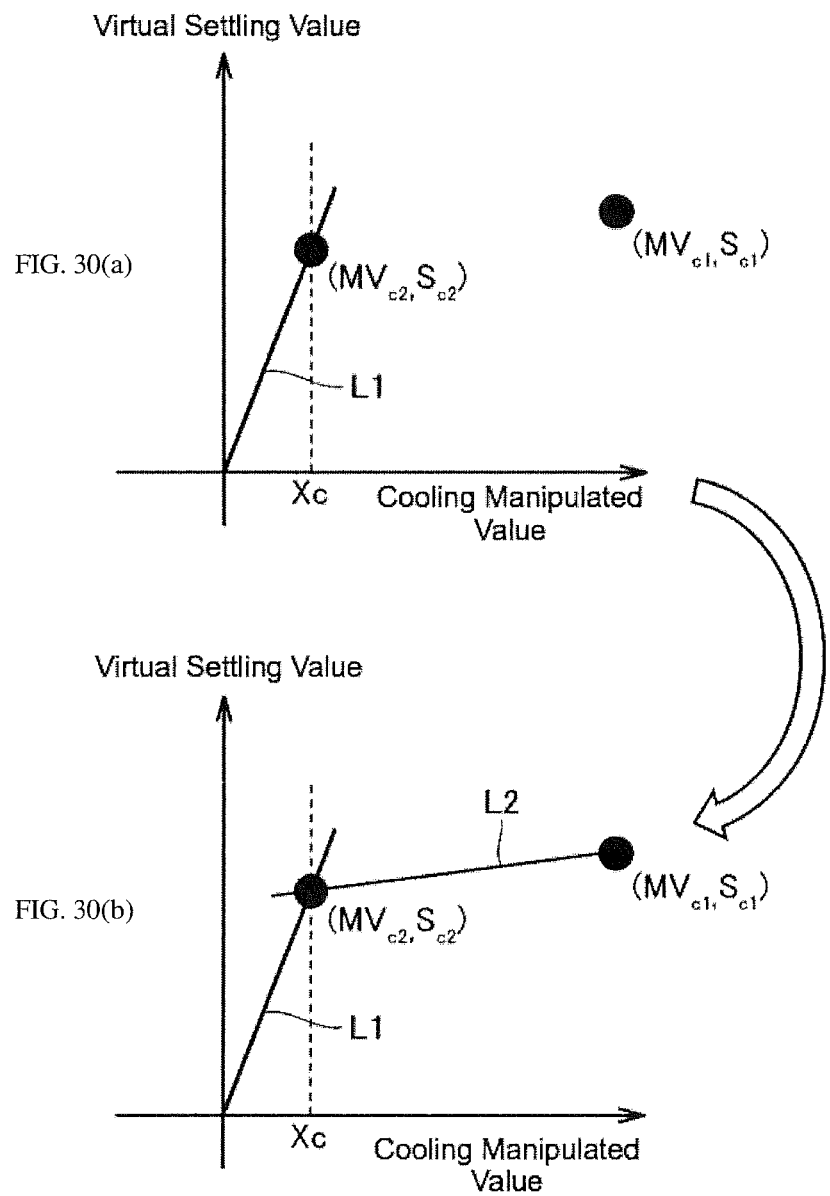

| | Cooling Manipulated Value 100% | Cooling Manipulated Value X% (X ≦ Xc) |
|---|---|---|
| Higher than Temperature Setting Value | R11 | R21 |
| Lower than Temperature Setting Value | R12 | R22 |

| | Kph | 30 |
|---|---|---|
| Parameter Set 1 | Tph | 50 |
| | Dph | 0 |
| | Kpc | 20 |
| | Tpc | 10 |
| | Dpc | 0 |
| | Kph | 30 |
| Parameter Set 2 | Tph | 55 |
| | Dph | 0 |
| | Kpc | 20 |
| | Tpc | 12 |
| | Dpc | 0 |
| | Kph | 30 |
| Parameter Set 3 | Tph | 60 |
| | Dph | 0 |
| | Kpc | 20 |
| | Tpc | 14 |
| | Dpc | 0 |
| | | |

FIG. 41(a)

| Parameter Set | Overshoot | Undershoot |
|---|---|---|
| Parameter Set 1 | 10% | 5% |
| Parameter Set 2 | 9% | 4% |
| Parameter Set 3 | 12% | 7% |
| Parameter Set 4 | 5% | 2% |
| Parameter Set 5 | 15% | 10% |
| Parameter Set 6 | 8% | 5% |
| | | |

Parameter Set 4 → Select as PID Parameter

FIG. 41(b)

SIMULATION METHOD, RECORDING MEDIUM WHEREIN SIMULATION PROGRAM IS STORED, SIMULATION DEVICE, AND SYSTEM

BACKGROUND

Field

The present invention relates to a simulation method, a recording medium whereon a simulation program is stored, a simulation device, and system for a controlled device including a heating component.

Related Art

Various fields have long used simulation techniques for modeling, and used the models created via simulation to evaluate the properties of a device. Simulations using these kinds of models may be used to carry out various kinds of design or testing, or the like without need for the actual system, and therefore, for instance, reduces costs and design time.

A known example of implementing such kinds of simulation models is the technique used to evaluate the characteristics of a control system such as a PID control system, and a controlled device managed by the aforementioned control system. The following are known examples in prior art concerning this kind of simulation model.

Japanese Unexamined Patent Application Publication Nos. 2000-058466 (Patent Document 1) and 2002-124481 (Patent Document 2) disclose for instance a method of simulating temperature control that allows for developing a temperature control algorithm, and learning a method of operating temperature control for a process device, such as an electric, gas, or steam furnace by using a computer to create a simulation model of the temperature system which represents responses equivalent to the temperature changes in an actual furnace, without using the actual furnace. More specifically, the method of simulating temperature control disclosed in Patent Document 1 is configured to vary the parameters in a transfer function over time in correlation with a temperature control process. The method disclosed in Patent Document 1 causes the time constant to change while optimizing the response to the changing temperature. The method of simulating temperature control disclosed in Patent Document 2 also varies the parameters in a transfer function over time in correlation with a temperature control process. The method disclosed in Patent Document 2 calculates the gain at a plurality of different temperatures and switches therebetween when simulating temperature control.

Japanese Unexamined Patent Application Publication No. 2011-123001 (Patent Document 3) discloses an estimated temperature value display device which, especially from the perspective of operator safety, is capable of making up for reduced reliability when a temperature drops from high to low and the temperature measuring reliability deteriorates in the low temperature range (a range wherein the measurement value provided by the temperature measuring means is substantially invalid). That is, the device disclosed in Patent Document 3 uses the data (real measured values) provided when the temperature drops to optimize given parameters as needed.

Despite that, the simulation models disclosed in the above referenced patent documents do not account for non-linear elements. There are in fact real machines that have a non-linear characteristic, but the simulation models disclosed in Patent Documents 1 to 3 cannot sufficiently reproduce this kind of non-linear characteristic.

For instance, the cooling characteristic in a device wherein heat transfer occurs often creates a non-linear characteristic due to the effects from the heat of vaporization, and the like. However, when such a non-linear characteristic is reproduced using linear approximation, a large divergence appears between the real-life cooling characteristic and the approximated characteristic. When using such linear approximation, highly accurate simulation can only occur in the vicinity of a temperature identified in advance.

Additionally, when adopting a black box technique such as a neural network instead of linear approximation, the characteristic cannot be changed, and the simulation cannot be carried out in the required range.

According to one or more embodiments of the present invention, a simulation model and a simulation environment are capable of reproducing, with higher accuracy, a cooling characteristic taking into account the natural thermal radiation that occurs in a real controlled device.

SUMMARY

A simulation method according to one or more embodiments of the present invention is run on a computer simulating the characteristics of a real controlled device including a heating apparatus that changes a heating value in accordance with a first manipulated value. A simulation method includes: a computer creating a controlled-device model representing a real controlled device where a first manipulated value is an input and a process value for the real controlled device is an output; and the computer acquiring a first time-related characteristic as input to the controlled-device model, and calculating a second time-related characteristic from the output from the controlled device model with respect to the input of the first time-related characteristic. The controlled-device model includes a heating component corresponding to the heating apparatus for increasing the process value in accordance with the size of a first manipulated value; and a radiation component corresponding to the natural thermal radiation occurring in the real controlled device for decreasing the process value in accordance with the size of the process value.

The radiation component may determines an amount to decrease the process value in accordance with a difference between the ambient temperature of the real controlled device and the temperature of the real controlled device.

Moreover, the controlled-device model may further include a heat capacity component corresponding to the heat capacity of the real controlled device, the heat capacity component outputting the process value on receiving an output from the heating component and an output from the radiation component.

The heating component may include a first gain representing a relationship between the first manipulated value and the amount used to increase the process value; the radiation component may include a second gain representing a relationship between a difference between the temperature of the real controlled device and the ambient temperature of the real controlled device, and an amount reducing the process value, and an exponent; and the heat capacity component may include a time constant representing the heat capacity of the real controlled device. The simulation method may further include the computer varying the first manipulated value over time to acquire a process-value time variance that occurs in the real controlled device; and the computer determining the first and second gains, the exponent, and the time constant on the basis of the process-value time variance.

The process-value time variance may be acquired by varying the first manipulated value over time in accordance with a limit cycle method or step response method.

Determining the first and second gains, the exponent, and the time constant, may include determining the time constant on the basis of the amount of process-value time variance that occurs during a period the first manipulated value is kept at a fixed value.

Determining the first and second gains, the exponent, and the time constant, may include acquiring a plurality of amounts of process-value time variance during the period the first manipulated value is kept at a fixed value with different forms of the process value; and determining the first gain by estimating a relationship between the plurality of acquired amounts of process-value time variance, and the difference between the ambient temperature of the real controlled device and the temperature of the real controlled device.

Determining the first and second gains, the exponent, and the time constant, may include calculating a normal gain for different temperature setting values on the basis of the difference between the process value for a temperature setting value and the ambient temperature of the real controlled device, and a settling manipulated value for the corresponding temperature setting value; and determining the first gain by estimating a relationship between the normal gains computed for the different temperature setting values, and the difference between the process value for a corresponding temperature setting value in the ambient temperature of the real controlled device.

The heating component may include a first deadtime occurring between the first manipulated value and the amount increasing the process value. Determining the first and second gains, the exponent, and the time constant, may include determining the first deadtime on the basis of a timing at which the first manipulated value changed, and the timing at which the behavior of the process value changed.

The heating component may include a first deadtime occurring between the first manipulated value and the amount increasing the process value. Determining the first and second gains, the exponent, and the time constant may include determining the first deadtime on the basis of the behavior of the process value that occurs after input of the first manipulated value into the real controlled device.

Determining the first and second gains, the exponent, and the time constant may include: calculating a normal gain for different temperature setting values on the basis of the difference between the process value for a temperature setting value and the ambient temperature of the real controlled device, and the first manipulated value; calculating a settling manipulated value for different temperature setting values on the basis of the normal gains calculated for different temperature setting values, and the difference between a corresponding ambient temperature for the real controlled device and the temperature of the real controlled device; calculating a radiation value for different temperature setting values on the basis of the difference between the process value for a temperature setting value and the ambient temperature of the real controlled device, and the corresponding settling manipulated value; and determining the second gain and the exponent by estimating the relationship between the difference between the temperature of the real controlled device and the ambient temperature of the real controlled device, and the radiation value calculated for different temperature setting values.

Determining the first and second gains, the exponent, and the time constant may include: calculating a normal gain for different temperature setting values on the basis of the difference between the process value for a temperature setting value and the ambient temperature of the real controlled device, and the first manipulated value; calculating a settling manipulated value for different temperature setting values on the basis of normal gains calculated for different temperature setting values, and the difference between the process value of a temperature setting value and the ambient temperature surrounding a real controlled device; calculating a radiation value for different temperature setting values on the basis of the difference between the first gain and the normal gains calculated for different temperature setting values, and settling manipulated values calculated for different temperature setting values; and determining the second gain and the exponent by estimating the relationship between the difference between the temperature of the real controlled device and the ambient temperature of the real controlled device, and the thermal radiation calculated for different temperature setting values.

The real controlled device may further include a cooling apparatus that changes a cooling value in accordance with a second manipulated value; and the controlled-device model may further include a cooling component corresponding to the cooling apparatus for reducing the process value in accordance with the size of the second manipulated value.

The cooling component may include a third gain dependent on the second manipulated value. Determining the first and second gains, the exponent, and the time constant may further include: determining a nonlinear point representing the size of a second manipulated value that changes the characteristic of an amount decreasing the process value; determining a first cooling characteristic in a region where the second manipulated value is closer to zero than the nonlinear point and determining a second cooling characteristic in the remaining region; and determining the third gain on the basis of the first and second cooling characteristics.

The first and second cooling characteristics may be defined as the relationship between the second manipulated value and a cooling capacity. Determining the first and second gains, the exponent, and the time constant may further include: determining the first and second cooling characteristics in relation to the process value for a temperature setting value; varying the second manipulated value over time to calculate the slope of a process-value time variance in a process value different from the temperature setting value on the basis of the process-value time variance that occurred in the real controlled device; and shifting the second cooling characteristic for the temperature setting value toward the cooling capacity in accordance with a reference slope which is the slope of the process-value time variance when the process value matches the temperature setting value and the slope of the process-value time variance in a process value different from the temperature setting value to determine a second cooling characteristic for a process value different from the temperature setting value.

Determining the first and second gains, the exponent, and the time constant may include determining the first cooling characteristic for the process value different from the temperature setting value such that the first cooling characteristic connects to the second cooling characteristic for the process value different from the temperature setting value at the nonlinear point.

A simulation method according to one or more embodiments of the invention is run on a computer simulating the characteristics of a real controlled device including a cooling apparatus that changes a cooling value in accordance with a manipulated value. The simulation method includes the computer creating a controlled-device model representing the real controlled device where a manipulated value is an input and a process value for the real controlled device is an output; and the computer acquiring a first time-related characteristic as input to the controlled-device model, and calculating a second time-related characteristic from the output from the controlled device model with respect to the input of the first time-related characteristic. The controlled-device model includes a cooling component that corresponds to a cooling apparatus and decreases the process value in accordance with the size of the manipulated value. The cooling component includes a gain dependent on the manipulated value for representing a relationship between the manipulated value and an amount decreasing the process value. Determining the first and second gains, the exponent, and the time constant may further include: determining the first and second cooling characteristics in relation to the process value for a temperature setting value; varying the second manipulated value over time to calculate the slope of a process-value time variance in a process value different from the temperature setting value on the basis of the process-value time variance that occurred in the real controlled device; and shifting the second cooling characteristic for the temperature setting value toward the cooling capacity in accordance with a reference slope which is the slope of the process-value time variance when the process value matches the temperature setting value and the slope of the process-value time variance in a process value different from the temperature setting value to determine a second cooling characteristic for a process value different from the temperature setting value.

Determining the first and second gains, the exponent, and the time constant may include determining the first cooling characteristic for the process value different from the temperature setting value such that the first cooling characteristic connects to the second cooling characteristic for the process value different from the temperature setting value at the nonlinear point.

A recording medium according to one or more embodiments of the invention stores a simulation program which, through execution on a computer realizes the above mentioned simulation methods.

A simulation device according to one or more embodiments of the present invention executes the above mentioned simulation methods.

A system according to one or more embodiments of the present invention controls a real controlled device including a heating apparatus. The system includes a controller that acquires a process value from the real controlled device, and determines a manipulated value for controlling the heating value of the heating apparatus so that said process value comes to match a setting value; and a simulator connected to the controller for storing a controlled-device model representing the real controlled device; The simulator includes an acquisition unit that sends an instruction to the controller to vary the manipulated value the controller supplies to the real controlled device over time, and to receive a process-value time variance that occurred in the real controlled device from the controller; and a determination unit that determines a parameter used in the controlled-device model on the basis of the process-value time variance acquired from the controller.

The controlled-device model may include a heating component corresponding to the heating apparatus for increasing the process value in accordance with the size of the manipulated value; and a radiation component corresponding to the natural thermal radiation occurring in the real controlled device for decreasing the process value in accordance with the size of the process value.

The simulator may send an instruction to the controller so that the controller varies the manipulated value over time in accordance with a limit cycle technique or a step response technique.

The simulator may include an acquisition unit that acquires a control parameter from the controller used in determining the manipulated value; a creation unit that builds a regulator model representing the behavior of the controller on the basis of the control parameter acquired from the controller; and a simulation unit that coordinates the regulator model and the controlled-device model to simulate a control characteristic of the controller in relation to the real controlled device.

A system according to one or more embodiments of the present invention controls a real controlled device including a heating apparatus. The system includes a controller that acquires a process value from the real controlled device, and determines a manipulated value for controlling the heating value of the heating apparatus so that said process value comes to match a setting value; and a simulator connected to the controller for storing a controlled-device model representing the real controlled device; The simulator may include an evaluation unit for coordinating and running a simulation using a regulator model representing the behavior of the controller and the controlled-device model to evaluate a control characteristic of a regulator model in relation to the real controlled device.

The simulation unit may include a transmission unit that sends the controller a control parameter.

One or more embodiments of the present invention may realize a simulation model and a simulation environment using the same that reproduces, with higher accuracy, a cooling characteristic taking into account the natural thermal radiation that occurs in a real controlled device.

BRIEF DESCRIPTION OF THE DRAWINGS

FIGS. 12A, 12B, and 12C illustrate comparative examples of a simulation result and the response of a real machine.

FIGS. 30A-30B are diagrams outlining a process for determining a cooling characteristic on the basis of the procedure illustrated in FIG. 29.

FIGS. 41A and 41B include diagrams for explaining the process of using a simulation for optimizing PID parameters according to one or more embodiments of the present invention.

DETAILED DESCRIPTION

Figure 1:
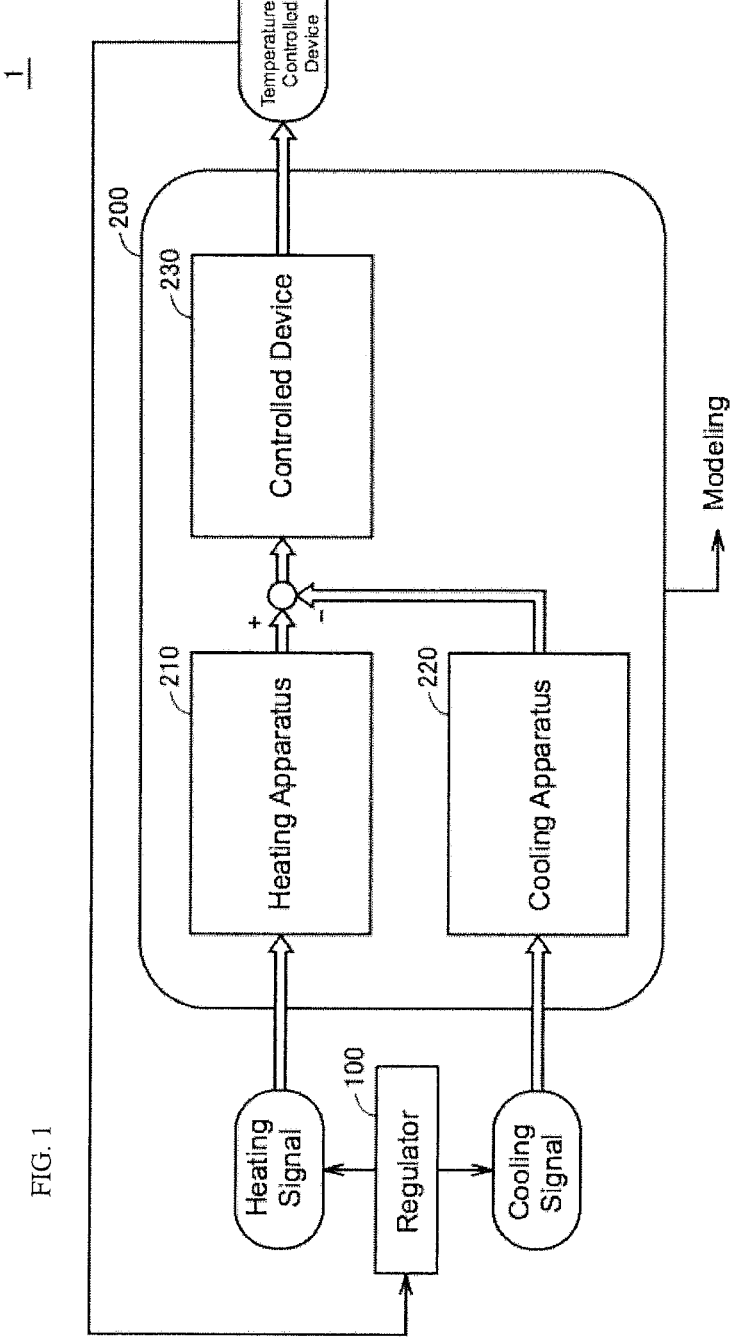
FIG. 1 is a schematic diagram of a feedback control system containing a real machine configuration modeled by a simulation model according to one or more embodiments of the present invention.

Embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The same or corresponding elements within the drawings will be given the same reference numerals and the explanations therefor will not be repeated.

A. DEVICE IN SIMULATION MODEL

Figure 2:
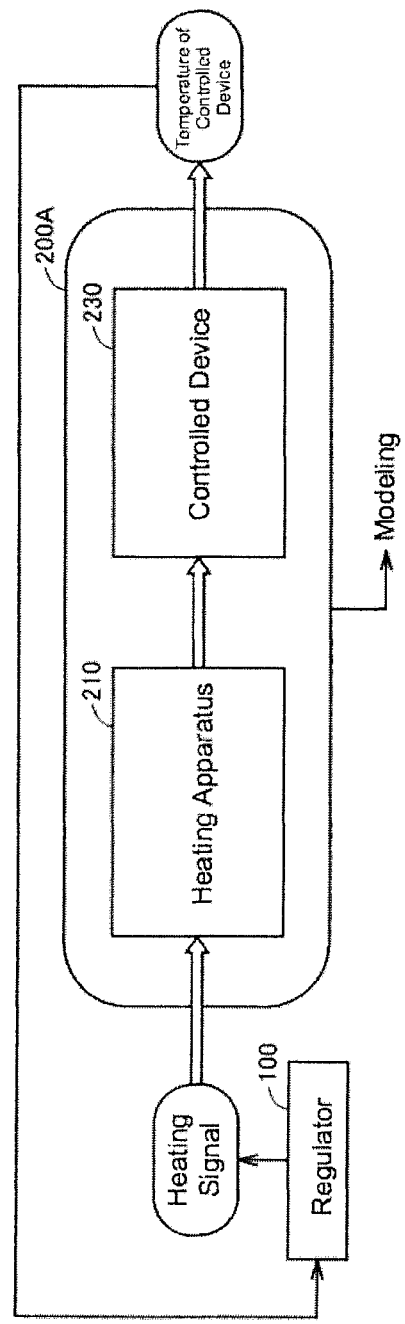
FIG. 2 is a schematic diagram of a feedback control system containing a different real machine configuration modeled by a simulation model according to one or more embodiments of the present invention.

A real machine configuration modeled using the simulation model according to one or more embodiments of the present invention is first described. FIG. 1 is a schematic diagram of a feedback control system 1 containing a real machine configuration modeled by a simulation model according to one or more embodiments of the present invention. FIG. 2 is a schematic diagram of a feedback control system 1A containing a different real machine configuration modeled by a simulation model according to one or more embodiments of the present invention.

The feedback control system 1 in FIG. 1 includes a regulator 100, and a controlled-device process 200. The feedback control system 1A in FIG. 2 includes a regulator 100, and a controlled-device process 200A. The controlled-device processes 200, 200A correspond to real machine configurations that can be modeled in the simulation model. In one or more embodiments of the present invention, a simulation model (also referred to below as a "controlled-device model") is determined representing characteristics of the controlled-device processes 200, 200A on the basis of information related to the controlled-device processes 200, 200A. This kind of controlled-device model allows theoretical simulation of the characteristics of, for example, a feedback control system containing the regulator 100, or the controlled-device process itself.

The controlled-device processes 200, 200A include at least a heating apparatus 210 and a real controlled device 230. The controlled-device process 200 further includes a cooling apparatus 220. However, depending on the process being modeled, the controlled-device processes may contain only the cooling apparatus 220 and exclude the heating apparatus 210. One or more embodiments of the present invention may be adopted even for these kinds of controlled-device processes.

The heating apparatus 210 and the cooling apparatus 220 are actuators, performing heating and cooling respectively in the real controlled device 230. Note that as later described, the real controlled device 230 is subject to natural thermal radiation, and a portion of the heat supplied from the heating apparatus 210 radiates externally from the real controlled device 230 due to natural thermal radiation. The cooling apparatus 220 also robs the real controlled device 230 of heat through a prescribed cooling mechanism.

The regulator 100 determines a first manipulated value (e.g., heating manipulated value) which causes a first change in a control value (i.e., heating), or a second manipulated value (e.g., cooling manipulated value) which causes a second change opposite the first change in the control value for the real controlled device 230 (i.e., cooling) in accordance with a preliminarily established parameter such that a process value (i.e., temperature) acquired from the real controlled device 230 comes to match a target value in the feedback control system 1, 1A. Thus, the real controlled device 230 further includes a cooling apparatus 220 that changes a cooling value in accordance with a second manipulated value.

Heating and cooling do not take place simultaneously in the feedback control system 1. For the temperature of the real controlled device 230 to come to match a preliminarily established target value, the feedback control system 1 selectively either heats the real controlled device 230 using the heating apparatus 210, or cools the real controlled device 230 with the cooling apparatus 220.

The regulator 100 compares the temperature of the real controlled device 230 that is fed back, and the preliminarily established target value and selectively outputs a heating signal or a cooling signal to the heating apparatus 210 or the cooling apparatus 220 respectively. In other words, the regulator 100 controls the heating apparatus 210 and the cooling apparatus 220 to maintain a fixed temperature in the real controlled device 230.

In the description that follows, the term "controlled value" is used to represent control targets in the values attributed to the real controlled device 230, and the term "process value" is used to represent a value acquired by some detector, such as a temperature sensor, provided in the real controlled device 230. Although strictly speaking a "process value" is defined as a value containing the "controlled value" and some kind of error, if the error is ignored the "process value" can be considered a "controlled value" for the real controlled device 230. Therefore, in the description that follows, the terms "process value" and "controlled value" are treated as having the same meaning.

The controlled-device process 200 illustrated in FIG. 1, or the controlled-device process 200A illustrated in FIG. 2 may include any desired controlled-device processes. For instance, the controlled-device processes may be processes that take place in an extrusion molding device, such as controlling the temperature of a start material, or controlling the temperature inside an incubator. Controlling the temperature of a start material within an extrusion molding device is the example provided in one or more embodiments of the present invention. However, the scope of the present invention is not limited to this controlled-device process.

A simulation method run on a computer simulating the characteristics of a real controlled device 230 containing a heating apparatus 210 that changes a heating value in accordance with a first manipulated value (i.e., heating manipulated value), a recording medium whereon a simulation program is stored, and a simulation device are described below as examples in one or more embodiments of the present invention.

B. CONTROLLED DEVICE PROCESS

Figure 3:
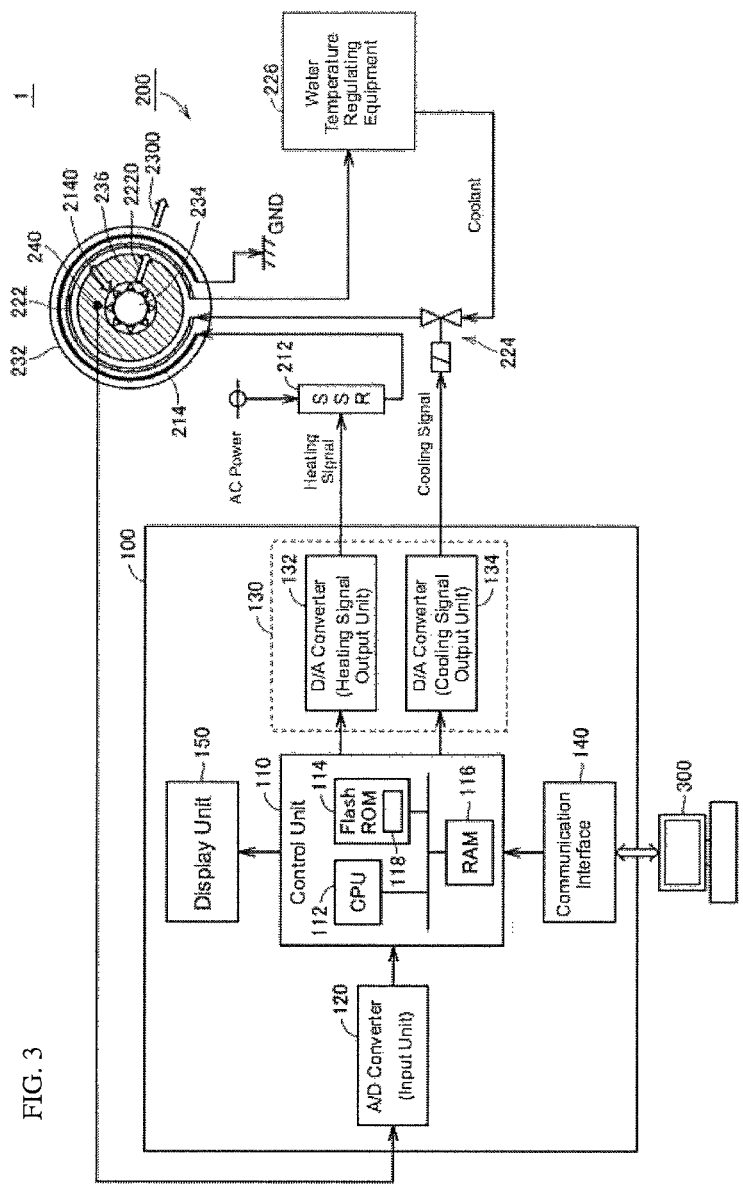
FIG. 3 is a schematic diagram of a system configuration implementing a feedback control system according to one or more embodiments of the present invention.
Figure 4:
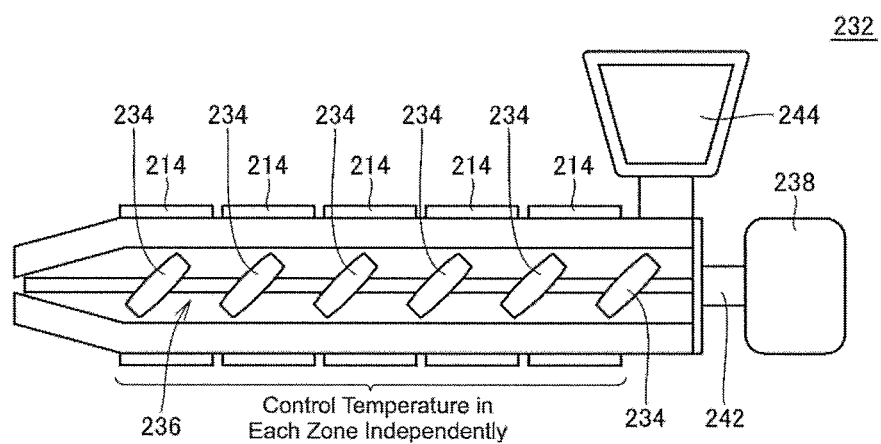
FIG. 4 is a schematic view of the cross-sectional configuration of the extrusion molding device illustrated in FIG. 3.

An example of the controlled-device processes that may be simulated in a simulation model according to one or more embodiments of the present invention is described next. FIG. 3 is a schematic diagram of a system configuration implementing a feedback control system 1 according to one or more embodiments of the present invention. FIG. 4 is a schematic view of the cross-sectional configuration of the extrusion molding device illustrated in FIG. 3.

The controlled-device process 200 illustrated in FIG. 3 includes an extrusion molding device 232, which is one example of the real controlled device 230 (FIG. 1).

Referring to FIG. 3 and FIG. 4, a starting material (e.g., plastic) enters the extrusion molding device 232 via a hopper 244, and with the high temperatures and pressures applied to a mix of materials inside a cylinder 236, the extrusion molding device 232 produces a sheet, a tube, or the like.

On the one hand, a new starting material inserted into the extrusion molding device 232 absorbs the heat therein, and movement of the starting material by the rotation of screws 234 produces heat. Therefore, the heating apparatus 210 and the cooling apparatus 220 are provided to suppress fluctuations in the temperature due to the heat absorbing reactions and the heat producing reactions.

In one or more embodiments of the present invention, the cylinder 236 is segmented into five to ten zones (referred to below as "kneading zones"), with the regulator 100 controlling the temperature in each of the zones. The screws 234 for kneading the starting material, the cylinder 236, a cooling pipe 222, and electric heaters 214 are arranged in that order from the center in the extrusion molding device 232.

The screws 234, provided along the axial center, are connected to a motor 238 via a shaft 242. The motor 238 rotationally drives the screws 234. The rotation of the screws 234 pushes the starting material (e.g., plastic) inserted inside the device. A temperature sensor 240 is provided inside the extrusion molding device 232 for detecting the temperature of the starting material. The temperature sensor may be configured from a thermocouple, or a resistance thermometer (e.g., a platinum-based resistance thermometer). The electric heater 214 and the cooling medium flowing through the cooling pipe 222 are used to bring the temperature (process value) acquired from the temperature sensor 240 arranged near the inner wall (the temperature measuring point) in the cylinder 236 to a fixed value.

As an example, the heating apparatus 210 is a heating element provided inside the extrusion molding device 232. More specifically, the heating apparatus 210 includes a solid state relay (SSR, 212), and the electric heater 214 which is a resistive element. The solid state relay 212 controls the electrical connection and disconnection between an AC power supply and the electric heater 214. More specifically, the heating signal output by the regulator 100 is a PWM signal containing a duty based on the manipulated value. The solid state relay 212 closes or opens the circuit in accordance with the PWM signal from the regulator 100. Electric power based on the proportion of closing and opening of the circuit is then supplied to the electric heater 214. The electric power supplied to the electric heater 214 then becomes the heat that is applied to the start material.

The cooling apparatus 220 includes a cooling pipe 222 arranged on the periphery of the extrusion molding device 232, a magnetic valve 224 that controls the flow of the cooling medium (typically, water or oil) supplied to the cooling pipe 222, and water-temperature regulating device 226 for cooling the cooling medium that has passed through the cooling pipe 222. The magnetic valve adjusts the flow rate of the cooling medium flowing in the cooling pipe 222 to thereby control the cooling capacity. More specifically, the cooling signal output by the regulator 100 to the magnetic valve is a signal containing a voltage or a current with a size based on the manipulated value. The magnetic valve 224 then adjusts the valve position in accordance with the cooling signal from the regulator 100. Adjusting the valve position controls the amount of heat removed from the extrusion molding device 232. Note that when adopting a magnetic valve capable of operating at only two positions (open or closed), the cooling signal that is output may also be a PWM signal having a duty responsive to the manipulated value, similarly to the above described heating signal. The regulator may then manipulate the timing for opening and closing the magnetic valve 224 to control the flow rate of the cooling medium.

C. OVERVIEW OF THE SIMULATION MODEL

A simulation model (i.e., controlled-device model) for the controlled-device process 200 is described next.

As illustrated in FIG. 3, the heat propagating in the extrusion molding device 232 contained in the controlled-device process 200 is typically the heat that propagates from the electric heater 214 (heat from heater, 2140), toward the cooling pipe 222 (heat absorption by the cooling medium, 2220), and from the extrusion molding device 232 (radiating heat, 2300).

Figure 5:
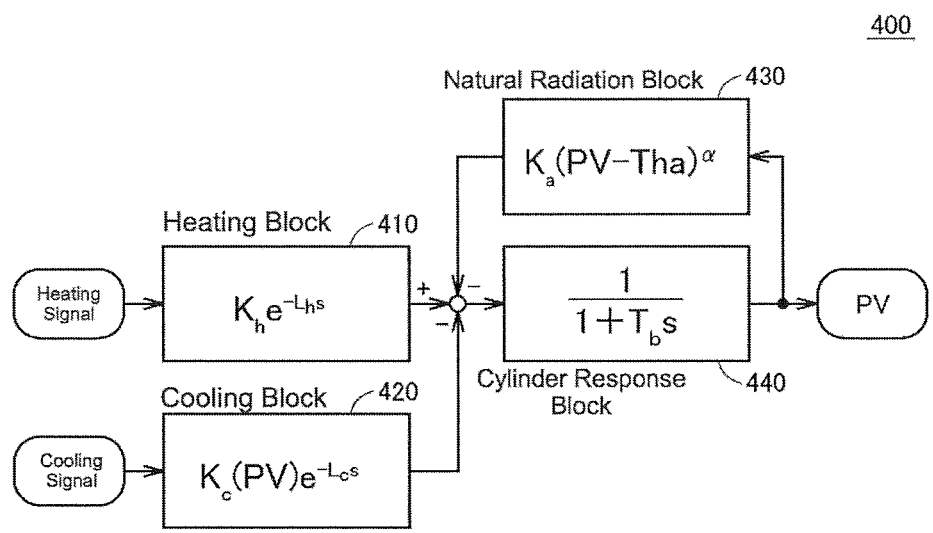
FIG. 5 is a schematic diagram illustrating a simulation model of the controlled-device processes shown in FIG. 3 and FIG. 4.

FIG. 5 is a schematic diagram illustrating a simulation model of controlled-device process 200 shown in FIG. 3 and in FIG. 4. The simulation model illustrated in FIG. 5 is expressed as a transfer function using a Laplace function s. Referring to FIG. 5, a controlled-device model 400, which is a simulation model of the controlled-device process 200, defines the respective heat propagations illustrated in FIG. 3 and the heat response in the cylinder as a heating block 410, a cooling block 420, a natural radiation block 430, and a cylinder response block 440.

The controlled-device model 400 illustrated in FIG. 5 models an arbitrary zone in the kneading zones illustrated in FIG. 4. Building and simulating merely a number of controlled-device models 400 in FIG. 5 equivalent to the number of kneading zones is sufficient for simulating the entire controlled-device process 200.

The heating block 410 in the controlled-device model 400 corresponds to the heating apparatus 210 and is equivalent to the heating component that increases the process value in accordance with the size of the first manipulated value (heating manipulated value). More specifically, the heating block 410 is equivalent to the heating function of the electric heater 214 and is expressed using a normal heating gain (Kh) and a (pure) deadtime (Lh). The normal heating gain signifies a normal heating gain when there is no natural thermal radiation.

The cooling block 420 in the controlled-device model 400 corresponds to the cooling apparatus 220, and is equivalent to the cooling component that decreases the process value in accordance with the size of the second manipulated value (cooling manipulated value). More specifically, the cooling block 420 is expressed using a cooling gain Kc(PV) and a (pure) deadtime (Lc). When water is used as the cooling medium in the sort of feedback control system 1 illustrated in FIG. 3, the cooling characteristic becomes nonlinear due to the effects of the heat of vaporization. Therefore, the cooling gain Kc(PV) is dependent on the temperature (PV) measured from the controlled-device process 200 and changes in accordance therewith. A method for determining the cooling gain Kc(PV) is described later.

The natural radiation block 430 in the controlled-device model 400 corresponds to the natural thermal radiation occurring in the real controlled device 230 and is equivalent to a radiation component that decreases the process value in accordance with the size of the process value. More specifically, a natural radiation value is calculated in accordance with the temperature of the cylinder 236 so that heating value in the natural radiation block 430 reflects the temperature in the cylinder 236. More specifically, the natural radiation block 430 is expressed using a natural radiation gain Ka, a natural radiation exponent α, and the temperature PV.

However, the following may occur when modeling the natural thermal radiation. Namely, although conventional methods can reproduce a radiation characteristic within a limited range close to an identified temperature, because the natural thermal radiation changes due to the ambient temperature, changes in the temperature of the controlled device (the temperature of the cylinder 236) increases the divergence between the model and the actual temperature. Thus, in order to model the natural thermal radiation, the modeling formulas (functions) adopted must output a natural radiation value for each temperature across a broad ranged of temperatures. Thus, adding the natural radiation block 430 as part of a feedback protocol in one or more embodiments of the present invention allows reproduction of a natural radiation value responsive to the temperature of the cylinder 236.

The cylinder block 440 corresponds to the heat capacity of the real controlled device 230, and is equivalent to a heat capacity component that outputs a process value on the basis of the output from the heating component (heating block 410) and the output from the radiation component (natural radiation block 430). More specifically, the cylinder response block 440 is equivalent to the heat capacity of the cylinder 236 and is approximated with a first order delay using a cylinder-response time constant Tb.

In the description that follows, each of the blocks configuring the controlled-device model 400 is described in detail, along with an example of how to determine the required parameters in the controlled-device model 400.

D. DEVICE CONFIGURATION

Before discussing the particulars of the controlled-device model 400 in detail, a device configuration of the feedback control system 1 according to one or more embodiments of the present invention is described.

d1: Regulator 100

Referring again to FIG. 3, the regulator 100 outputs a manipulated value (also written "MV" below) such that a temperature measured from the controlled-device process 200 (i.e., a process value, also written "PV" below) matches a target value (i.e., a setting value, also written "SV" below) entered therein. The manipulated value output from the regulator 100 is a heating signal related to heating or a cooling signal relating to cooling.

The feedback control system 1 containing the regulator 100 may contain a PID control system. In this specification the term "PID control system" signifies a control system containing at least one of the following elements: a proportional component that carries out a proportional operation (P operation); an integral component that carries out an integral operation (I operation); and a derivative component that carries out a derivative operation (D operation). Namely, in this specification a PID control system may, in addition to signifying a control system including any of a proportional element, an integral element, and a differential element, may also signify a control system including a portion of the control elements, such as only a proportional element and an integral element (i.e., a PI control system).

In particular, the regulator 100 includes a control unit 110, an input unit 120 composed of an analog-to-digital (A/D) converter, and output unit 130 composed of two digital-to-analog (D/A) converters, a communication interface 140, and a display unit 150.

The control unit 110 is the primary computer implementing normal PID control functions and auto-tuning functions. The control unit includes a central processing unit (CPU, 112), a Flash Read Only Memory (Flash ROM, 114), which permanently stores a program module 118, and a Random Access Memory (RAM, 116). The CPU 112 runs the program module 118 stored on the Flash ROM 114 to implement the later described processes. At this point, the data required to run the program module 118 that is read (i.e., PV, SV, and the like) are temporarily stored in the RAM 116. Note that a digital signal processor (DSP) suited for digital signal processing may be used in the configuration in place of the CPU 112. The program module 118 may be configured to update itself via various kinds of recording media. Thus, the program module 118 itself may be considered included within the technical scope of the present invention. Furthermore, the entirety of the control unit 110 may be implemented on a Field-Programmable Gate Array (FPGA) or Application Specific Integrated Circuit (ASIC), or the like.

The input unit 120 receives a measurement signal from a temperature sensor (later described) and outputs a signal to the control unit 110 representing the value of the measurement signal. For instance, when the temperature sensor is a thermocouple, the input unit 120 includes a circuit for detecting the thermo-electromotive force generated at the ends of the thermocouple. Alternatively, when the temperature sensor is a resistance thermometer, the input unit 120 includes a circuit for detecting the resistance value generated in the resistance thermometer. Finally, the input unit 120 may include a filter circuit for excluding high frequency components.

The output unit 130 selectively outputs a heating signal or a cooling signal in accordance with the manipulated value calculated by the control unit 110. More specifically, a heating signal output unit 132 includes a digital-to-analog converter and converts a digital signal representing a manipulated value calculated by the control unit 110 into an analog signal and outputs the analog signal as a heating signal. Whereas, a cooling signal output unit 134 includes a digital-to-analog converter and converts a digital signal representing a manipulated value calculated by the control unit 110 into an analog signal and outputs the analog signal as a cooling signal.

The communication interface 140 is connected to the information processing device 300 and is capable of communicating data therewith. Data collected by the regulator 100 and instructions from the information processing device 300 are exchanged via this communication interface 140. The communication interface 140 typically communicates in accordance with a protocol such as Ethernet (registered trademark) or Universal Serial Bus (USB).

The display unit 150 includes a display, an indicator, or the like to notify the user of information indicative of the state of processing and the like in the control unit 110. The display unit 150 may further include a setting unit such as a button or a switch accepting operations from the user. The setting unit outputs the information representing the user's operations received to the control unit 110.

d2: Information Processing Device 300

The information processing device 300 illustrated in FIG. 3 usually builds the controlled-device model 400 illustrated in FIG. 5. More specifically, in accordance with the kind of procedures later described the information processing device 300 determines the parameters in the blocks making up the controlled-device model 400 on the basis of, for example, the information acquired from the regulator 100. The information processing device 300 can also run each kind of simulation using the controlled-device model 400 built. The information processing device 300 does not necessarily require a connection to the regulator 100. However, when connected to the regulator 100, the information processing device 300 can optimize the control parameters (also written as "PID parameters" below) required in the PID control system in the regulator 100 on the basis of the simulation results, and the like.

Figure 6:
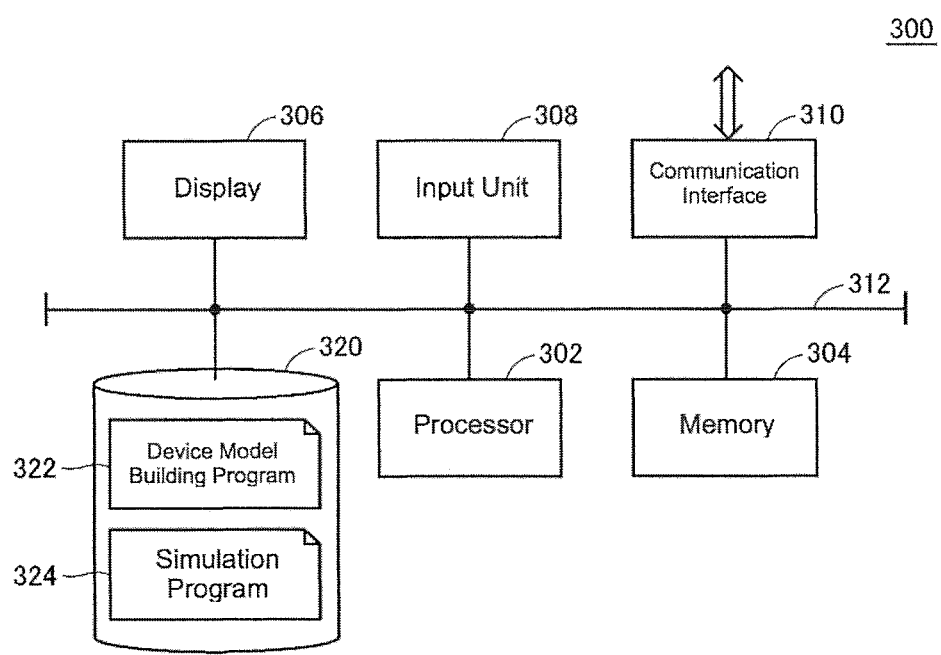
FIG. 6 is a schematic diagram of a hardware configuration of an information processing device 300 constituting the feedback control system according to one or more embodiments of the present invention.

FIG. 6 is a schematic diagram of a hardware configuration of an information processing device 300 constituting the feedback control system 1 according to one or more embodiments of the present invention. Referring to FIG. 6, the information processing device 300 may be structured according to a general-purpose computer architecture, and thus implement the various kinds of processes later described by running the programs preliminarily installed thereon on the processor.

More specifically, the information processing device 300 includes processor 302 such as a central processing unit (CPU) or micro-processing unit (MPU), a memory 304, a display 306, an input device 308, a communication interface 310, and a hard drive 320. Each of these components is configured to communicate data with each other via a bus 312.

The processor 302 is the primary agent that runs the programs stored on the hard drive 320 and the like. That is, the processor 302 runs programs in the information processing device 300 to realized the desired functions.

The memory 304 may be a volatile storage device such as Dynamic Random Access Memory (DRAM), storing, for instance, the various programs read from the hard drive 320, or the work data required for the processor 302 to run a program.

The display 306 receives video signals from the processor 302 and the like indicating computation results, and displays the video signals. In other words the display 306 visually notifies the user of various kinds of information.

The input device 308 is typically a keyboard, a mouse, a touch screen panel or the like which receives instructions or operations from the user and outputs the details thereof to the processor 302.

The communication interface 310 is connected to the regulator 100 and is capable of communicating data therewith. The communication interface collects data from the regulator 100 or provides the regulator 100 with commands. The communication interface 310 typically communicates in accordance with a protocol such as Ethernet (registered trademark) or Universal Serial Bus (USB).

The hard drive 320 typically a non-volatile magnetic storage device which retains programs that are run on the processor 302, such as a controlled-device model building program 322, and a simulation program 324. The device model building program 322, and the simulation program 324, and the like which may be installed on the hard drive 320 may be run while stored on a semiconductor storage medium such as a flash memory, or an optical storage medium such as Digital Versatile Disk Random Access Memory (DVD-RAM). However, a program downloaded from a distribution server or the like may also be installed on the hard drive 320.

When using a computer constructed according the above type of general-purpose computer architecture, an operating system (OS) providing the basic functions of a computer may be installed in addition to an application providing the functions of one or more embodiments of the present invention. In this case, a program according one or more embodiments of the present invention may call the necessary program modules provided as a part of the OS in a prescribed sequence and/or timing.

Additionally a program according to one or more embodiments of the present invention may be built-in as a part of another program. Even in this case, the program itself may run in collaboration with said other program without containing the modules that are available in the other program with which the program is combined. That is, a program according to one or more embodiments of the present invention may be built-in as a part of such kind of other program.

Note that the functions provided by executing the program may be implemented, alternatively, in whole or in part as a dedicated hardware circuit.

E. DETERMINING PARAMETERS (CASE 1): USING A STEP RESPONSE

An example of a procedure for determining parameters in the controlled-device model 400 according to one or more embodiments of the present invention is described next. The step-response based method of parameter determination (Case 1) uses the step response from heating and cooling in the controlled-device process 200 to identify the parameters in the controlled-device model 400. The heating step response is used in the heating block 410, the natural radiation block 430, and the cylinder response block 440; in contrast, the cooling step response is used for the cooling block 420. A computer such as the information processing device 300 acquires a process-value time variance occurring in the real controlled device 230 by varying a first manipulated value (heating manipulated value) over time, and determines a first and a second gain (a normal heating gain Kh, and a natural radiation gain Ka), an exponent (natural radiation exponent α), and a time constant (cylinder-response time constant Tb) on the basis of the process-value time variance. The procedure for identifying the parameters in each block is described below.

e1: Heating Block 410

The heating block 410, i.e., the heating component, includes a first gain (normal heating gain Kh) representing a relationship between a first manipulated value a first manipulated value (heating manipulated value MVh), and an amount increasing a process value. The normal heating gain Kh in the heating block 410 is determined from the normal gains for each temperature setting value in a plurality of temperature setting values. A normal gain $K_{h\_SV}$ for a temperature setting value is calculated according to the following Formula (1).

$$K_{h\_SV} = (SV - Tha)/MV_{h\_SV} \quad (1)$$

where,

SV=temperature setting value (settling temperature, ° C.)

Tha=ambient temperature (° C.)

$MV_{h\_SV}$=settling manipulated value at the temperature setting value SV ($0 \leq MV_{h\_SV} \leq 1$)

Figure 7:
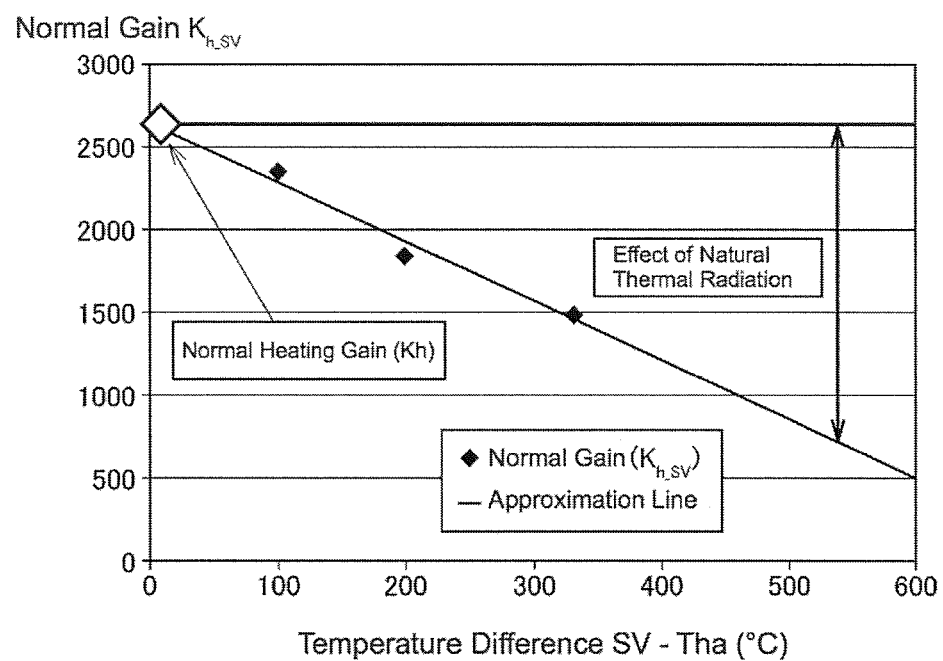
FIG. 7 is a graph illustrating the relationship between a normal gain in the controlled-device process illustrated in FIG. 1, and the temperature difference (difference between a temperature setting value and an ambient temperature).

FIG. 7 is a graph illustrating the relationship between a normal gain $K_{h\_SV}$ in the controlled-device process 200 illustrated in FIG. 1, and the temperature difference (a difference between a temperature setting value SV and the ambient temperature Tha). Referring to FIG. 7, it can be understood that the normal gain $K_{h\_SV}$ decreases as much as the increase in the temperature difference. The decrease in normal heating gain that accompanies an increase in this kind of temperature difference implies that the radiation value due to natural thermal radiation increases. At that point a normal gain while no natural thermal radiation occurs (that is, when the temperature difference is zero) may be calculated from a linear approximation and estimation (extrapolation) of the relationship between the normal gain $K_{h\_SV}$ and the temperature difference. The normal gain calculated may then be taken as the normal heating gain Kh.

On determining parameters in this manner, the effects of natural thermal radiation are expressed as a radiation value. A method of estimating the radiation value is described while explaining the method used to determine the parameters in the natural radiation block 430.

The deadtime Lh in the heating block 410 is determined by calculating the deadtime that appears in the step response during heating, and using this calculated deadtime as the deadtime Lh.

In this manner, determining the parameters in the heating block 410 includes calculating the normal gain for each temperature setting value on the basis of a difference between the process value for a temperature setting value and the ambient temperature of the real controlled device, and the settling manipulated value for the corresponding temperature setting value; and determining a first manipulated value (normal heating gain Kh) by estimating a relationship between the normal gains calculated for the different temperature setting values and the difference between the process value for a corresponding temperature setting value and the ambient temperature of the real controlled device.

e2: Cylinder Response Block 440

The cylinder response block 440, which is equivalent to the heat capacity component, includes a time constant (cylinder-response time constant Tb) representing the heat capacity in the real controlled device 230 (i.e., the heat capacity of the cylinder 236). The cylinder response block 440 is approximated with a first-order delay using the cylinder-response time constant Tb. The cylinder-response time constant Tb can be calculated according to the following Formula (2) using the normal heating gain Kh used when determining the parameters in the heating block 410, and a maximum slope Rh of a response that is rising when the manipulated value is at 100%.

$$Tb = Kh/Rh \quad (2)$$

where,

Kh=normal heating gain

Rh=maximum slope during rise in response

In this manner, a value may be determined for the cylinder-response time constant Tb which is a first-order delayed time constant from the heating step response. In other words, cylinder-response time constant Tb is determined on the basis of a process-value time variance generated during a period when the first manipulated value (heating manipulated value) is kept constant.

e3: Natural Radiation Block 430

The natural radiation block 430, i.e., the radiation component, includes a second gain (natural radiation gain Ka), and an exponent (natural radiation exponent α). The second gain represents a relationship between a difference between a temperature of the real controlled device 230 and the ambient temperature of the real controlled device 230, with an amount decreasing the process value. More specifically, a natural radiation value is calculated in accordance with the temperature of the cylinder 236 so that the heating value of the natural radiation block 430 reflects the temperature of the cylinder 236. The natural radiation block 430, i.e., the radiation component determines an amount for decreasing the process value in accordance with the difference between the ambient temperature of the real controlled device 230 (ambient temperature Tha) and the temperature of the real controlled device 230. More specifically, the natural radiation block determines the natural radiation gain Ka and a value of a natural radiation exponent α.

Figure 8:
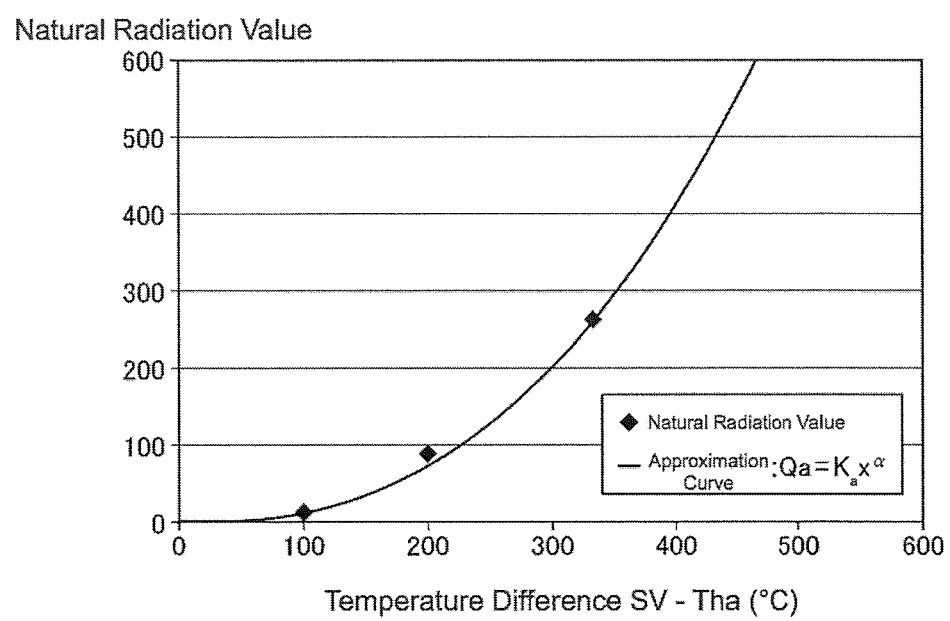
FIG. 8 is a graph illustrating the relationship between the temperature difference (difference between a temperature setting value and the ambient temperature) in the controlled-device process illustrated in FIG. 1, and a natural radiation value.

FIG. 8 is a graph illustrating the relationship between the temperature difference (difference between a temperature setting value SV and the ambient temperature Tha) in the controlled-device process 200 illustrated in FIG. 1, and a natural radiation value. As illustrated in FIG. 8, the natural radiation value is proportional to the α power of the temperature difference.

In contrast, the natural radiation value $Q_{a\_SV}$ at a temperature setting value SV during a normal state can be defined according to the following Formula (3).

$$Q_{a\_SV} = (Kh - K_{h\_SV}) MV_{h\_SV} \quad (3)$$

where,

Kh=normal heating gain $K_{h\_SV}$=normal gain at temperature setting value SV $MV_{h\_SV}$=settling manipulated value at the temperature setting value SV ($0 \leq MV_{h\_SV} \leq 1$)

The relationship between the natural radiation value and the temperature difference may be established according to the following Formula (4).

$$Qa(PV) = Ka(PV' - Tha)^\alpha \quad (4)$$

where,

Qa(PV)=effect of natural thermal radiation at temperature PV (natural radiation value)

Ka=natural radiation gain

PV'=PV with corrected heat transfer (° C.)

Tha=ambient temperature (° C.)

Here, PV' is a value reflecting the delay in heat transfer and is estimated on the basis of the location of a temperature measurement point, i.e., the installation location of the temperature sensor 240 using the deadtime and the temperature gradient. The value of the natural radiation gain Ka and the natural radiation exponent α are determined using a feedback method such as the least-squares method. That is, as illustrated in FIG. 8, an approximation curve is defined for a variable x, and the values of the natural radiation gain Ka and the natural radiation exponent a determined which are the best fits for the approximation curve.

The natural radiation exponent α theoretically fall between the powers of one to four. Therefore, a may be limited to α=2.0 to 2.5.

Thus, the method of determining parameters in the natural radiation block 430 includes: calculating a normal gain (normal gain $K_{h\_SV}$) for different temperature setting values on the basis of difference between a temperature setting value for a process value (temperature setting value SV) and the ambient temperature of the real controlled device 270 (ambient temperature Tha), and a first manipulated value (heating manipulated value); calculating a settling manipulated value (settling manipulated value $MV_{h\_SV}$) for different temperature setting values on the basis of a difference between a temperature setting value for a process value (temperature setting value SV) and the ambient temperature of the real controlled device 270 (ambient temperature Tha); calculating a radiation value (natural radiation value Qa(PV)) for different temperature setting values on the basis of the difference between a first gain (normal heating gain Kh) and a normal gain (normal gain $K_{h\_SV}$) calculated for different temperature setting values, and the settling manipulated value (settling manipulated value $MV_{h\_SV}$) calculated for the different temperature setting values (temperature setting value SV), and determining the second gain (natural radiation gain Ka) and the exponent (natural radiation exponent a) from estimating a relationship between a difference between the temperature of the real controlled device 270 and the ambient temperature of the real controlled device, and the radiation value calculated for the different temperature setting values.

e4: Cooling Block 420

The cooling block 420 is equivalent to the cooling component, and represents the relationship between a second manipulated value (cooling manipulated value) and an amount decreasing the process value. The cooling block 420 includes a third gain (cooling gain Kc(PV)), which is dependent on the second manipulated value. More specifically, the cooling block 420 is expressed using a cooling gain Kc(PV) and a (pure) deadtime (Lc).

As illustrated in FIG. 3, the controlled-device process 200 uses a liquid which evaporates such as water as the cooling medium; therefore, the cooling characteristic of the controlled-device process 200, affected by the heat of vaporization, becomes a non-linear characteristic. Further, it tends to be difficult to establish a formula for the cooling characteristic because in addition to its non-linearity, the controlled-device process, influenced by the natural thermal radiation, attempts to stabilize at room temperature regardless of whether or not the cooling thereof is controlled.

Here, until the cooling apparatus 220 is in a normal state, no control that attempts continuous cooling is carried out in the controlled-device process 200 illustrated in FIG. 3. The cooling apparatus 220 operates in a case where relatively small amounts of cooling medium flows through the cooling pipe 222 to cool the cylinder 236 when the temperature measured in the control-device process 200 during production exceeds a temperature setting value. Therefore, the parameters in the cooling block 420 are determined on the basis of a transient cooling response (the slope of the decreasing temperature).

For different cooling manipulated value and temperature conditions, one or more embodiments of the present invention acquire the maximum slope of the decreasing temperature after cooling starts and the cylinder-response time in the cylinder 236 subject to the same kind of heat propagation as during heating. One or more embodiments of the present invention then determine a fictitious settling value whereat the cooling manipulated value is constant, and the ambient temperature does not affect the cylinder-response block. This fictitious settling value determined is not a temperature that can be realistically reached through cooling, and is thus also referred to below as a "virtual settling value". The virtual settling value is indicative of a cooling capacity, and entering this value in the cylinder response block 440 reproduces a transient cooling response. The virtual settling value may be determined according to the following procedures (1) through (4).

(1) A desired temperature is set with stepped output of the cooling manipulated value.

(2) The maximum slope Rc of the decreasing temperature and the deadtime are acquired from the transient cooling response.

(3) A virtual settling value Sc minus the effects of natural thermal radiation is determined from the maximum slope Rc and the cylinder-response time constant Tb.

(4) Procedures (1) through (3) are repeated for a plurality of temperatures and manipulated values.

Figure 9:
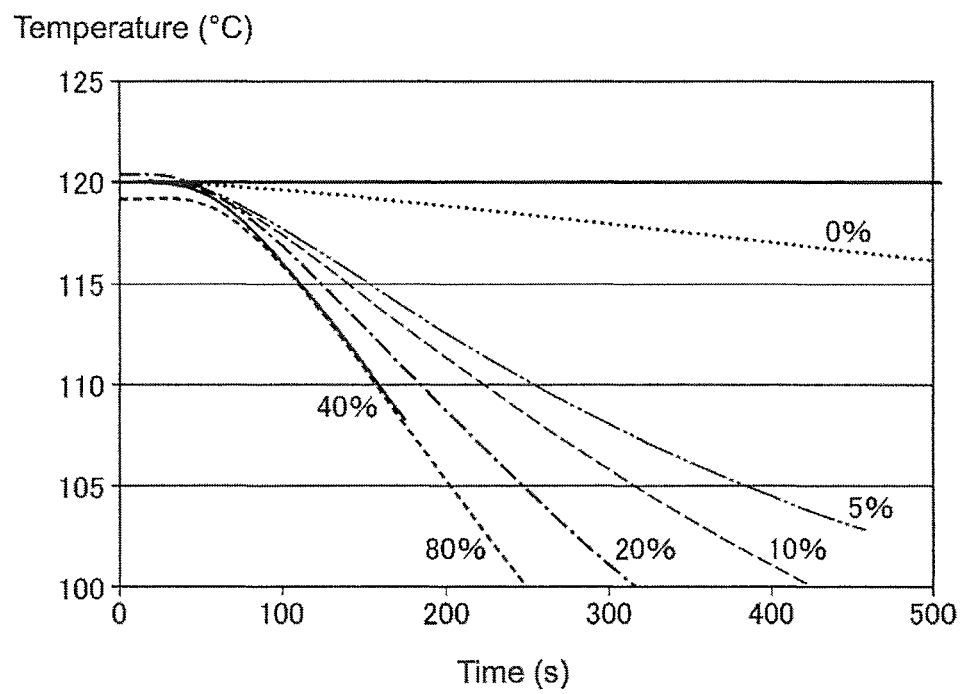
FIG. 9 is a graph illustrating a transient cooling response during the controlled-device process illustrated in FIG. 1.

FIG. 9 is a graph illustrating a transient cooling response during the controlled-device process 200 illustrated in FIG. 1. FIG. 9 illustrates the time variance in the temperature that occurs when the cooling manipulated values are differentiated at 0%, 5%, 10%, 20%, 40%, and 80% respectively. The virtual settling value Sc minus the effects of natural thermal radiation can be determined from the transient response in accordance with the following Formula (5).

$$Sc(MVc)=(Rc(MVc)-Rc(0\%))Tb \quad (5)$$

where,

Sc(MVc)=virtual settling value (° C.) at a cooling manipulated value MVc (%)

Rc(MVc)=maximum slope Rc (° C./s) of the decreasing temperature at cooling manipulated value MVc (%)

Tb=cylinder-response time constant (s)

Figure 10:
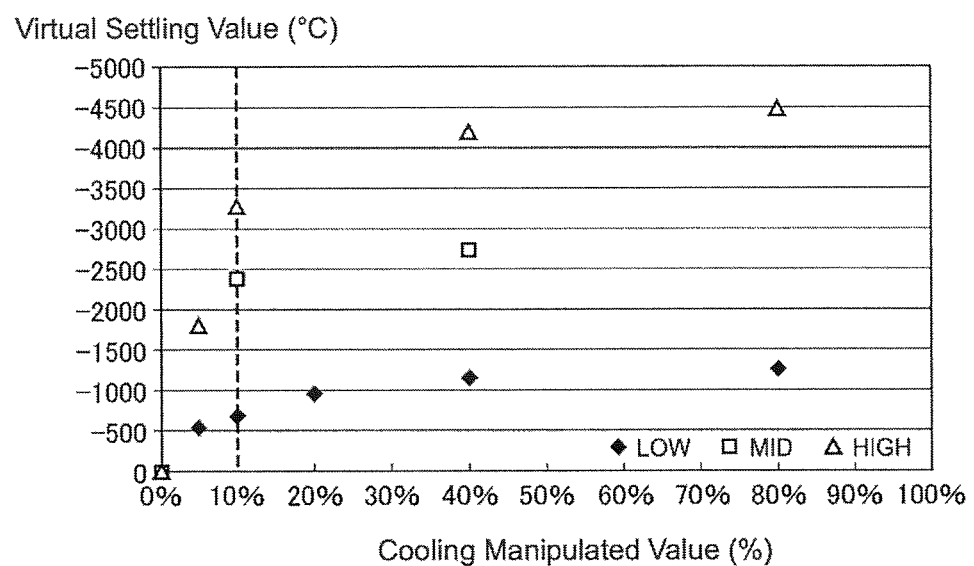
FIG. 10 is a graph illustrating virtual settling values calculated on the basis of the transient cooling response illustrated in FIG. 9.

FIG. 10 is a graph illustrating virtual settling values calculated on the basis of the transient cooling response illustrated in FIG. 9. In FIG. 10, the virtual settling values calculated for a low temperature (♦), medium temperature (■), and a high temperature (▲) are respectively shown. According to FIG. 10, the amount of change in the virtual settling value relative to the cooling manipulated value MVc differ largely between when the cooling manipulated value is 0% to 10% and when the cooling manipulated value is 10% to 100%.

The change in the former range (0% to 10%) may be attributed to the heat absorption (heat of vaporization) that occurs due to evaporation of all the relatively small amount of cooling medium (typically water) that is supplied. The change in the latter range (10% to 100%) may be attributed to a smaller proportion of the cooling medium evaporating along with the increased supply of the cooling medium which consequently increases the heat absorption due to heat transfer through the cooling medium. In other words, the heat of vaporization has a several fold capacity compared to the amount of heat absorbed through water flow, and therefore the amount of change in the former range (0% to 10%) is sudden compared to the latter range (10% to 100%).

Therefore, one or more embodiments of the present invention approximate the cooling characteristic by suitably combining two different kinds of characteristics depending on whether or not the heat of vaporization is present. More specifically, a point within large change in the slope of the virtual settling value with respect to the cooling manipulated value is defined as a nonlinear point Xc. The relationships between the virtual settling value and the cooling manipulated value are approximated in a range less than the nonlinear point Xc and a range no less than the nonlinear point Xc using approximation lines L1 and L2 respectively. Here, the approximation line L1 represents the cooling characteristic primarily attributed to the heat of vaporization, and the approximation line L2 represents the cooling characteristic primarily attributed to heat absorption through water flow. That is, these two cooling characteristics (approximation lines L1 and L2) are defined as the relationships between the second manipulated value (cooling manipulated value) and the cooling capacity.

Figure 11:
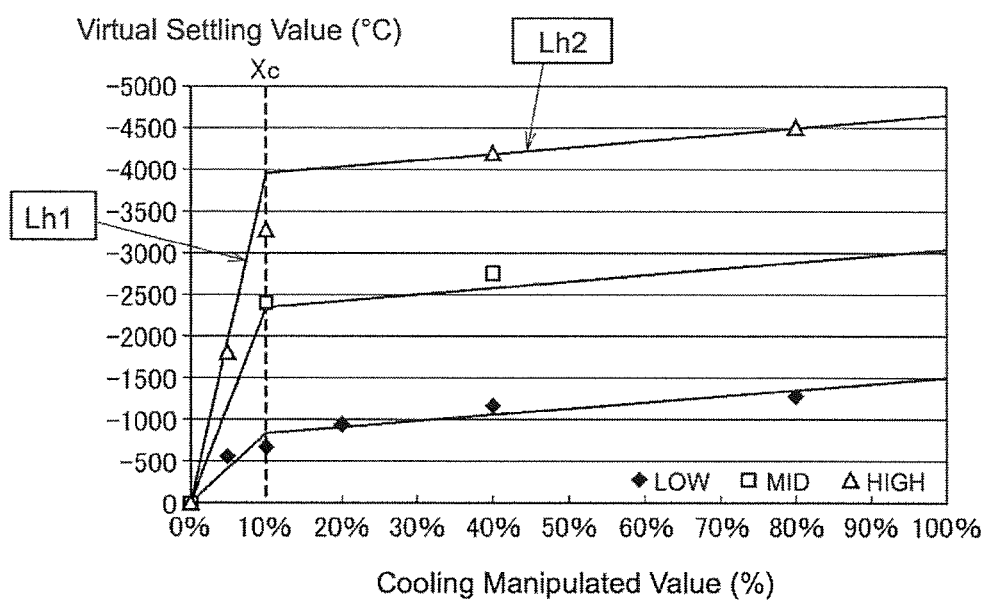
FIG. 11 is a graph illustrating one example of using two types approximation lines to represent the characteristics of the virtual settling values in relation to the cooling manipulated values in FIG. 10.

FIG. 11 is a graph illustrating one example of using two types of linear approximations to represent the characteristics of the virtual setting values in relation to the cooling manipulated values illustrated in FIG. 10. The approximation lines L1 and L2 illustrated in FIG. 11 are approximated according to the following Formula (6) and Formula (7) respectively.

$$Sc(PV,MVc)=Kc1(PV)\times MVc(MVc<Xc) \quad (6)$$

$$Sc(PV,MVc)=Kc2\times MVc+B2(PV)(MVc\geq Xc) \quad (7)$$

where,

Sc(PV, MVc)=virtual settling value (° C.) at a temperature PV (° C.) and a cooling manipulated value MVc (%)

Kc1=slope of approximation line L1

Kc2=slope of approximation line L2

B2(PV)=segment of approximation line L2 at temperature PV (° C.)

The higher the temperature of the cylinder 236, the larger the temperature difference with the cooling medium, thus increasing any of the heat of vaporization or the amount of heat absorption due to water flow. That is, both of the approximation lines L1 and L2 change in accordance with the temperature of the cylinder 236. At this point, the approximation line L2 is dependent on the amount of heat absorption due to water flow, and thus the amount of heat absorption is taken as changing linearly in relation to the temperature of the cylinder 236 and the cooling manipulated value. The slope of the approximation line L2 at each temperature is kept constant, and the relationship between the temperature of the cylinder 236 and the segment of the approximation line L2 represented by the following Formula (8).

$$B2(PV)=A(PV-100)+B0 \quad (8)$$

where,
A=amount of change in segment of approximation line L2
B0=segment of the approximation line L2 at 100° C.

Additionally the slope Kc1 of the approximation line L1 is determined from the formula for the approximation line L2 using the nonlinear point Xc. That is, the slope Kc1 of the approximation line L1 is calculated using the following Formula (9).

$$Kc1(PV)=Kc2+B2(PV)/Xc \quad (9)$$

FIG. 11 illustrates the approximation lines L1 and L2 determined using parameters estimated according to Formula (8) and Formula (9).

In this manner, determining the parameters in the cooling block 420 includes, determining a nonlinear point representing the size of a second manipulated value (cooling manipulated value) which changes the characteristic of an amount decreasing the process value; determining a first cooling characteristic (approximation line L1) in a region from the nonlinear point where the second manipulated value is close to zero and determining a second cooling characteristic (approximation line L2) in the remaining region; and finally determining a third gain (cooling gain Kc(PV)) on the basis of the first and second cooling characteristics.

The approximation line L2 which expresses a cooling characteristic, indicates that the cooling capacity changes proportionally in relation to the cooling manipulated value, and the approximation line L1 which expresses a cooling characteristic, indicates that the degree of change in the cooling capacity in relation to the cooling manipulated value changes in accordance with the nonlinear point.

e5: Evaluation

To evaluate the reproducibility from the model, the response characteristics of a real machine were compared to the response characteristics from a fully built controlled-device model 400 with the parameters determined according to the above-described procedures. The real machine was a test machine version of an extrusion molding device. The response during startup and the disturbance response were compared; the overshoot (OVS) and settling time evaluated in each case. The particulars and results are presented below.

TABLE 1

|  |  | OVS, ° C. ($R_{ovs}$, %) | Settling Time (s) |
|---|---|---|---|
| Startup Response (1) | Real Machine | 1.1 (0.81) | 1457 |
| (SV = 135° C.) | SIM | 1.3 (0.96) | 1351 |
| Startup Response (2) | Real Machine | 1.8 (0.83) | 3032 |
| (SV = 215° C.) | SIM | 2.3 (1.06) | 2987 |
| Disturbance Response | Real Machine | 2.4 (1.11) | 453 |
| (SV = 135° C.) | SIM | 2.5 (1.16) | 499 |

In Table 1, "OVS" represents the difference between a peak temperature and the temperature setting value, and "Rovs" represents the proportion of overshoot (%) in relation to the temperature setting value. The "settling time" represents the time needed from the start of the test until the response converges to within ±1% (° C.) of the temperature setting value. According to the particulars and results of the experiment present in the above Table 1, the overshoot and the settling time are substantially the same between the results of the simulation using the controlled-device model 400 and the results observed in the real machine. Namely the error within the overshoot is no greater than 0.23%, and the error in the settling time is no greater than roughly 10%. Thus, it can be said that the controlled-device model 400 according to one or more embodiments of the present invention correctly reproduced the behavior of the real machine.

Further, along with comparing the difference in startup response due to the difference in the temperature setting values, a series of disturbances were applied to observe the behavior of the system to compare the response while cooling water was output.

FIGS. 12A, 12B, and 12C illustrate comparative examples of a simulation result and the response of a real machine. FIG. 12A shows the startup response and the corresponding manipulated value when the temperature setting value SV was 135° C. FIG. 12B shows the startup response and the corresponding manipulated value when the temperature setting value SV was 215° C. FIG. 12B shows the disturbance response and the corresponding manipulated value when the temperature setting value SV was 135° C.

According to the comparison of the simulation results and the response from the execution of control, it can be understood that in addition to reproducing the startup response, the simulation can also reproduce a response even when some kind of disturbance is applied. Therefore, a simulation using a controlled-device model 400 according to one or more embodiments of the present invention may also be used to test whether or not some kind of fluctuation was generated when a disturbance is applied to the system. In other words, highly accurate simulations can be implemented across broad temperature ranges.

e6: Procedure

Next is described a procedure for determining the parameters in the above controlled-device model 400. In this method of determination, the parameters in the controlled-device model 400 are set using actual step responses from heating and cooling in the controlled-device process 200. In a typical installation, the regulator 100 controls the real machine attached to the controlled-device process 200 and collects the responses therefrom, and the information processing device 300 identifies the parameters in the controlled-device model 400 using the responses collected by the regulator 100. However, a logging device may be provided independent of the regulator 100 for collecting the responses. Moreover, in addition to being configured to collect the responses, the regulator 100 may be configured to identify the parameters in the controlled-device model 400.

For the sake of convenience, the following flowcharts used in the description provide an example of the procedures the information processing device 300 carries out when identifying the parameters in the controlled-device model 400.

Figure 13:
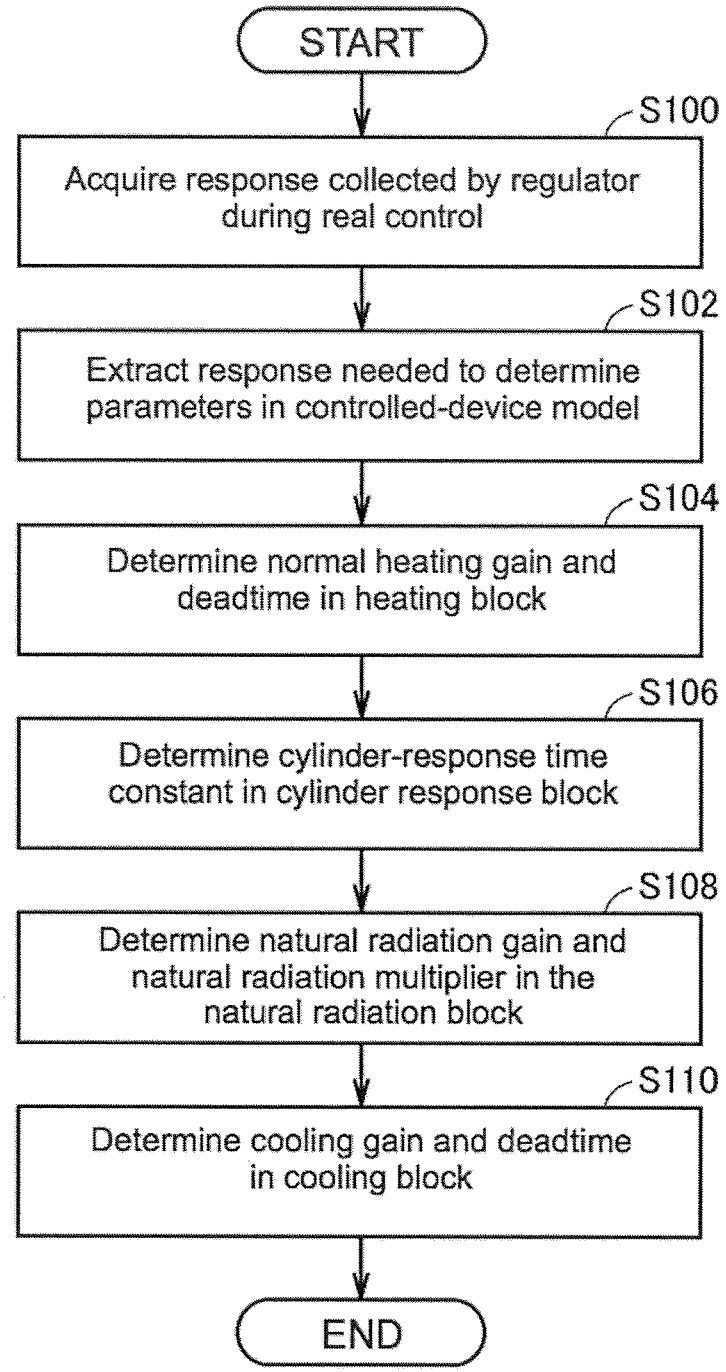
FIG. 13 is a flowchart illustrating how parameters are determined in a controlled-device model according to one or more embodiments of the present invention (Case 1).

FIG. 13 is a flowchart representing a procedure for determining parameters in a controlled-device model 400 according to one or more embodiments of the present invention (Case 1). The processor 302 in the information processing device 300 may run the device model building program 322 to implement each of the steps illustrated in FIG. 13.

Referring to FIG. 13 the processor 302 in the information processing device 300 acquires the responses from actual control collected by the regulator 100 (step S100). Next, the processor 302 extracts from among the acquired responses the responses needed for determining the parameters in the controlled-device model 400. Here, for example, the information processing device 300 may extract the startup response for a desired control period, the corresponding air temperature, the response after the start of cooling, and the like.

The processor 302 then determines the normal heating gain Kh and the deadtime Lh in the heating block 410 (step S104). More specifically, the processor 302 calculates the relationship between the normal heating gain $K_{h\_SV}$ and the temperature difference from a plurality of startup responses where the ambient temperature Tha and/or this temperature setting value SV are different, and estimates the normal heating gain Kh from the relationship. The processor 302 also estimates the deadtime Lh from the deadtime appearing in the response.

Next, the processor 302 determines the cylinder-response time constant Tb in the cylinder response block 440 (step S106). More specifically, the processor 302 calculate the maximum slope Rh in the startup response when the heating manipulated value is 100%, and estimates the cylinder-response time constant Tb from the previously determined normal heating gain Kh and the maximum slope Rh.

The processor 302 then determines the natural radiation gain Ka and the natural radiation exponent α in the natural radiation block 430 (step S108). More specifically the processor 302 calculates the relationship between the natural thermal radiation and the temperature difference from a plurality of startup responses where the ambient temperature Tha and/or the temperature setting value SV are different and determines the natural radiation gain Ka and the natural radiation exponent a that are the best fit for the calculated relationship.

Finally, the processor 302 determines a cooling gain Kc(PV) and a deadtime Lc in the cooling block 420 (step S110). More concretely, the processor 302 calculates a virtual settling value Sc from the transient responses when a plurality of different cooling manipulated values are used; calculates a nonlinear point Xc at each of the relationships of virtual settling values for a plurality of settling temperatures, and calculates two types of approximation lines (an approximation line a cooling characteristic primarily resulting from the heat of vaporization, and an approximation line representing a cooling characteristic primarily resulting from heat absorption due to water flow). The processor then determines the cooling gain Kc(PV) and the deadtime Lc in the cooling block 420 from two types of approximation lines calculated.

The above procedure allows determination of the parameters required to build the controlled-device model 400.

F. DETERMINING PARAMETERS (CASE 2): USING AUTO-TUNING RESULTS

An example of another procedure for determining parameters in the controlled-device model 400 according to one or more embodiments of the present invention is described next. Described is an auto-tuning based method of determining control parameters (Case 2); namely, the control parameters are determined using the results obtained from the auto-tuning performed by the regulator 100.

The auto-tuning based method may also use a computer such as the information processing device 300 to acquire a process-value time variance occurring in the real controlled device 230 by varying a first manipulated value (heating manipulated value) over time, and to determine a first and a second gain (a normal heating gain Kh, and a natural radiation gain Ka), an exponent (natural radiation exponent α), and a time constant (cylinder time constants Tb) on the basis of the process-value time variance.

The regulator 100 uses auto-tuning to optimize the control parameters (also referred to as "PID parameters", below) required in the PID control system. To auto-tune the control parameters, the regulator 100 alternately outputs the first manipulated value (cooling manipulated value) and the second manipulated value (heating manipulated value) depending on a process value, and determines the PID parameters from the response acquired from the aforementioned alternating output. The regulator 100 alternately outputs the cooling manipulated value and the heating manipulated value, creating a limit cycle and then determines the PID parameters on the basis of the responses in the limit cycle created.

Figure 14:
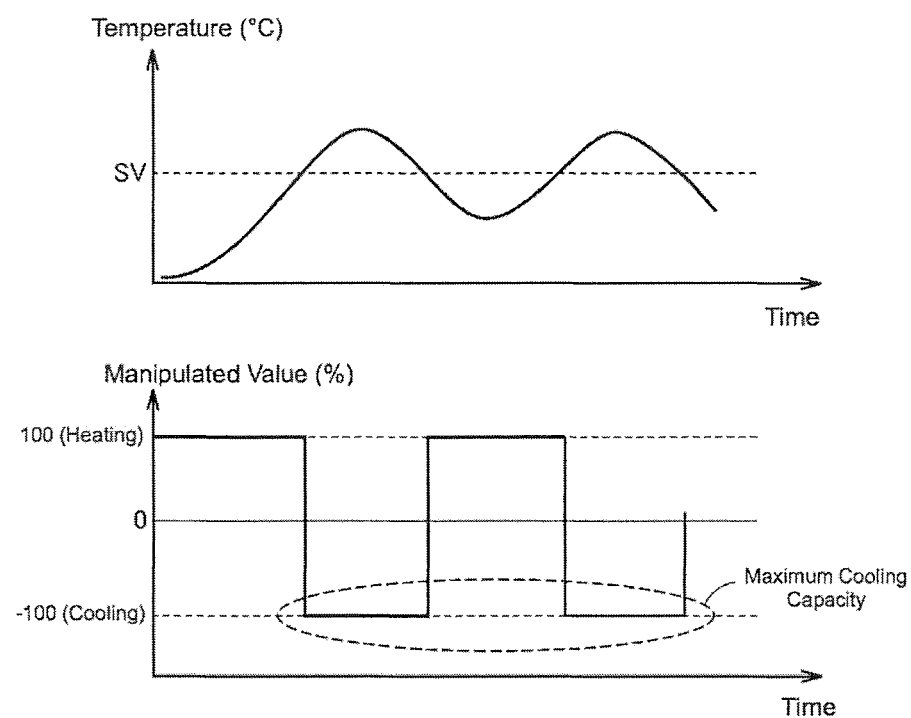
FIG. 14 illustrates an example of the changes in the temperature (process value) and the manipulated value over time for a controlled device during typical auto-tuning.

FIG. 14 illustrates an example of the changes in the temperature (process value) and manipulation value over time for a controlled device during a typical auto-tuning. FIG. 14 illustrates an example of the results obtained for auto-tuning using the limit cycle method. When adopting the usual limit cycle method, the heating manipulated value and the cooling manipulated values are both alternately provided to the controlled device as a maximum value (i.e., as 100% and −100%). The PID parameters responsive to the controlled device are determined on the basis of the responses generated in this manner.

However, the method of auto-tuning is not restricted to the limit cycle method, any other method may be used. For instance, a step response technique may be used to determine the parameters. In this manner, the process-value time variance one or more embodiments of the present invention may be acquired by varying the first manipulated value (heating manipulated value) and/or the second manipulated value (cooling manipulated value) over time in accordance with the limit cycle method or the step-response method.

Given that auto-tuning is run numerous times when the regulator 100 is determining the PID parameters, it is convenient and advantageous to determine the parameters in the controlled-device model 400 using the auto-tuning results used in determining the PID parameters.

Hereafter, the feedback control system 1 illustrated in FIG. 3 uses the responses obtained from the auto-tuning run by the regulator 100 to identify the parameters in the controlled-device model 400. The procedure for identifying the parameters in each block is described below.

f1: Cylinder Block 440

As described above, the cylinder block 440 is equivalent to the heat capacity of the cylinder 236 and is approximated with a first-order delay using a cylinder time constant Tb. The cylinder-response time constant Tb may be calculated according to the following Formula (10), using the normal gain $K_{h\_SV}$ at a temperature setting value SV, and a maximum slope Rh during temperature rise.

$$Tb = K_{h\_SV}/Rh \quad (10)$$

where, $K_{h\_SV}$=normal heating gain at temperature setting value SV (° C. per unit of manipulated value);

Rh=maximum slope at temperature rise (° C. per second).

Figure 15A:
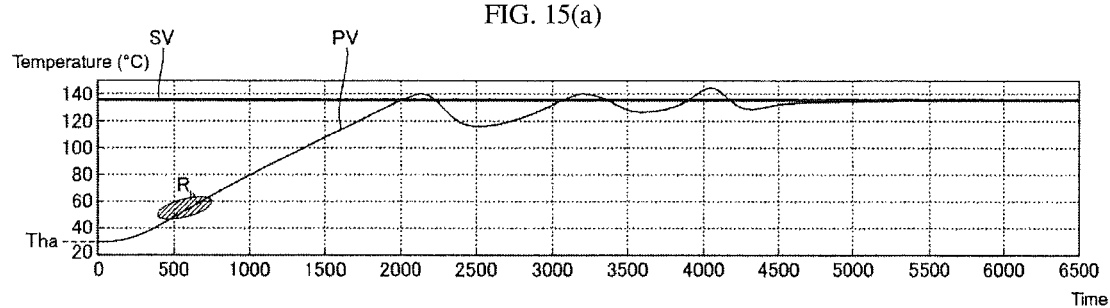
FIGS. 15A and 15B include graphs representing time curves from immediately after a regulator according to one or more embodiments of the present invention starts auto-tuning.
Figure 15B:
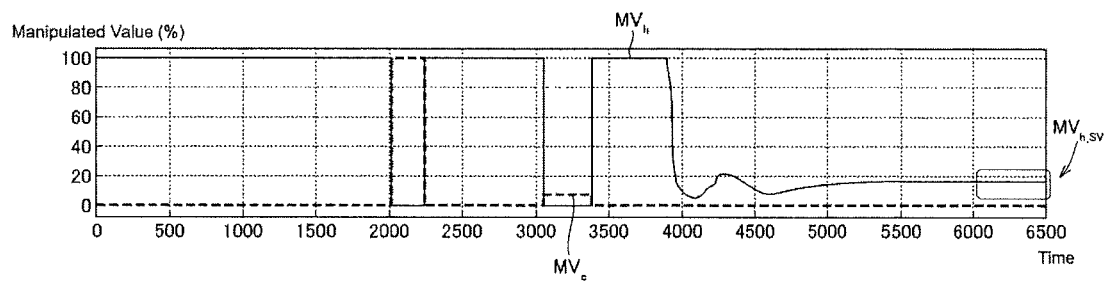

FIGS. 15A and 15B include graphs representing time curves from immediately after a regulator according to one or more embodiments of the present invention starts auto-tuning. FIG. 15A illustrates the time variance in the temperature PV detected for a temperature setting value SV by the temperature sensor 240. FIG. 15B illustrates a time variance in the cooling manipulated value MVc and the heating manipulated value MVh.

The maximum slope Rh at the rise in temperature rise in the above-described Formula (10) is determined from the time curve illustrated in FIG. 15A for the temperature PV. The maximum slope Rh corresponds to the maximum value of the slope during the temperature rise. The maximum slope near the temperature setting value is usually selected in the limit cycle method.

The normal gain $K_{h\_SV}$ at a temperature setting value SV in Formula (10) is calculated according to the following Formula (11).

$$K_{h\_SV}=(SV-Tha)/MV_{h\_SV} \quad (11)$$

where,

SV=temperature setting value (settling temperature, ° C.)

Tha=ambient temperature (° C.)

$MV_{h\_SV}$=settling manipulated value at the temperature setting value SV ($0 \leq MV_{h\_SV} \leq 1$)

The ambient temperature Tha can be determined from the temperature PV (initial temperature) during the auto-tuning startup illustrated in FIG. 15A. That is, during auto-tuning startup, the environment surrounding the cylinder 236 may be assumed to be uniform, and the PV (initial temperature) during auto-tuning startup set as the ambient temperature Tha.

Additionally, the settling manipulated value $MV_{h\_SV}$ can be set as the heating manipulated value MVh when the temperature PV of the cylinder 236 matches (settles to) the temperature setting value SV.

The parameters in the cylinder response block 440 may thus be identified using the kind of auto-tuning results illustrated in FIG. 15. In other words, the cylinder time constant Tb is determined on the basis of a process-value time variance that occurs during a period when the first manipulated value (heating manipulated value) is kept constant.

f2: Heating Block 410

The heating block 410, i.e., the heating component, includes a first gain (normal heating gain Kh) representing a relationship between a first manipulated value a first manipulated value (heating manipulated value MVh), and an amount increasing a process value. The normal heating gain Kh in the heating block 410 and the deadtime Lh may also be identified using auto-tuning results and the like as described below.

As above described, the normal heating gain Kh is dependent on the radiation value due to natural thermal radiation and changes in accordance therewith. Consequently, a value must be determined for the normal heating gain Kh minus the influence of natural thermal radiation.

Figure 16:
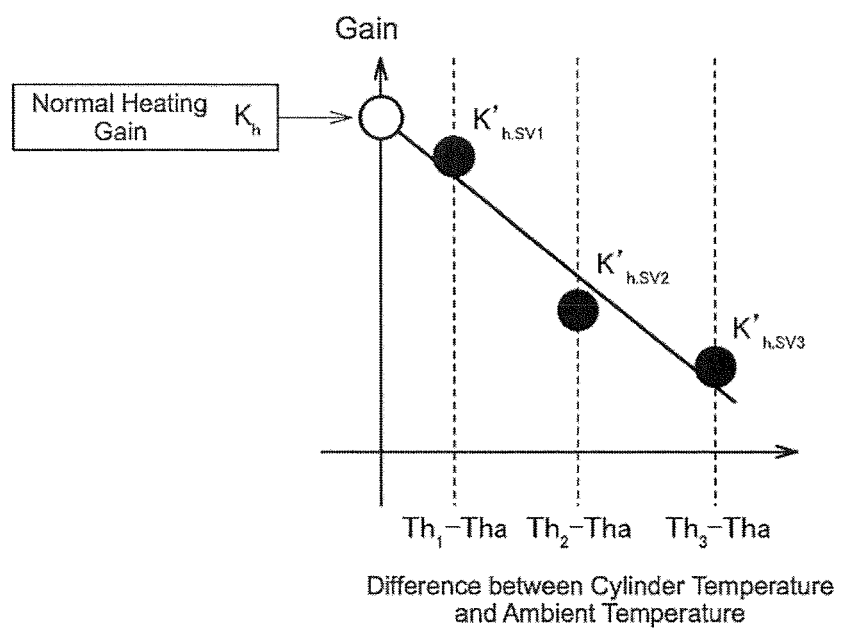
FIG. 16 is a diagram for explaining how a normal heating gain may be determined for the heating block in a controlled-device model according to one or more embodiments of the present invention.

FIG. 16 is a diagram for explaining how a normal heating gain Kh may be determined for the heating block 410 in a controlled-device model 400 according to one or more embodiments of the present invention. A normal gain $K_{h\_SV}$ is calculated for each temperature setting value SV in a plurality of temperature setting values SVn, with the normal gains $K_{h\_SV}$ plotted against the differences between the cylinder temperature Thn and the ambient temperature Tha, which are placed along the horizontal axis. The result is the kind of linear relationship illustrated in FIG. 16. Here, it is natural to think that no natural thermal radiation is generated when the cylinder temperature matches the ambient temperature Th, and therefore the normal heating gain Kh may be determined by estimating (extrapolating) the linear relationship illustrated in FIG. 16.

As illustrated in FIG. 16 the normal gain $K'_{h\_sv_n}$ at a temperature setting value SVn may be calculated according to the following Formula (12). Note that, the cylinder-response time constant Tb in Formula (12) may be determined using the above-described procedures.

$$K'_{h\_SV_n}=R_{h\_SV_n} \times Tb \quad (12)$$

where,

Rh_SV=maximum slope at temperature setting value SVn

Tb=cylinder-response time constant

Figure 17:
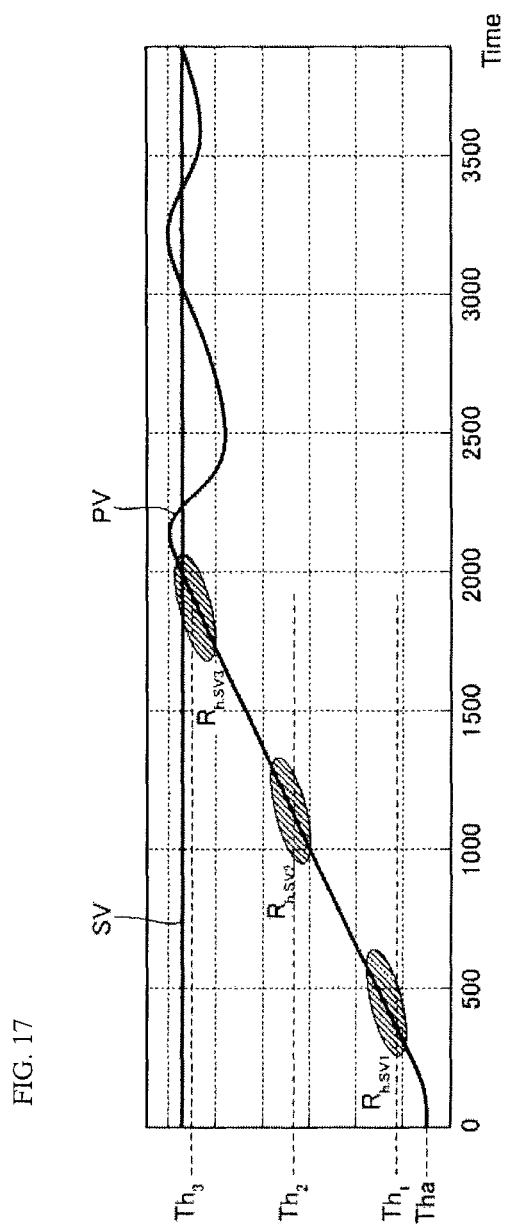
FIG. 17 is a graph representing a time curve immediately after a regulator according to one or more embodiments of the present invention starts auto-tuning.

FIG. 17 is a graph representing a time wave from immediately after a regulator 100 according to one or more embodiments of the present invention starts auto-tuning. The normal gain $K'_{h\_SV_n}$ at the temperature setting value SVn is determined from the time wave for the temperature PV illustrated in FIG. 17. More specifically, in addition to extracting a plurality of temperatures during the process of increasing the temperature PV, a slope is calculated corresponding to each of the temperatures extracted. FIG. 17 illustrates an example of extracting three temperatures Th1, Th2, Th3 during the process of increasing the temperature PV. For instance, the temperature Th1 is the temperature immediately after the temperature increase, the temperature Th3 is a temperature near the temperature setting value SV, and the temperature Th2 is a middle temperature between temperature Th1 and the temperature Th3. The maximum slopes corresponding to each of the temperatures Th1, Th2, Th3 are set as the maximum slopes $R_{h\_SV1}$, $R_{h\_SV2}$, $R_{h\_SV3}$ respectively.

The combinations of the above-determined temperatures and the corresponding maximum slopes, i.e., (Th1, $R_{h\_SV1}$), (Th2, $R_{h\_SV2}$), (Th3, $R_{h\_SV3}$), are used to determine the value of each of the normal gains $K'_{h\_SVn}$, as well as select the corresponding normal gain $K'_{h\_SVn}$. The ambient temperature Tha can be determined from the temperature PV (initial temperature) during the auto-tuning startup illustrated in FIG. 17. That is, during auto-tuning startup, the environment surrounding the cylinder 236 may be assumed to be uniform, and the PV during auto-tuning startup set as the ambient temperature Tha.

Note that the normal gain $K_{h\_SV}$ at the temperature setting value SV used when determining the cylinder-response time constant Tb in the cylinder response block 440 may substitute for the normal gain $K_{h\_SV3}$ corresponding to the temperature Th3.

Each of the normal gains $K'_{h\_SVn}$ maybe plotted against the difference between the cylinder temperature and the ambient temperature Tha placed on the horizontal axis. A linear approximation of the plotted points may be estimated (extrapolated) to determine a normal heating gain Kh at a stage when no natural thermal radiation occurs (i.e., where the temperature differences zero).

In this manner, determining the parameters in the heating block 410 involves acquiring a plurality of (amounts of) process-value time variances at different process-values during a period when the first manipulated value (heating manipulated value) is constant, and determining a first gain (normal heating gain Kh) by estimating a relationship between the plurality of process-time variances and the corresponding difference in temperature between the ambient temperature of the real controlled device and the temperature of the real controlled device.

Next, the auto-tuning results are also used to identify the deadtime Lh in the heating block 410.

Figure 18:
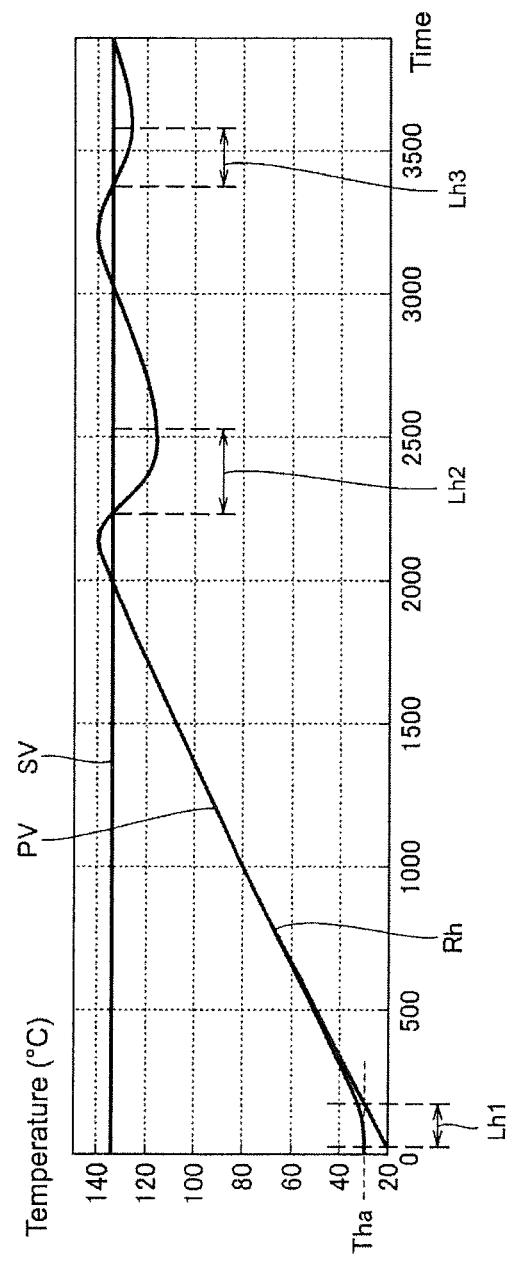
FIG. 18 is a diagram for explaining how a regulator according to one or more embodiments of the present invention uses the auto-tuning results to determine a deadtime in the heating block.

FIG. 18 is a diagram for explaining how the regulator 100 according to one or more embodiments of the present invention determines the deadtime Lh in the heating block 410 from auto-tuning results. FIG. 18 illustrates an example of using a single auto-tuning result to determine three kinds of deadtime Lh. When using a single auto-tuning result to determine multiple deadtimes, any one of the deadtimes may be selected, or the plurality of deadtimes statistically process to determine a representative value therefor. The statistical processing may involve, for instance, calculating an average value from the plurality of deadtimes, or calculating a mean value from the plurality of deadtimes. Basically, any desired method may be used to calculate the deadtime Lh in the heating block 410.

The deadtime signifies the delay between the entry of a condition requiring the manipulated value to change until the manipulated value changes. Therefore, the deadtimes Lh2 and Lh3 illustrated in FIG. 18 are equivalent to the time needed from the time the temperature PV falls below the temperature setting value SV due to a cooling operation until the temperature PV changes to increasing. That is, although the drop in the temperature PV below the temperature setting value SV initiates output of a heating manipulated value, there is some kind of delay until information on the temperature in the cylinder 236 actually starts, and this delay is equivalent to the deadtime.

Namely, the heating block 410 i.e. the heating component includes a first deadtime (deadtime Lh) that occurs between a first manipulated value (heating manipulated value), and an amount increasing the process value. The process for determining the first deadtime may include determining the first deadtime on the basis of the timing of the change in the first manipulated value and the timing of the change in the behavior of the process value.

Whereas, given that the cylinder response block 440 may be defined as a first-order delay, with no deadtime, the temperature PV should increase at a prescribed time constant (cylinder-response time constant Tb). Therefore, a point is selected at which a line extending from the maximum slope Rh occurring in the temperature PV intersects with the temperature PV during auto-tuning startup (initial temperature), and the time elapsed up to that intersecting point determined as the deadtime Lh1.

Namely, the process for determining the first deadtime may include determining the first deadtime on the basis of the behavior of the process value that occurs after input of the first manipulated value into the real controlled device.

The parameters in the heating block 410, i.e., the normal heating gain Kh and the deadtime Lh may be determined in accordance with the above kind of procedures.

f3: Natural Radiation Block 430

As above described, a natural radiation value is calculated in accordance with the temperature of the cylinder 236 so that the heating value of the natural radiation block 430 reflects the temperature of the cylinder 236. In other words, the natural radiation block 430, i.e., the radiation component, includes a second gain (natural radiation gain Ka) and an exponent (natural radiation exponent α). The second gain represents the relationship between a difference between the temperature of the real controlled device 230 and the ambient temperature of the real controlled device 230, and an amount decreasing the process value. The parameters determined are the natural radiation gain Ka and a value of the exponent α for natural thermal radiation.

Figures 19A, 19B:
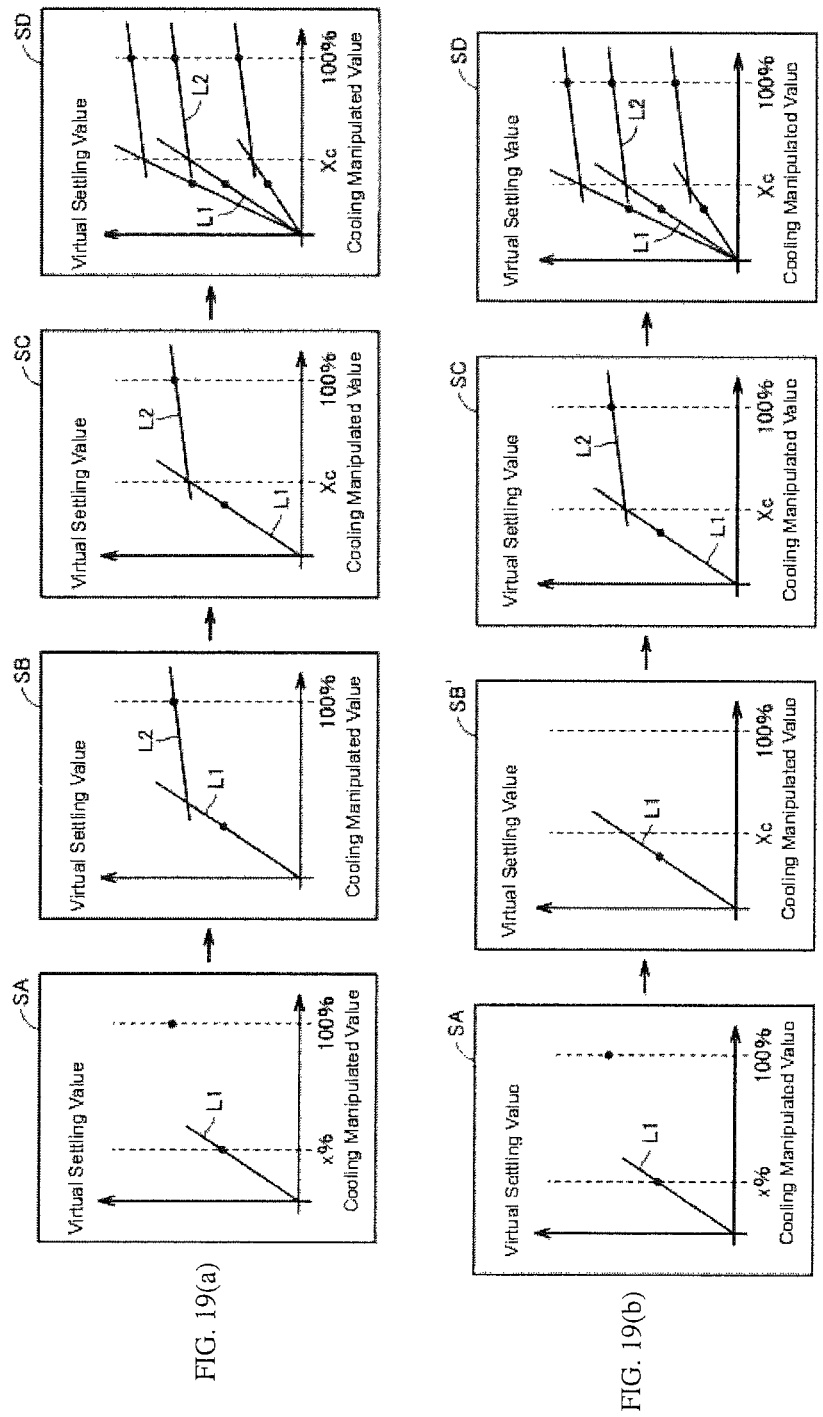
FIG. 19 is a graph illustrating a relationship between a natural radiation value, and the temperature difference between a cylinder temperature and the ambient temperature.

The natural radiation value depends on the temperature difference between the cylinder temperature and the ambient temperature. FIG. 19 is a graph illustrating a relationship between the amount of natural thermal radiation, and the temperature difference between the cylinder temperature and the ambient temperature. As illustrated in FIG. 19, the natural radiation value is proportional to the α power of the temperature difference. That is, the natural radiation value may be defined according to the following Formula (13).

$$Qa = Ka \cdot x^\alpha \quad (13)$$

where,
Qa=effect of natural thermal radiation (natural radiation value)
Ka=natural radiation gain
x=difference between cylinder temperature and ambient temperature (° C.).

In one or more embodiments of the present invention, a plurality of natural radiation values (Qa1, Qa2, Qa3, ...) are set, and a feedback technique (such as, a least squares method) used to determine the natural radiation gain Ka and the natural radiation exponent a so that the natural radiation values apply in the Formula (13).

A natural radiation value $Q_{a\_SVn}$ at a temperature setting values SVn is calculated according to the following Formula (14).

$$Q_{a\_SVn} = (K_h - K'_{h\_SVn}) \times MV'n \quad (14)$$

where,
Kh=normal heating gain
$K'_{h\_SVn}$=normal gain at temperature setting values SVn
MV'n=settling manipulated value.

Figure 20:
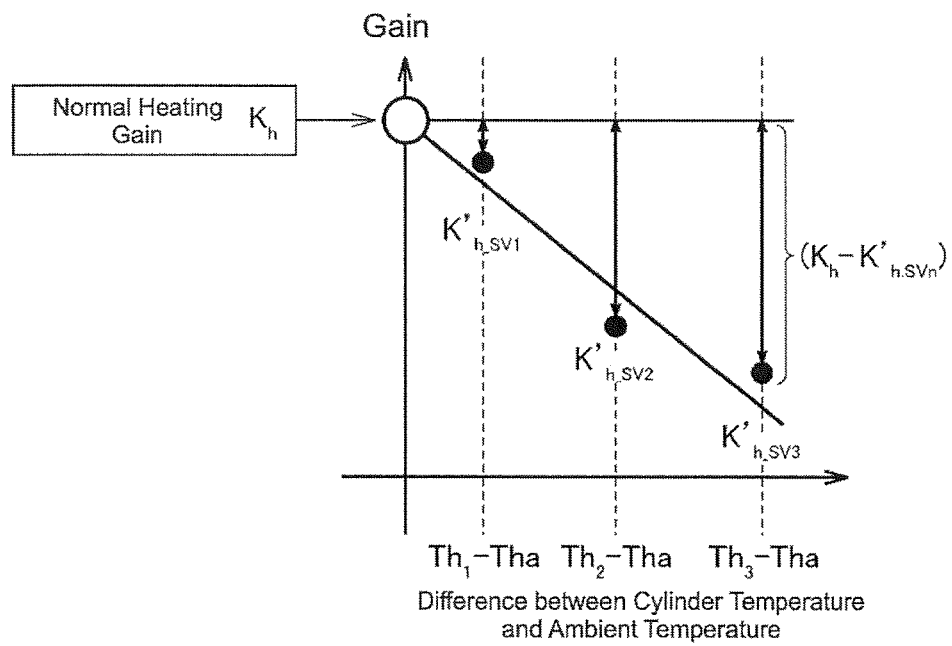
FIG. 20 is a diagram for explaining how the natural radiation value may be determined using the normal heating gain.

FIG. 20 is a diagram for explaining how the natural radiation value may be determined using the normal heating gain Kh. The above-described temperatures Th1, Th2, Th3 during the increase in the temperature PV used when determining the normal heating gain Kh in the heating block 410, and the normal gains $K'_{h\_SV1}$, $K'_{h\_SV2}$, $K_{h\_SV3}$ corresponding to these temperatures are acquired. Plotting these values with the differences between the cylinder temperature and the ambient temperature Tha placed along the horizontal axis yields the kind of linear relationship illustrated in FIG. 20.

Next, the settling manipulated value MV'n is calculated according to the following Formula (15).

$$MV'n = (Thn - Tha)/K'_{h\_SVn} \quad (15)$$

Note that the heating manipulated value MVh may be adopted as the value for MV'3 when the temperature PV of the cylinder 236 matches (settles to) the temperature setting value SV due to auto-tuning. This is because the heat input from the heating apparatus and the natural radiation value are considered equal when the temperature PV matches the temperature setting value SV.

The natural radiation value at each of the temperatures may then be calculated from the Formula (14) using the settling manipulated value MV'n calculated from the Formula (15). The value of the natural radiation gain Ka and the natural radiation exponent α are determined using a feedback method, for instance, the least-squares method to match each of the natural radiation values calculated.

The parameters in the natural radiation block 430 may thus be identified using the kind of auto-tuning results illustrated in FIG. 15. The method of determining parameters in the natural radiation block 430 includes: calculating a normal gain (normal gain $K_{h\_SV}$) for different temperature setting values on the basis of difference between a temperature setting value (temperature setting value SV) for a process value and the ambient temperature (ambient temperature Tha) of the real controlled device 270, and a first manipulated value (heating manipulated value); calculating a settling manipulated value (settling manipulated value $MV_{h\_SV}$) for different temperature setting values on the basis of a different between a temperature setting value (temperature setting value SV) for a process value and the ambient temperature (ambient temperature Tha) of the real controlled device 270; calculating a radiation value (natural radiation value for different temperature setting values on the basis of the difference between a first gain (normal heating gain Kh) and a normal gain (normal gain $K_{h\_SV}$) calculated for different temperature setting values, and the settling manipulated value (settling manipulated value $MV_{h\_SV}$) calculated for the different temperature setting values (temperature setting value SV), and determining a second gain (natural radiation gain Ka) and an exponent (natural radiation exponent α) from estimating a relationship between a difference between the temperature of the real controlled device 270 and the ambient temperature of the real controlled device, and the radiation value calculated for the different temperature setting values.

f4: Cooling Block 420

As described above, the cooling block 420 is expressed using a cooling gain (Kc(PV)) and a (pure) deadtime (Lc). As discussed regarding the step-response based parameter determining method (Case 1), the cooling characteristic in the cooling apparatus 220 is a non-linear characteristic due to the effects of the heat of vaporization. Therefore, a nonlinear point Xc may be defined as the point of the largest change in a slope of a virtual settling value in relation to a cooling manipulated value, and the cooling characteristics of the cooling apparatus 220 approximated using the nonlinear point Xc as the boundary between two types of cooling characteristics. That is, in a region where the cooling manipulated value is less than the nonlinear point Xc, the relationship between the virtual settling value and the cooling manipulated value may be approximated using an approximation line L1, and in the remaining region where the cooling manipulated value is greater than the nonlinear point Xc, the relationship between the virtual settling value and the cooling manipulated value may be approximated using an approximation line L2. That is, these two cooling characteristics (approximation lines L1 and L2) are defined as the relationships between the second manipulated value (cooling manipulated value) and the cooling capacity.

Figure 21:
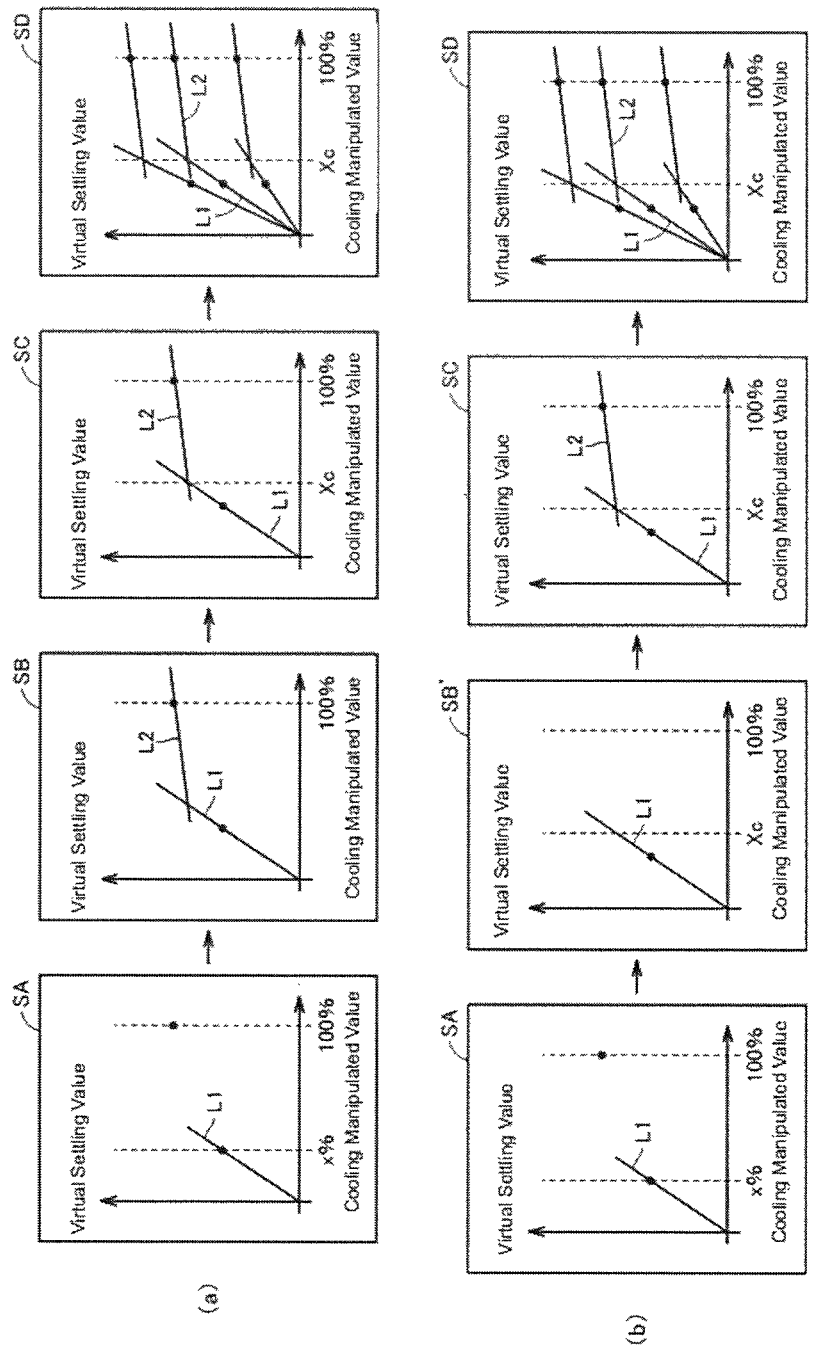
FIGS. 21A and 21B outline procedures for determining parameters in a cooling block in a controlled-device model according to one or more embodiments of the present invention.

FIGS. 21A and 21B outline procedures for determining parameters in a cooling block 420 in a controlled-device model 400 according to one or more embodiments of the present invention. FIG. 21A illustrates one method of determining the cooling characteristics. FIG. 21B illustrates another method of determining the cooling characteristics. The methods illustrated in FIG. 21A and FIG. 21B differ in how the nonlinear point Xc and the approximation line L2 are determined. All other procedures are identical.

The regulator 100 according to one or more embodiments of the present invention carries out auto-tuning taking into account the nonlinearity of the cooling characteristics. Once the regulator 100 completes auto-tuning, the PID parameters are determined at a given manipulated value x taking into account the nonlinear characteristics (step SA). At this point, the approximation line L1 is set at the same time. The details regarding auto-tuning taking into account the nonlinear characteristics is described later.

Next, in the method illustrated in FIG. 21A the approximation line L2 is set in relation to the approximation line L1 on the basis of the proportion of heat absorption due to the heat of vaporization versus the heat absorption due to water flow (step SB). At this point, the nonlinear point is determined from the intersection of the approximation line L1 and the approximation line L2. Whereas, in FIG. 21B the nonlinear point is first estimated (step SB'). The approximation line L2 is then determined estimated from the nonlinear point.

After executing step SB or SB', the cooling characteristics are determined at the temperature setting value SV for which auto-tuning was carried out (step SC). The cooling characteristics determined at this point include the non-linear point. That is, a first and a second cooling characteristic (the approximation lines L1 and L2) are determined for a temperature setting value SV in relation to a process value for a controlled device.

Subsequently, the cooling characteristics are determined for a plurality of temperature setting values near a temperature setting value SV (step SD). The cooling gain Kc(PV) can then be determined using a cooling characteristics determined in this manner.

Finally the deadtime Lc in the cooling block 420 may be determined from the results of the auto-tuning carried out by the regulator 100 similarly to determining the deadtime Lh in the heating block 410.

f4-1: Non-Linear Based Auto-Tuning

First, the auto-tuning carried out in one or more embodiments of the present invention and which takes into account the non-linear characteristics in the system is described.

Figure 22:
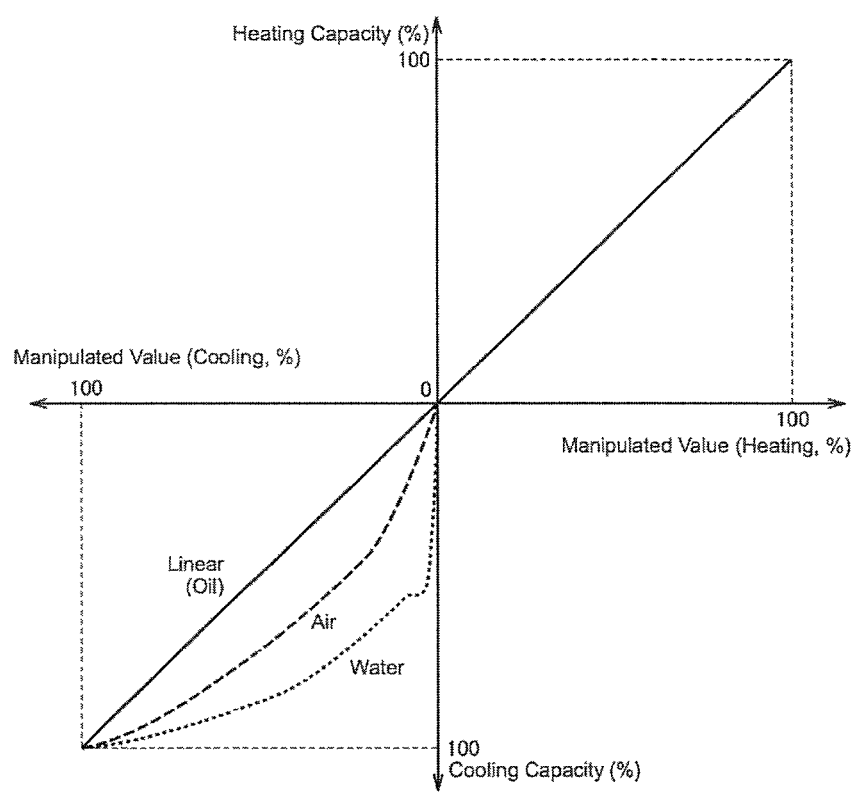
FIG. 22 illustrates example characteristics of the manipulated value in the controlled-device process illustrated in FIG. 3 in relation to the heating capacity and the cooling capacity respectively.

FIG. 22 illustrates a characteristic examples of the manipulated value in the controlled-device process illustrated in FIG. 3 together with the heating capacity and the cooling capacity. Here the terms "heating capacity" and "cooling capacity" are defined in the following manner.

Heating Capacity=Heating Temperature (° C./s) at a desired Manipulated Value/Maximum Heating Temperature (° C./s)×100%

Cooling Capacity=Cooling Temperature (° C./s) at a desired Manipulated Value/Maximum Cooling Temperature (° C./s)×100%

The heating characteristic (the relationship between the heating capacity and a given heating manipulated value) is substantially linear as illustrated in FIG. 22. That is, the heating characteristic may be considered linear. The heating characteristic is linear because the electric heater 214, functioning as the heating apparatus 210 may be supplied with current (power) proportional to the manipulated value to thereby control the heating value linearly.

In contrast, the cooling characteristic (the relationship between the cooling capacity for a cooling manipulated value) has different properties depending on the cooling medium that flows through the cooling pipe 222 making up the cooling apparatus 220. For example, when the cooling medium is an oil, the oil is stable because there is no phase transition; therefore, the cooling capacity is substantially linear in relation to the cooling manipulated value. That is, the cooling characteristic may be considered linear. In contrast, when water is used as the cooling medium or air is used as the cooling medium (air cooling), the cooling capacity is non-linear in relation to the cooling manipulated value.

In a water-cooling apparatus in particular, the heat of vaporization is relatively large when water changes from the liquid to the gaseous phase, and thus the cooling capacity is extremely large in a region where the resulting heat of vaporization is generated. Therefore, in cooling methods that use water (water-cooling), the effects of the heat of vaporization increase, thereby increasing the resulting nonlinear characteristics of the cooling capacity. This kind of water-cooling method does not facilitate understanding the characteristics of the cooling capacity in advance.

Should the typical auto-tuning be used to determine the PID parameters in such a feedback control system having strong nonlinear characteristics, the control performance of the system degrades. The following are reasons the control performance of this kind of system degrades.

Control performance degrades because the properties of the controlled device will differ from the properties intended if the manipulated values actually used diverge from the manipulated values generated during auto-tuning when carrying out feedback control with the PID parameters determined during auto-tuning.

Figure 23A:
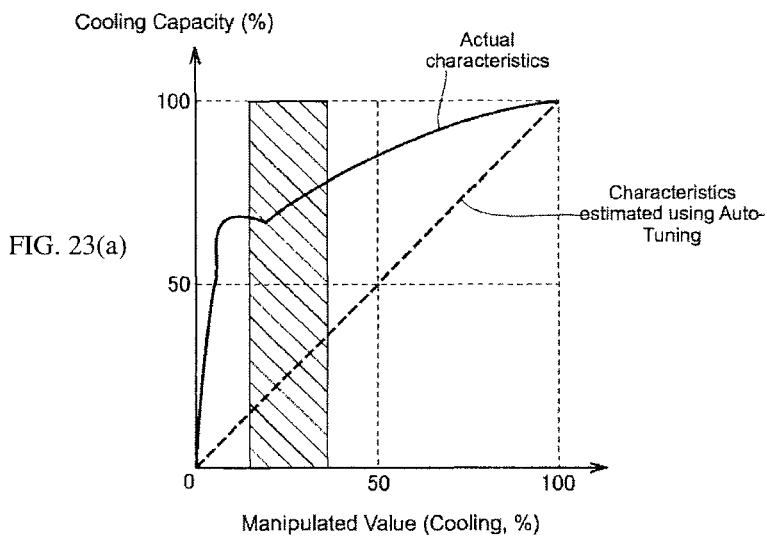
FIGS. 23A and 23B illustrate examples of the changes in the temperature (process value) over time in a controlled device subject to feedback control using a PID parameter determined using typical auto-tuning and the changes over time in the manipulated value.
Figure 23B:
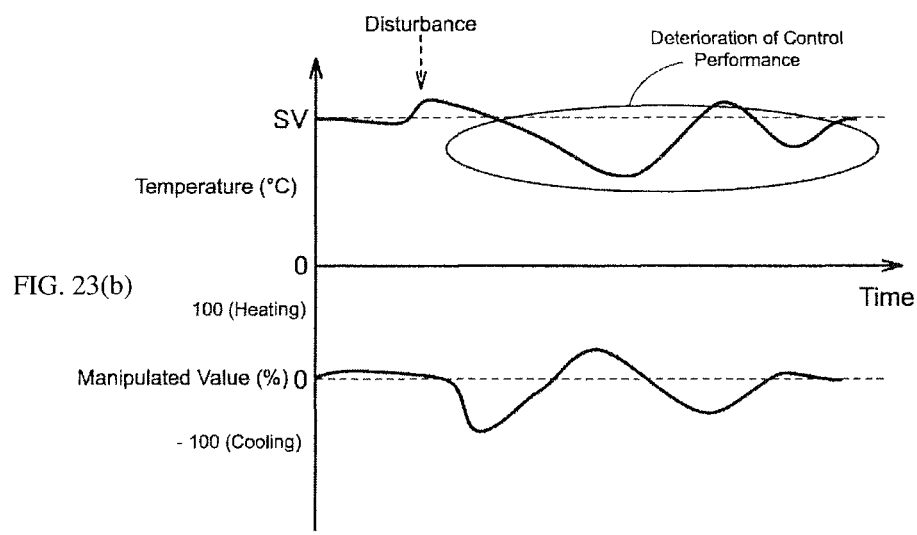

FIGS. 23A and 23B illustrate examples of the changes in the temperature (process value) over time in a controlled device subject to feedback control using a PID parameter determined using typical auto-tuning and the changes in the manipulated value over time.

For example, typical auto-tuning may estimate the characteristic represented by the dotted line in FIG. 23A. The PID parameter is determined in accordance with this estimated characteristic. However, there is a region in the actual characteristic where there is a gap between the actual characteristic and the estimated characteristic. As illustrated in FIG. 23B, when feedback control is carried out in a region where the manipulated value is relatively small, the actual characteristic diverges largely relative to the estimated characteristic. Thus when the real controlled device 230 is controlled using a relatively small manipulated value, the real cooling capacity is higher than the cooling capacity assumed from the PID parameter established through typical auto-tuning, leading to the situation where the real controlled device 230 is overcooled.

The auto-tuning performed in one or more embodiments of the present invention gradually changes the manipulated value used while searching for the size of the most favorable manipulated value. The PID parameter is then established on the basis of a response using the most favorable manipulated value.

More specifically, to auto-tune the control parameters the regulator 100 alternately outputs a first manipulated value (cooling manipulated value) and a second manipulated value (heating manipulated value), and each time the type of output is switched, the regulator 100 sequentially changes the size of the first manipulated value (the cooling manipulated value) and determines the PID parameter from the response acquired when a first change in a controlled value is determined to be linear in relation to the first manipulated value (cooling manipulated value). In other words, the regulator 100 gradually changes the cooling manipulated value while creating a plurality of limit cycles. On determining that the results in each limit cycle satisfy a predetermined criteria, the regulator 100 calculates the cooling PID parameter from the cooling characteristics (the response) at that point. Note that the heating PID parameter is also calculated from the heating characteristics (the response).

Figure 24:
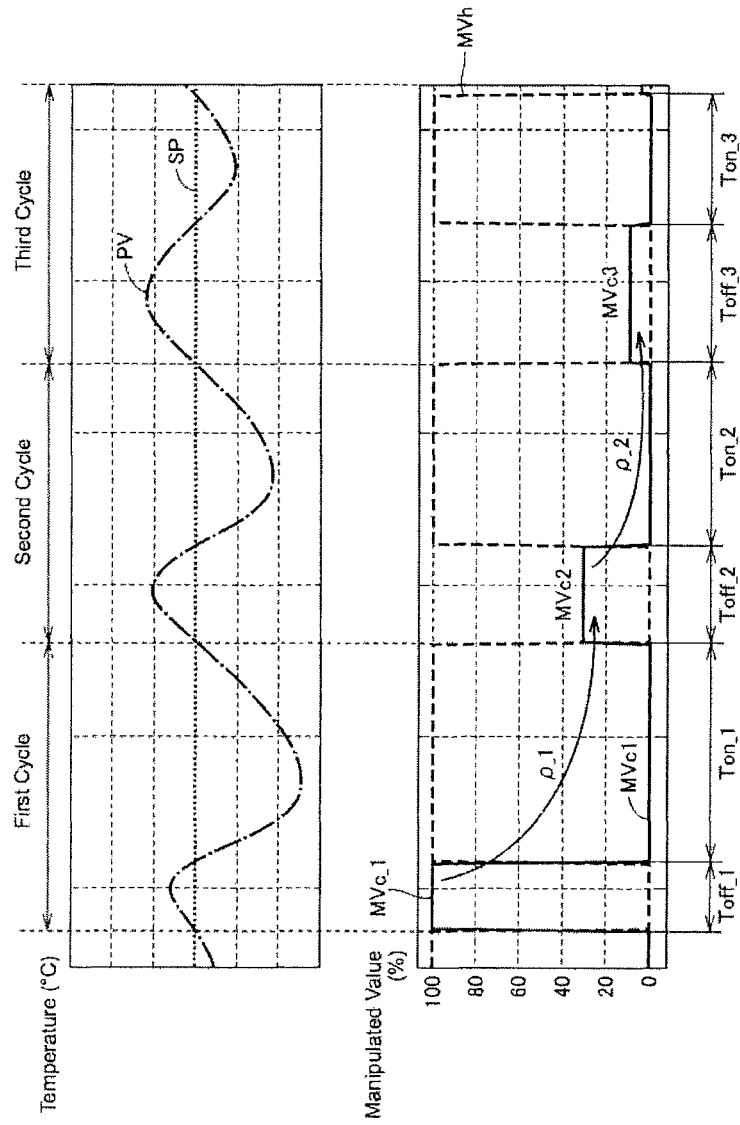
FIG. 24 illustrates an example curve a regulator according to one or more embodiments of the present invention creates during auto-tuning.
Figure 25:
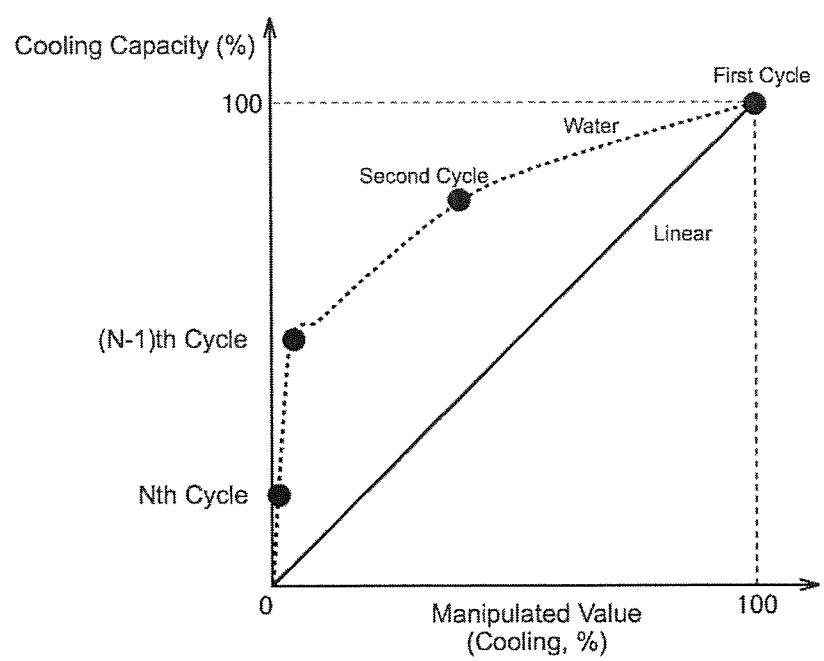
FIG. 25 illustrates the variations in the characteristic of the cooling capacity in relation to the manipulated value during auto-tuning by a regulator according to one or more embodiments of the present invention.

FIG. 24 illustrates an example curve a regulator 100 according to one or more embodiments of the present invention creates during auto-tuning. FIG. 25 illustrates the variations in the properties of the cooling capacity for a manipulated value due to auto-tuning by a regulator 100 according to one or more embodiments of the present invention.

Referring to FIG. 24, during auto-tuning the regulator 100 sequentially changes the size of the cooling manipulated value during each of the limit cycles. Note that if the control system contains a heating capacity that is nonlinear, the regulator may also sequentially change the size of the heating manipulated value.

More specifically, the regulator 100 sets the cooling manipulated value MVc to 100% during the first limit cycle, sets the cooling manipulated value MVc2 to $\rho\_1$ times the manipulated value MVc1 in the first limit cycle, and sets the cooling manipulated value MVc3 to $\rho\_2$ times the manipulated value MVc2 in the second limit cycle. The regulator 100 changes the cooling manipulated value MVc in each limit cycle as follows in the same manner. Thus, by sequentially changing the cooling manipulated value MVc in this manner, the size of the cooling capacity taken into account during auto-tuning changes sequentially as illustrated in FIG. 25.

While here, the change coefficient $\rho\_1$ ($0<\rho\_i<1$) selected for the cooling manipulated value MVc is a predetermined fixed value, the value of a new cooling manipulated value MVc that is alternately output may be determined from a response acquired from the cooling manipulated value MVc alternately output immediately prior thereto. One or more embodiments of the present invention uses the following ratios expressing a system gain ratio (capacity ratio) between the heating and cooling; this is one example of using the response from an immediately preceding alternating output.

Change Coefficient $\rho\_i$=Cooling Output Time $Toff\_i-1$/Heating Output Time $Ton\_i-1$ Where, the cooling output time $Toff\_i-1$ represents the length of time during the (i−1)th (previous) limit cycle that the cooling manipulated value MVc is estimated to be the value 0, and the heating output time $Ton\_i-1$ represents the length of time during the (i−1)th (previous) limit cycle that the cooling manipulated value MVc is output (refer to FIG. 25).

At this point, depending on the relationship between the size of the cooling output time $Toff\_i-1$ and the heating output time $Ton\_i-1$, the change coefficient $\rho\_i$ may exceed the 1; therefore, according to one or more embodiments of the present invention, the change coefficient $\rho\_i$ is limited to be no more than a change-coefficient upper limit $\rho\_{max}$.

In this manner, to auto-tune the control parameters the regulator 100 revises the size of the first manipulated value in any immediately preceding alternating output depending on the length of time (cooling output time Toff) the first manipulated value (cooling manipulated value) and the length of time (heating output time Ton) the second manipulated value (heating manipulated value) are output during the immediately preceding alternating output, to thereby determine the size of a new first manipulated value for alternating output.

Next, the above-described sort of search for the most favorable cooling manipulated value MVc by gradually changing the value thereof may be terminated when it is determined that the manipulated values in a region are linear within the cooling characteristic (i.e., the relationship between the cooling manipulated value and the cooling capacity is linear). Here, to auto-tune the control parameters the regulator 100 evaluates the relationship between the size of a first manipulated value (cooling manipulated value) changed sequentially and the speed of change in a controlled value corresponding to the first manipulated value for the different sizes of the first manipulated value to thereby determine whether or not a first change in the controlled value is linear in relation to the first manipulated value.

More specifically, the linearity within the cooling characteristic is evaluated using the kind of error described below. That is, the criteria for ending limit cycle generation include the calculated error being no more than a predetermined threshold.

The PID parameters may be calculated on the basis of the cooling characteristics and the heating characteristics (responses) measured during the final limit cycle using the limit sensitivity method proposed by Ziegler and Nichols. Note that any desired known method may be used to calculate the PID parameters.

However, conceivably there are cases where the error calculated never falls below the predetermined threshold due to the properties of the control system, and therefore, the creation of limit cycles may be terminated when the number of limit cycles generated reaches some upper limit (N). In other words, auto-tuning in the regulator 100 may involve determining the PID parameters from the responses acquired during the final alternating output when the first manipulated value and the second manipulated valued are output a predetermined number of times, even when the first change in the controlled value is not determined as linear in relation to the first manipulated value (cooling manipulated value).

Thus, suitable PID parameters may be calculated on adopting this kind of auto-tuning method regardless of whether the controlled device is has linear or nonlinear properties. For instance, there is no need to change the auto-tuning procedure, for instance, depending on the type of cooling medium (water, or oil) in the control system illustrated in FIG. 1.

Figure 26:
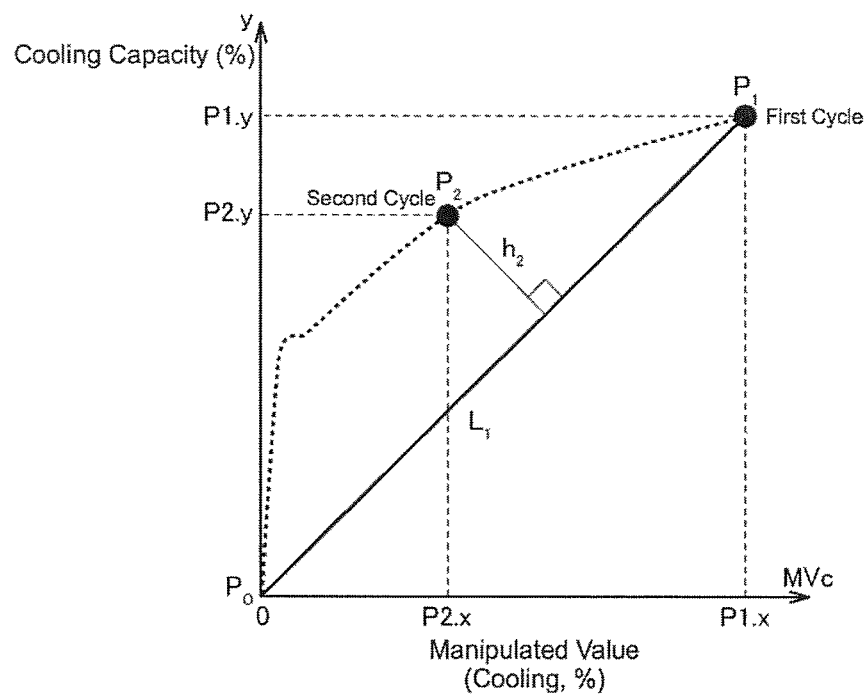
FIG. 26 is a diagram for explaining how a regulator according to one or more embodiments of the present invention evaluates an error during auto-tuning.

Next is described how an error is used to determine whether or not the manipulated value falls within a region with linear properties. FIG. 26 is a diagram for explaining how a regulator 100 according to one or more embodiments of the present invention evaluates an error during auto-tuning. As illustrated in FIG. 26, the term "error" in one or more embodiments of the present invention are equivalent to a value representing the degree to which a cooling capacity corresponding to the manipulated value used in the current limit cycle is distant relative to a straight line defined by the cooling capacity corresponding to the manipulated value used in the previous limit cycle within a cooling characteristic (the relationship of a cooling capacity relative to a cooling manipulated value).

In practical terms, as illustrated in FIG. 6 with the origin as P0, a cooling capacity point in the i-th limit cycle is defined as Pi (Pi.x, Pi.y). Here, Pi.x represents a cooling manipulated value, and Pi.y represents a cooling capacity. The cooling capacity Pi.y is further calculated from a proportion of the slope Ri of a decreasing temperature during the i-th limit cycle in relation to a slope R1 (rate of change) of a decreasing temperature during the first limit cycle. A straight line Li is created to connect the cooling capacity Pi and the origin P0 for all limit cycles 1 to i. An error hi is calculated as the distance between a line L(i−1) and the i-th cooling capacity Pi (Pi.x, Pi.y). That is, the distance calculated serves as the error, which is an index for determining the linearity in the i-th limit cycle. FIG. 26 illustrates an example of calculating an error h2 in the second limit cycle.

f4-2: Determining the Cooling Characteristic (Case 1)

Next is described the process for setting the approximation line L2 in relation to the approximation line L1 on the basis of the proportion of heat absorption due to the heat of vaporization versus the heat absorption due to water flow (step SB in FIG. 21A). As above described, the approximation line L1 represents the cooling characteristic primarily attributed to the heat of vaporization, and the approximation line L2 represents the cooling characteristic primarily attributed to heat absorption through water flow.

Figure 27:
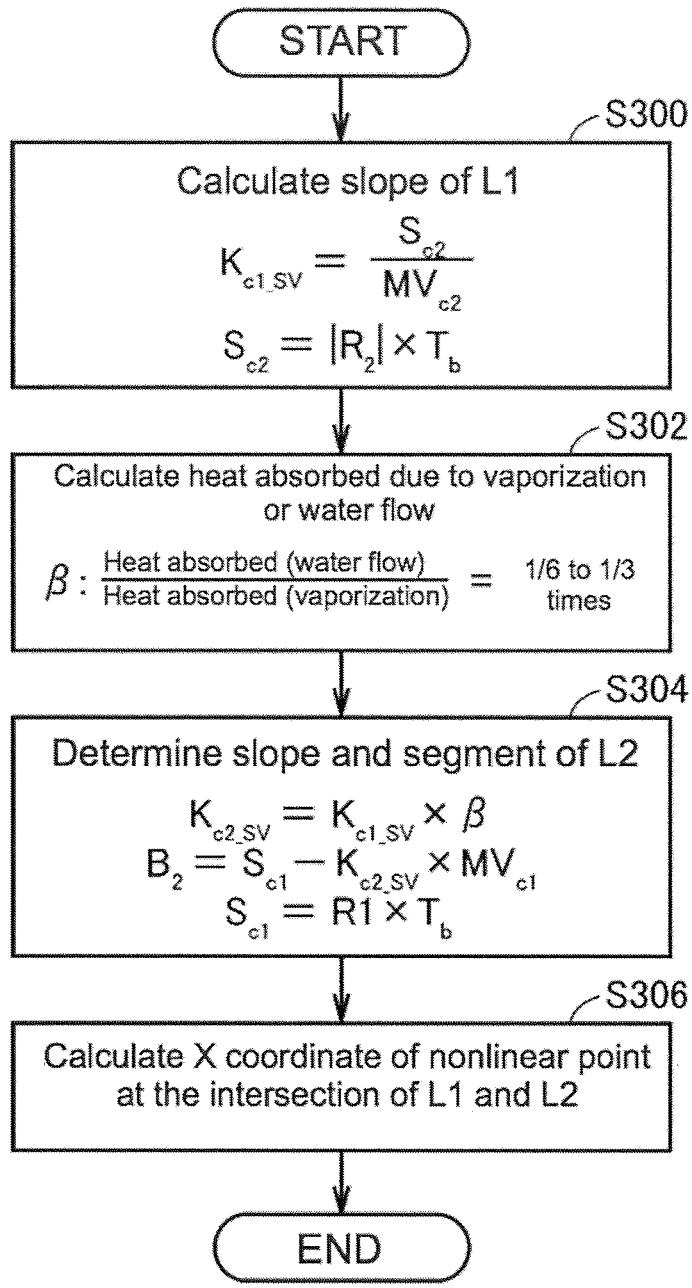
FIG. 27 is a flowchart illustrating a procedure for determining a cooling characteristic on the basis of a proportion of the heat absorption due to heat from vaporization and the heat absorption due to water flow.
Figure 28A:
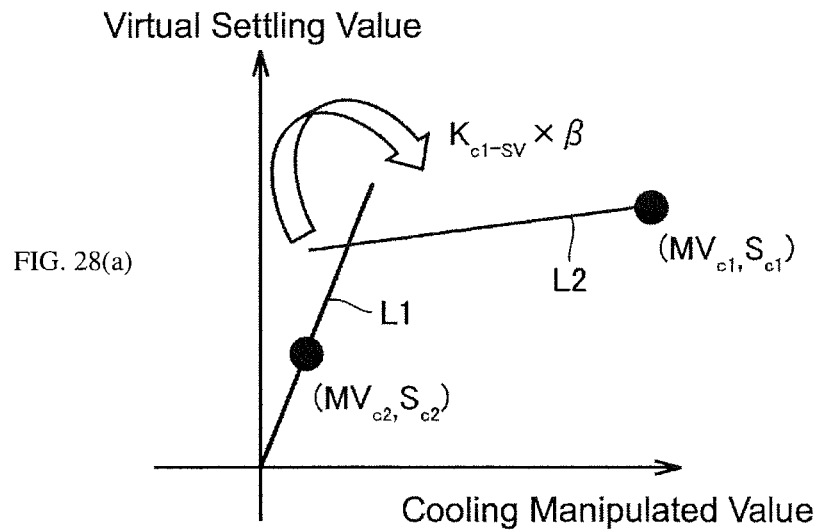
FIGS. 28A and 28B include diagrams outlining a process for determining a cooling characteristic on the basis of the procedure illustrated in FIG. 27.
Figure 28B:
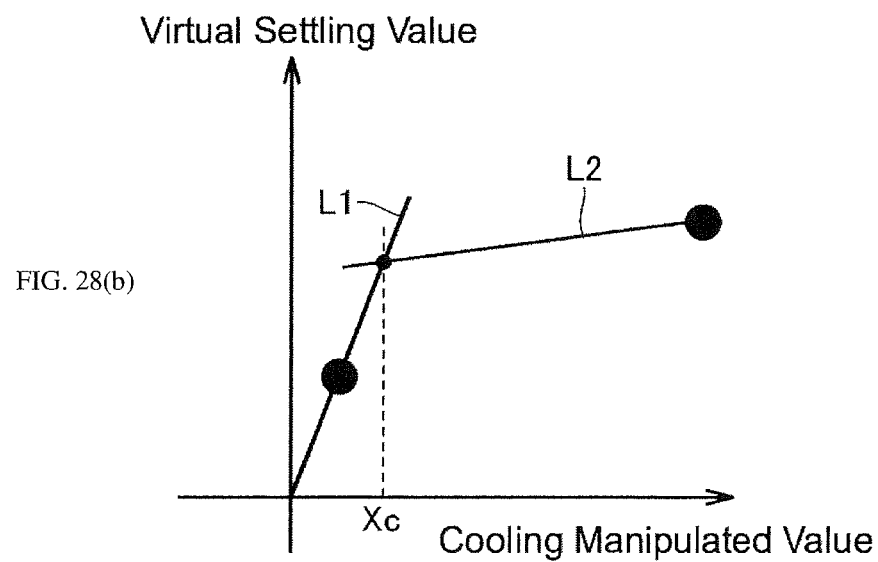

FIG. 27 is a flowchart illustrating a procedure for determining a cooling characteristic on the basis of a proportion of the heat absorption due to heat from vaporization and the heat absorption due to water flow. FIGS. 28A and 28B include diagrams outlining a process for determining a cooling characteristic on the basis of the procedure illustrated in FIG. 27. Although the cooling manipulated value illustrated in FIG. 28 is usually defined as a negative value, the value is represented reversed for the convenience of explanation.

Referring to FIG. 27 and FIG. 28, the slope of the approximation line L1 is first determined (step S300). That is, the slope $K_{cl\_SV}$ of the approximation line L1 is calculated using the following Formula (16).

$$K_{cn\_SV} = Scn/MV_{cn} \quad (16)$$

where,

MVcn=cooling manipulated value MVcn (%) during the n-th limit cycle

Scn=virtual settling value (° C.) for the cooling manipulated value MVcn during the n-th limit cycle Here Scn is calculated according to the following Formula (17).

$$Scn = |Rn| \times Tb \quad (17)$$

where,

Rn=slope corresponding to cooling manipulated value MVcn during the n-th limit cycle Tb=cylinder-response time constant FIG. 28A illustrates an example where two limit cycles are created during auto-tuning. That is, during the first limit cycle the cooling manipulated value MVc1 is output to determine the virtual settling value Sc1, and during the second limit cycle, the cooling manipulated value MVc2 is output to determine the virtual settling value Sc2. In this example, the above described Formula (16) and Formula (17) respectively become the following.

$$K_{cl\_SV} = Sc2/MVc2 \quad (16')$$

$$Sc2 = |R2| \times Tb \quad (17')$$

A ratio β is the proportion of the heat absorption due to water flow and the heat absorption due to the heat of vaporization. The ratio β may be calculated according to the following Formula (18).

$$\beta = \frac{\text{(Heat absorption due to water flow)}}{\text{(Heat absorption due to vaporization)}} \quad (18)$$

$$= 1/6 \text{ to } 1/3$$

Note that the ratio β may change dynamically in accordance with the temperature of the cooling medium, or may be a predetermined fixed value. When the cooling medium is water, when the water temperature ranges from 10 to 20°

C., the ratio β is roughly 1/3, and when the water temperature is from 50 to 60° C., β is roughly 1/6.

Using the ratio β determined, a slope $K_{c2\_SV}$ for the approximation line L2 and the segment B2 is determined (step S304). That is, as illustrated in FIG. 28A, the slope $K_{c2\_SV}$ of the approximation line L2 may be determined by multiplying the slope $K_{c1\_SV}$ of the approximation line L1, β times.

In more concrete terms, the slope $K_{c2\_SV}$ of the approximation line L2 may be calculated using the following Formula (19). Furthermore, the segment B2 of the approximation line L1 may be calculated according to the following Formula (20), because the approximation line L1 passes through the coordinate (MVc1, Sc1). Here, the virtual settling value Sc1 in the first limit cycle is calculated according to the following Formula (21) using the slope R1 corresponding to the cooling manipulated value MVc1 during the aforementioned limit cycle and the cylinder-response time constant Tb.

$$K_{c2\_SV} = K_{c1\_SV} \times \beta \tag{19}$$

$$B2 = Sc1 - K_{c2\_SV} \times MVc1 \tag{20}$$

$$Sc1 = R1 \times Tb \tag{21}$$

Thus, the approximation lines L1 and L2 may be determined using the above procedures. As illustrated in FIG. 28B, the intersection point of the approximation line L1 and the approximation line into determined as described above is taken as the nonlinear point Xc. The parameters in the cooling block 420 may determined using the nonlinear point Xc in accordance with the procedures described hereafter.

f4-3: Determining the Cooling Characteristic (Case 2)

Next is described another process for determining the cooling characteristic, where, in addition to estimating the nonlinear point, the approximation line L2 is determined from the approximation line L1 (FIG. 21A, step SB').

Figure 29:
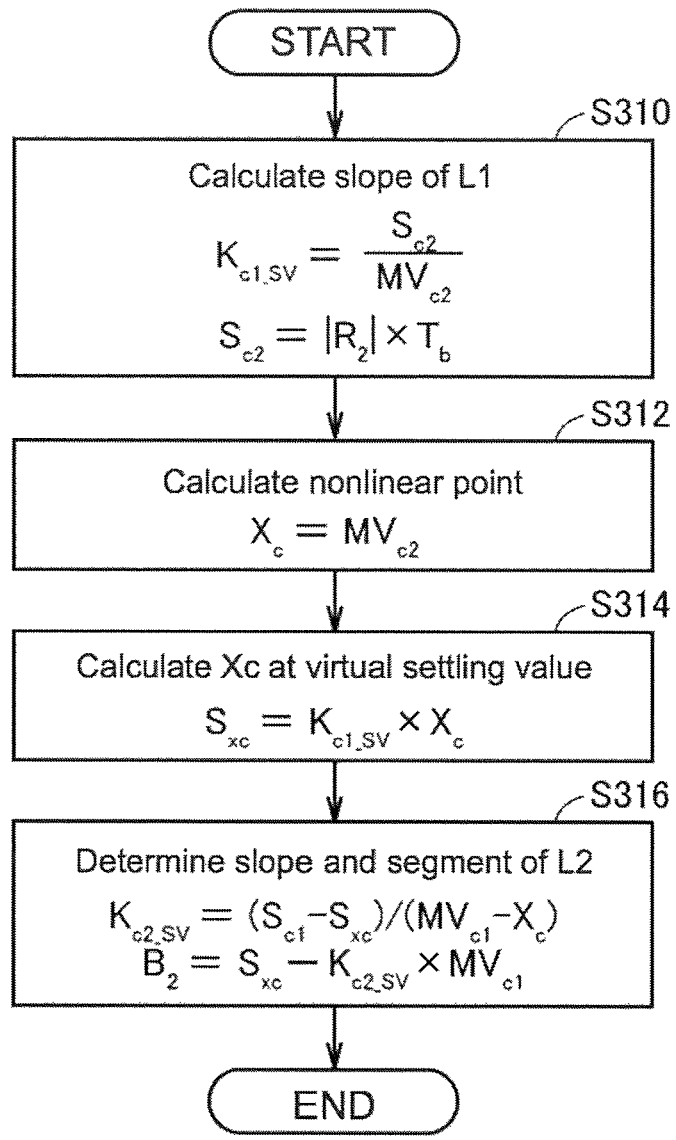
FIG. 29 is a flowchart illustrating a procedure for determining a cooling characteristic by estimating a nonlinear point.

FIG. 29 is a flowchart illustrating a procedure for determining a cooling characteristic by estimating a nonlinear point. FIGS. 30A-30B are diagrams for outlining the process for determining a cooling characteristic on the basis of the processing sequence illustrated in FIG. 29. Although the cooling manipulated value illustrated in FIGS. 30A-30B is usually defined as a negative value, the value is represented reversed for the convenience of explanation.

Referring to FIG. 29 and FIGS. 30A-30B, the slope of the approximation line L1 is first determined (step S320). That is, similar to Case 1, the slope $K_{c1\_SV}$ of the approximation line L1 is calculated using the above-described Formula (16).

The nonlinear point Xc is determined next (step S312). More specifically, the nonlinear point Xc is calculated according to the following Formula (22).

$$Xc = MVc2 \tag{22}$$

That is, as illustrated in FIG. 30A, the cooling manipulated value MVc2 in the second limit cycle is taken as the nonlinear point Xc. In other words, the region less than the manipulated value MVc2 is considered the nonlinear region. Next, a virtual settling value Sxc is set at the nonlinear point Xc. More specifically, the virtual settling value Sxc is calculated according to the following Formula (23) using the slope $K_{c1\_SV}$ of the approximation line L1.

$$Sxc = K_{c1\_SV} \times Xc \tag{23}$$

Finally, a slope $K_{c2\_SV}$ for the approximation line L2 and the segment B2 is determined (step S316). More specifically, the slope $K_{c2\_SV}$ of the approximation line L2 may be calculated according to the following Formula (24-1), and the segment B2 of the approximation line L2 may be calculated according to the following Formula (24-2).

$$K_{c2\_SV} = (Sc1 - Sxc)/(MVc1 - Xc) \tag{24-1}$$

$$B2 = Sxc - K_{c2\_SV} \times MVc1 \tag{24-2}$$

Figures 31A, 31B:
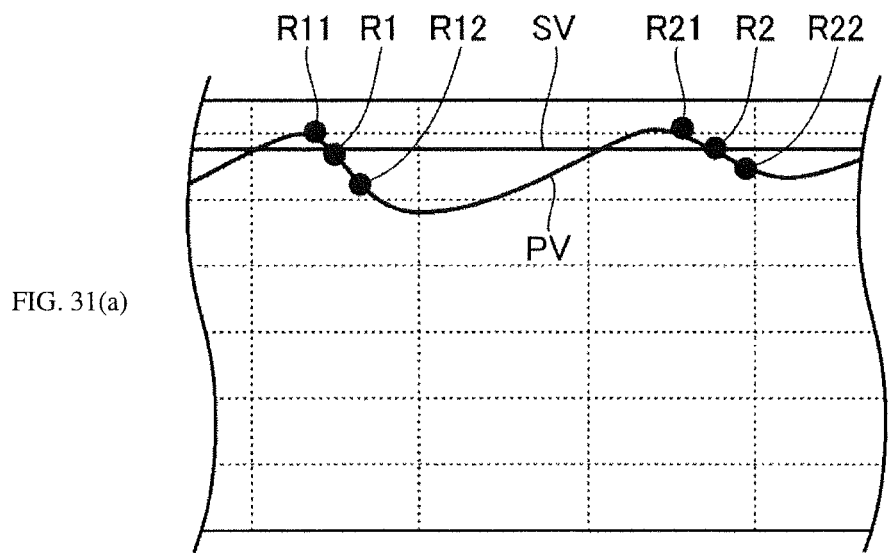
FIGS. 31A and 31B include diagrams for explaining a process for determining a cooling characteristic at temperatures near a temperature setting value.
Figure 32:
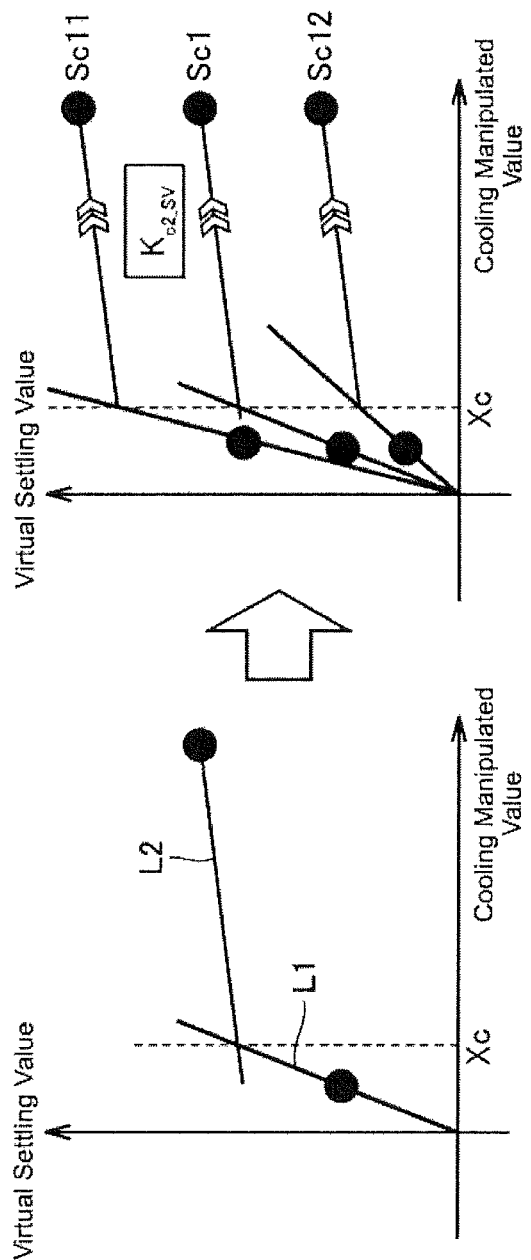
FIG. 32 is a diagram for explaining a process for determining a cooling characteristic at temperatures near the temperature setting value.

That is, as illustrated in FIG. 30B, the approximation line L2 is determined to pass through the nonlinear point Xc Thus, the approximation lines L1 and L2 may be determined using the above procedures. The parameters in the cooling block 420 may be determined using the approximation lines L1 and L2 in accordance with the procedures described hereafter.

f4-4: Determining the Cooling Characteristics at Temperatures Near the Temperature Setting Value SV The approximation lines L1 and L2 determined with the above procedures by the cooling characteristics at a temperature setting value SV. Next, the process for determining the cooling characteristics at temperatures near a temperature setting value SV is described. FIG. 31A, FIG. 31B, and FIG. 32 are diagrams for explaining a process for determining the cooling characteristics for temperatures near a temperature setting value.

Referring to FIG. 31A, the overshoot or undershoot generated during auto-tuning are used to acquire a slope Rn of a response at a temperature as far from the temperature setting value as possible to determine the cooling characteristics at temperatures near a temperature setting value. The slopes R acquired are used to calculated the virtual settling values Scn at a cooling manipulated value MVcn during an n-th limit cycle according to the following Formula (25).

$$Scn = Rn \times Tb \tag{25}$$

In the example illustrated in FIG. 31, in the first limit cycle (where the cooling manipulated value=100%), R11 is the slope of the response at temperatures higher than the temperature setting value SV, and R12 is the slope of the response at temperatures lower than the temperature setting value SV. Furthermore, in the second limit cycle (where the cooling manipulated value=x %; x<100%), R21 is the slope of the response at temperatures higher than the temperature setting value SV, and R22 is the slope of the response at temperatures lower than the temperature setting value SV.

FIG. 32 illustrates the results of estimating a relationship between this virtual settling values Sc11 and Sc12 and the cooling manipulated value from a relationship between the virtual settling value Sc1 and the cooling manipulated value (i.e., from reference models approximated with the approximation lines L1 and L2 respectively). The models of the virtual settling values Sc11 and Sc12 are computed from the slopes R11 and R12 respectively.

The slope $K_{c2\_SV}$ of the approximation line L2 is the same for both of the virtual settling values near the temperature setting value SV. The nonlinear point Xc is also identical to the nonlinear point Xc in the reference model. Whereas, as described in relation to the above mentioned Formula (8), the size of the segment of the nonlinear point Xc changes proportionally with respect to the temperature difference between the temperature used to calculate each of the slopes R and the temperature in the reference model.

Models are estimated for the virtual settling values Sc11 and Sc12 using these relationships. Additionally, the amount of change A for a segment of the approximation line L2 represented by the Formula (8), and the segment B0 of the approximation L2 to may be determined by applying a feedback method (e.g., the least-squares method) to the plurality of characteristics illustrated in FIG. 32.

When it is clear that a slope calculated using overshoot or the undershoot in the response in unusable, such a slope may be excluded. For instance, a result may be taken as logically incorrect due to the incorporation of an error or the like when the virtual settling value Sc11 corresponding to a slope R11 of a response at a greater temperature than the temperature setting value SV exceeds the virtual settling value Sc1 in the reference model. In other words, this kind of information may be excluded because the virtual settling value Sc11 would never exceed the virtual settling value Sc1.

As above described, determining the different cooling characteristics for a temperature setting value SV involves: calculating the slopes of process-value time variances at different process values for the temperature setting value (i.e. calculating slopes R11, R12, R21, R22 of a response) on the basis of the process-value time variance generated in the real controlled device 230 by varying a second manipulated value (cooling manipulated value) over time; determining a second cooling characteristic (approximation line L2 for virtual settling values Sc11, SC12) for the different process values for the temperature setting value by shifting the direction of the cooling capacity (virtual settling value) to shift the second cooling characteristic (approximation line L2) for the temperature setting value in accordance with a reference slope (slope R1 of the response) which is the slope of the process-value time variance when the process value matches the temperature setting value, and the slope of the process-value time variance (e.g., slopes R11, R12, R21, R22 of the response) at the different process values for the temperature setting value SV; and determining a first cooling characteristic (approximation line L2 for the virtual settling values Sc11, Sc12) for the different process values for the temperature setting value at a nonlinear point Xc such that the first cooling characteristic connects to the second cooling characteristic for the different process value for the temperature setting value.

Thus, the cooling characteristic may be determined using the above procedures with the approximation lines L1 and L2. Namely, the parameters in the cooling block 420 that establishes the cooling characteristics used for setting the cooling gain Kc(PV) may be determined using the above procedures. That is, the slope Kc2 of the approximation line L2, the amount of change A in a segment of the approximation line L2, and a segment B0 on the approximation line L2 at a reference temperature (usually, 100° C.) are determined. During a simulation, the parameters are used to determine a cooling characteristic responsive to the temperature PV, as well as to continuously determine the cooling gain Kc(PV) responsive to the manipulated value MV. The details therefor are described later.

f4-5: Determining the Deadtime (Lc)

The deadtime Lc in the cooling block 420 may also be determined from the auto-tuning results.

Figure 33:
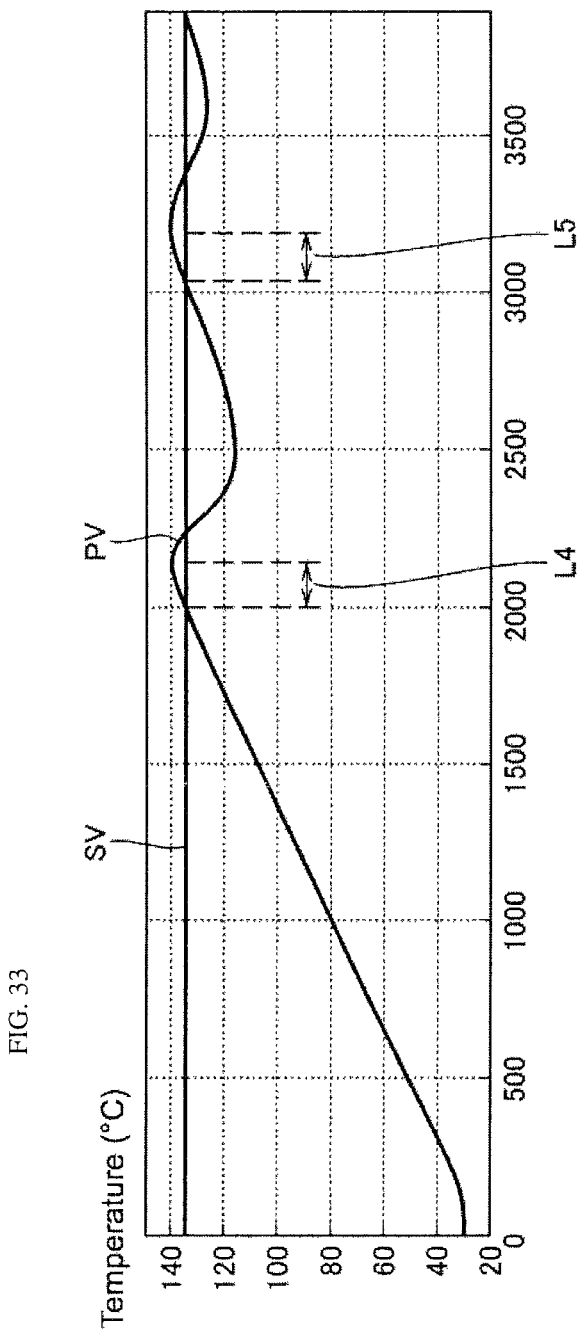
FIG. 33 is a diagram for explaining how a regulator according to one or more embodiments of the present invention determines deadtime in the cooling block from auto-tuning results.

FIG. 33 is a diagram for explaining how a regulator 100 according to one or more embodiments of the present invention determines the deadtime Lc in the cooling block 420 from auto-tuning results. FIG. 33 illustrates an example of using a single auto-tuning result to determine two kinds of deadtime Lh. When using a single auto-tuning result to determine multiple deadtimes, any one of the deadtimes may be selected, or the plurality of deadtimes statistically process to determine a representative value therefor. The statistical processing may involve, for instance, calculating an average value from the plurality of deadtimes, or calculating a mean value from the plurality of deadtimes. Basically, any desired method may be used to calculate the deadtime Lh in the heating block 410.

The deadtime signifies the delay between the entry of a condition requiring the manipulated value to change until the manipulated value changes. Therefore, the deadtimes L4 and L5 illustrated in FIG. 33 are equivalent to the time needed from the time the temperature PV exceeds the temperature setting value SV due to a heating operation until the temperature PV starts decreasing. That is, although the drop in the temperature PV below the temperature setting value SV initiates output of a cooling manipulated value, there is some kind of delay until information on the temperature in the cylinder 236 is real, and this delay is equivalent to the deadtime Lh.

f5: Procedure for Determining Parameters

Next is described a procedure for determining the parameters in the above controlled-device model 400. The results obtained from auto-tuning carried out by the regulator 100 are used in parameter determination. In a generic embodiment the regulator 100 carries out auto-tuning and collects the responses generated during the auto-tuning. The information processing device 300 uses the responses collected by the regulator 100 during auto-tuning to determine the parameters in the controlled-device model 400. However, a logging device may be provided independent of the regulator 100 for collecting the responses. Moreover, in addition to being configured to collect the responses, the regulator 100 may be configured to identify the parameters in the controlled-device model 400.

For the sake of convenience, the following flowcharts used in the description provide an example of the procedures the information processing device 300 carries out when identifying the parameters in the controlled-device model 400.

Figure 34:
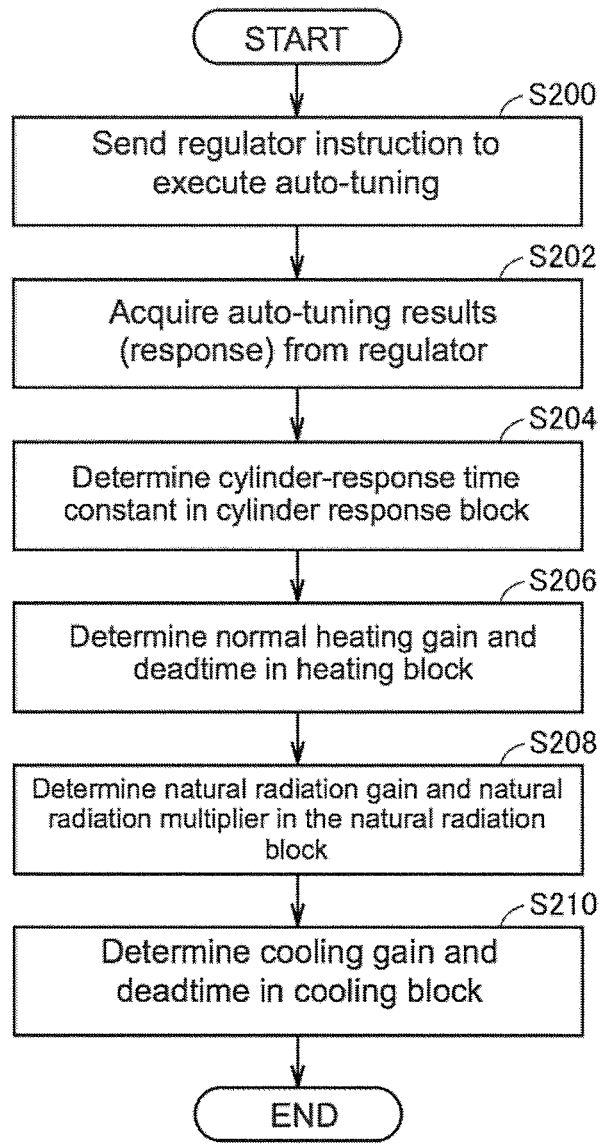
FIG. 34 is a flowchart illustrating a procedure for determining the parameter in a controlled-device model according to one or more embodiments of the present invention (Case 2).

FIG. 34 is a flowchart representing a procedure for determining parameters in a controlled-device model 400 according to one or more embodiments of the present invention (Case 2). The processor 302 in the information processing device 300 may run the device model building program 322 to implement each of the steps illustrated in FIG. 34.

Referring to FIG. 34, the processor 302 in the information processing device 300 directs the regulator 100 to carry out auto-tuning. The regulator 100 then starts auto-tuning according to the instruction received. The auto-tuning procedures carried out by the regulator 100 are described later with reference to FIG. 35. The processor 302 then acquires the auto-tuning results (response wave) from regulator 100 (step S202).

If at this point the regulator 100 is already carrying out auto-tuning, there is no need to restart the process; the processor 302 obtains the auto-tuning results available.

Next, the processor 302 determines the cylinder-response time constant Tb in the cylinder response block 440 (step S204). More specifically, the processor 302 calculates a maximum slope Rh for the temperature PV during temperature rise after auto-tuning starts, and uses the settling manipulated value $MV_{h\_SV}$ after auto-tuning ends, and the temperature PV (equivalent to the ambient temperature Tha) during startup of auto-tuning to estimate the cylinder-response time constant Tb.

The processor 302 then determines the normal heating gain Kh and the deadtime Lh in the heating block 410 (step S206). More specifically, the processor 302 extracts a plurality of temperatures while the temperature PV is increasing after auto-tuning starts, and calculates the maximum slope corresponding to each of the temperatures extracted. The processor 302 then uses the combination of the extracted temperature and the corresponding maximum slope to calculate the respective normal gains, and then determines a value for the normal heating gain Kh from the normal gains calculated. Additionally, the processor 302 uses the auto-tuning response to determine the deadtime Lh.

The processor 302 then determines the natural radiation gain Ka and the natural radiation exponent a in the natural radiation block 430 (step S208). More specifically, the processor 302 uses the different normal gains calculated for each temperature when determining the parameters in the heating block 410 to calculate a settling manipulated value at each of the temperatures. The processor 302 then calculates a natural radiation value at each of the temperatures from the settling manipulated values, and then determines the natural radiation gain Ka and the natural radiation exponent $\alpha$ using a feedback method.

Finally, the processor 302 determines a cooling gain Kc(PV) and a deadtime Lc in the cooling block 420 (step S210). More specifically, the processor 302 uses the non-linear point Xc estimated as a result of the auto-tuning to calculated to types of approximation lines (i.e., an approximation line a cooling characteristic primarily resulting from the heat of vaporization, and an approximation line representing a cooling characteristic primarily resulting from heat absorption due to water flow). The processor then determines the cooling gain Kc(PV) in the cooling block 420 from two types of approximation lines calculated. Additionally, the processor 302 uses the auto-tuning response to determine the deadtime Lc.

The above procedure allows determination of the parameters required to build the controlled-device model 400.

f6: The Auto-Tuning Process

Next, an auto-tuning procedure executed by a regulator 100 according to one or more embodiments of the present invention is described.

Figure 35:
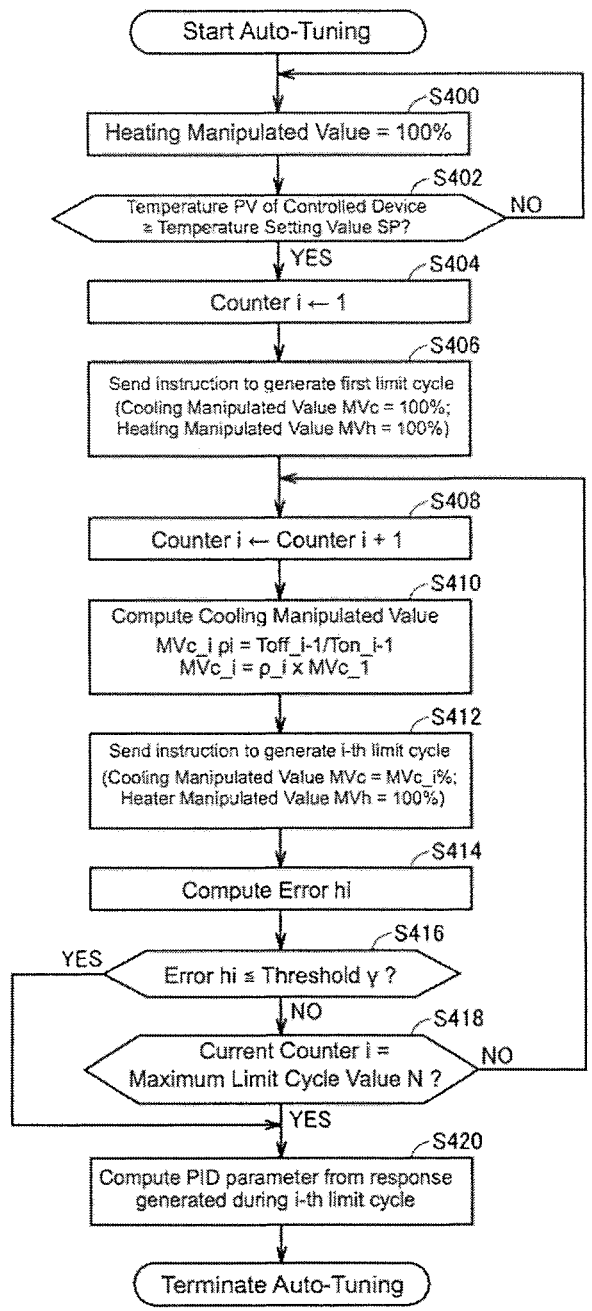
FIG. 35 is a flowchart illustrating an auto-tuning procedure executed in a regulator according to one or more embodiments of the present invention.

FIG. 35 is a flowchart illustrating an auto-tuning procedure executed by a regulator 100 according to one or more embodiments of the present invention. The CPU 112 in the regulator 100 may run a program module 118 containing command codes and is stored in the FlashROM 114 to implement each of the steps illustrated in FIG. 35. The procedures illustrated in FIG. 35 are repeatedly executed for a predetermined computational cycle (e.g., every 100 ms) once the regulator receives the instruction to start auto-tuning.

Referring to FIG. 35, the CPU 112 outputs a heating manipulated value of 100% (step S400), and assesses whether or not the temperature PV measured from the controlled-device process 200 (controlled-device temperature) has reached an established target value (temperature setting value, SV)(step S402). If the temperature PV of the controlled device has not reached the temperature setting value SV (NO, at step S402), the processing after step S400 is repeated.

If the temperature PV of the controlled device has reached the temperature setting value SV (YES, at step S402), the processing continues from step S404. The processing instep S400 and S102 are preliminary processing which generates the limit cycles used during auto-tuning.

The CPU 112 sets the counter i to the value 1 (step S404), and sends an instruction to generate the first limit cycle (step S406). The counter i represents the number of limit cycles. The cooling manipulated value, and the heating manipulating value are both 100% in the first limit cycle. The instruction to generate a limit cycle initiates a series of processes which output the cooling manipulated value (in this case, 100%) until the temperature PV of the controlled device is equal to the temperature setting value SV, and, once the temperature PV of the controlled device is equal to the temperature setting value SV, outputs the heating manipulated value (in this case, 100%).

Once the generation of the first limit cycle block is complete, the CPU 112 increments the counter i by 1 (step S408). The CPU 112 then uses the cooling output time Toff_i−1 and the heating output time Ton_i−1 for the cooling manipulated value in the previous limit cycle to compute the change coefficient $\rho\_i$ (=Toff_i−1/Ton_i−1), and uses the change coefficient $\rho\_i$ calculated to calculate the current cooling manipulated value MVc (=MVc_i−1×$\rho$_i) (step S410).

Subsequently, the CPU 112 directs the generation of the i-th limit cycle (step S412). The cooling manipulated value during the i-th limit cycle is set to MVc_i, and the heating manipulated value MVh is set to 100%. The instruction to generate a limit cycle is a series of processes which output the cooling manipulated value (in this case, MVc_i %) until the temperature PV of the controlled device is equal to the temperature setting value SV and, once the temperature PV of the controlled device is equal to the temperature setting value SV, outputs the heating manipulated value (in this case, 100%). The CPU 112 then computes an error hi from the current cooling characteristic (response) and the previous cooling characteristic (response) (step S414).

Hereafter the CPU 112 determines whether or not the error hi calculated exceeds a threshold $\gamma$ (step S416). When the error hi exceeds the threshold $\gamma$ (NO, at step S416), the CPU 112 determines whether or not the current value of the counter i equals the maximum number of limit cycles N (step S418).

If the current value of the counter i does not equal the maximum number of limit cycles N (NO, at step S418), then the CPU 112 continues processing from step S408).

However, if the error hi calculated is less than or equal to the threshold $\gamma$ (YES, at step S416), or the current value of the counter i equals the maximum number of limit cycles N (YES, at step S418), the CPU 112 then computes the PID parameters from the response during the i-th limit cycle (step S420). Processing then terminates.

The PID parameters in the regulator 100 are thus determined with such a procedure.

G. SYSTEM APPLICATION

An example of an application implemented in a system made up of the regulator 100 and the information processing device 300 is described next.

g1: System Configuration

Figure 36B:
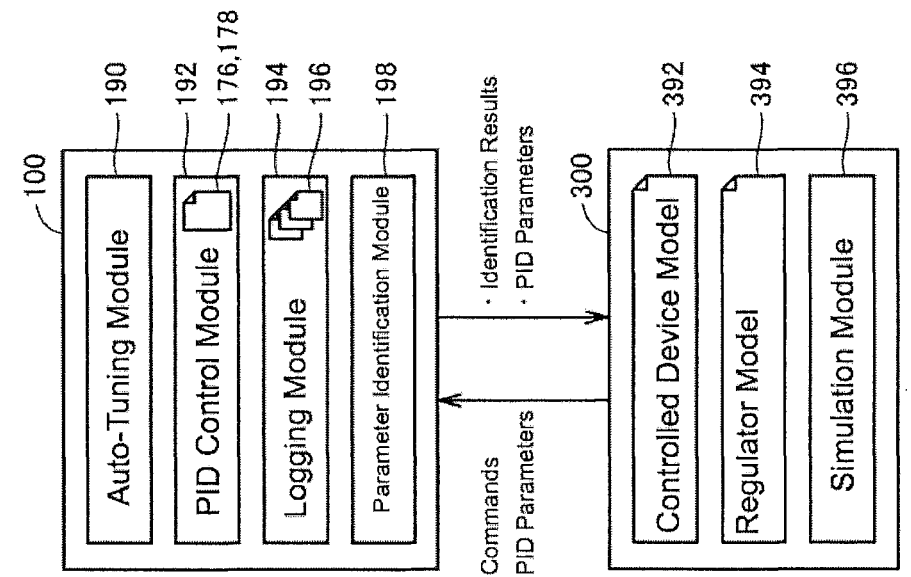
FIGS. 36A and 36B include schematic diagrams illustrating example functional configurations of systems composed of a regulator and an information processing device according to one or more embodiments of the present invention.
Figure 36A:
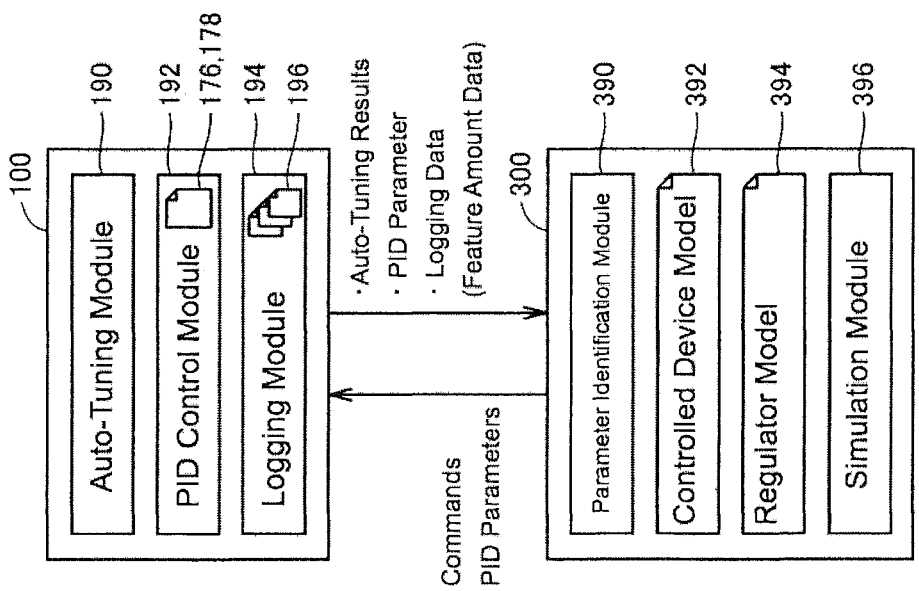

The configuration of a system made up of the regulator 100 and the information processing device 300 is described first. FIGS. 36A and 36B include schematic diagrams illustrating example functional configurations of systems composed of a regulator 100 and an information processing device 300 according to one or more embodiments of the present invention. The systems illustrated in FIGS. 36A and 36B control a real controlled device 270 containing a heating apparatus 210. The regulator 100 is equivalent to a controller that acquires process values from the real controlled device 270, and determines manipulated values for controlling the heating value of the heating apparatus 210 so that the aforementioned process value comes to match the setting value. The information processing device 300 can be connected to the controller, and is equivalent to a simulation unit that maintains a simulation model representing the real controlled device.

In the system configuration illustrated in FIG. 36A, the information processing device 300 executes auto-tuning by providing the regulator 100 with commands, acquires logging data obtained from running auto-tuning, determines the required parameters and build the controlled-device model 400.

In other words, the information processing device 300, functioning as the simulation unit, provides the regulator 100 acting as the controller with commands to thereby cause the regulator 100 to vary the manipulated values applied to the real controlled device 270 over time. The information processing device 300 also includes a means for acquiring the process-value time variance that occur in the real controlled device 270 from the controller, and a means for determining the parameters used in the controlled-device model 400 on the basis of the process-value time variance acquired from the controller.

Instead of, or in addition to the logging data (response) obtained from auto-tuning, the information processing device may also acquire feature data. For instance, the virtual settling value Scn at a cooling manipulated value MVcn during the n-th limit cycle, and the deadtime Lh, Lc may be included as feature data.

The information processing device 300 can also run a simulation using the controlled-device model 400 built. One example of such a simulation involves the information processing device 300 acquiring the PID parameters that were setup from the regulator 100, and assessing whether or not the aforementioned PID parameters that were acquired are suitable. Moreover, the information processing device 300 may also provide the regulator 100 with the PID parameters optimized through simulations using the controlled-device model 400.

In more concrete terms, the regulator 100 may include an auto-tuning module 190, a PID control module 192, and a logging module 194 for the aforementioned purpose. The auto-tuning module 190 implements the above described auto-tuning. The PID control module 192 uses the respective PID parameters 176, 178 to implement PID control. The logging module 194 collects various kinds of data (response data 196) periodically or per event during auto-tuning and/or during normal PID control.

On the other hand, the information processing device 300 includes a parameter identification module 390, and a simulation module 396 to serve these purposes. The parameter identification module 390 provides the regulator 100 with the commands used to run auto-tuning, and determines the parameters required by the controlled-device model 400 from the logging data obtained from executing auto-tuning. The controlled-device model 392 is built from the parameters determined. The details on the processing in the parameter identification module 390 are described above and are not repeated here.

The simulation module 396 runs a simulation with the controlled-device model 392 that is built. At this point, the simulation module 396 may acquire the PID parameters setup in the regulator 100 and build a regulator model 394.

The regulator 100 is also provided with a parameter identification module 198 in the system configuration illustrated in FIG. 36B to determine the parameters required for the controlled-device model. The primary function of the parameter identification module 198 is identical to that of the parameter identification module 390 illustrated in FIG. 36A.

When some kind of criteria is satisfied in the system, the regulator 100 runs auto-tuning, and determines the parameters in the controlled-device model from the logging data obtained from running auto-tuning. The information processing device 300 acquires the parameters in the controlled-device model from the regulator 100 and then builds the controlled-device model. The information processing device 300 can also run a simulation using the controlled-device model 400 built.

Although the modules used to determined the required parameters of the controlled-device model differ between the system illustrated in FIG. 36A and FIG. 36B, identical functions are installed in the overall systems. In this manner the various respective functions may be installed as appropriate in the regulator 100, the information processing device 300, and other components not shown. While the type of installation may be optimized as appropriate depending on the user's requirements or the device specifications, both of the configurations do not deviate from the spirit of the present invention.

For the sake of convenience, the functions, configuration, and the like is described while focusing on the system configuration illustrated in FIG. 36A; however, as above mentioned the modules and the like that primarily execute these functions may be modified as appropriate.

g2: Control Configuration in the Regulator 100

Figure 37:
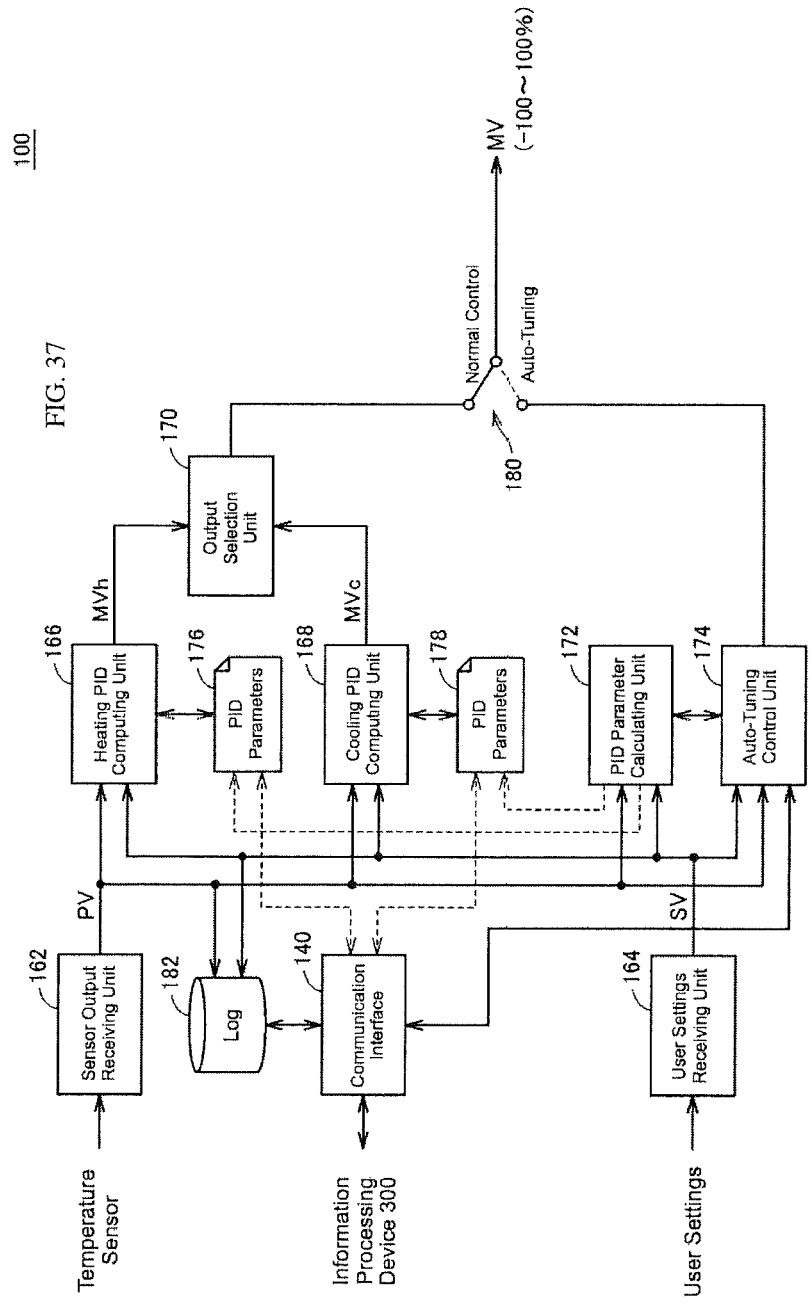
FIG. 37 is a schematic diagram of a control configuration of a regulator according to one or more embodiments of the present invention.

A control configuration in the regulator 100 according to one or more embodiments of the present invention is described next. FIG. 37 is a schematic diagram of a control configuration of a regulator 100 according to one or more embodiments of the present invention.

Referring to FIG. 37, in addition to the communication interface 140, the regulator 100 includes a sensor output receiving unit 162, a user settings receiving unit 164, a heating PID computing unit 166, a cooling PID computing unit 168, an output selection unit 170, a PID parameter calculating unit 172, an auto-tuning control unit 174, a switch 180, and a log collection unit 182 which function as the control configuration.

The sensor output receiving unit 162 accepts output signals (temperature PV) from the temperature sensor 240, and in addition to adjusting the temperature PV to a prescribed range and the like, outputs the temperature PV of the controlled device. The user settings receiving unit 164 accepts input of a temperature setting value SV in accordance with a user's command. Note that, the temperature setting value SV may be input from an external device such as a Programmable Logic Controller (PLC), or the like.

The heating PID computing unit 166 and the cooling PID computing unit 168 are the components that carry out normal PID control. These computing units calculate the manipulated values MVh and MVc respectively from the temperature PV of the controlled device and the temperature setting value SV in accordance with the PID parameters 176 and 178 respectively. A user may enter the PID parameters 176 and 178 directly; alternatively, the PID parameter calculating unit 172 (later described) may optimize the PID parameters 176 and 178 after auto-tuning. Moreover, as described above the PID parameters may be set by the information processing device 300 via the communication interface 140.

The output selection unit 170 switches the output of the manipulated values MVh and MVc output from the heating PID computing unit 166 and the cooling PID computing unit 168 respectively depending on the situation. For instance, in the feedback control system 1 illustrated in FIG. 3 there is no need for both the heating PID computing unit 166 and the cooling PID computing unit 168 to be active; therefore instead of directly switching the output of the manipulated value, the feedback control system 1 may be configured so that only one of the heating PID computing unit 166 and the cooling PID computing unit 168 is made selectively active.

The PID parameter calculating unit 172 and the auto-tuning control unit 174 carry out auto-tuning. The auto-tuning control unit 174 generates the manipulated values (manipulated values MVh and MVc) that generate the kind of limit cycles above described. The PID parameter calculating unit 172 determines the PID parameters 176 and 178 on the basis of the heating characteristic and the cooling characteristic (response) measured during the final limit cycle.

The switch 180 switches the output source of the manipulated value used during normal control and use of an auto-tuning is run. That is, the manipulated values output from the output selection unit 170 are sent to the controlled-device process 200 during normal control, and the manipulated values output from the auto-tuning control unit 174 are sent to the controlled-device process 200 during auto-tuning.

During auto-tuning and/or during normal PID control, the log collection unit 182 stores output signals (temperature PV) from the temperature sensor 240 or information on manipulated values, such as response data 196, from the regulator 100 chronologically. The response data collected by the log collection unit 182 is sent to the information processing device 300 by the communication interface 140.

The auto-tuning module 190 illustrated in FIG. 36A is largely equivalent to the PID parameter calculating unit 172 and the auto-tuning control unit 174, and the logging module 194 is equivalent to log collection unit 182.

g3: Simulation Module

A simulation module according to one or more embodiments of the present invention is described next. Although typically the simulation module may be installed in the information processing device (the simulation module 396 in FIG. 36), the module may be installed in the regulator 100, or moreover, may be installed in a main controller (e.g., as a cloud service over a network).

Figure 38:
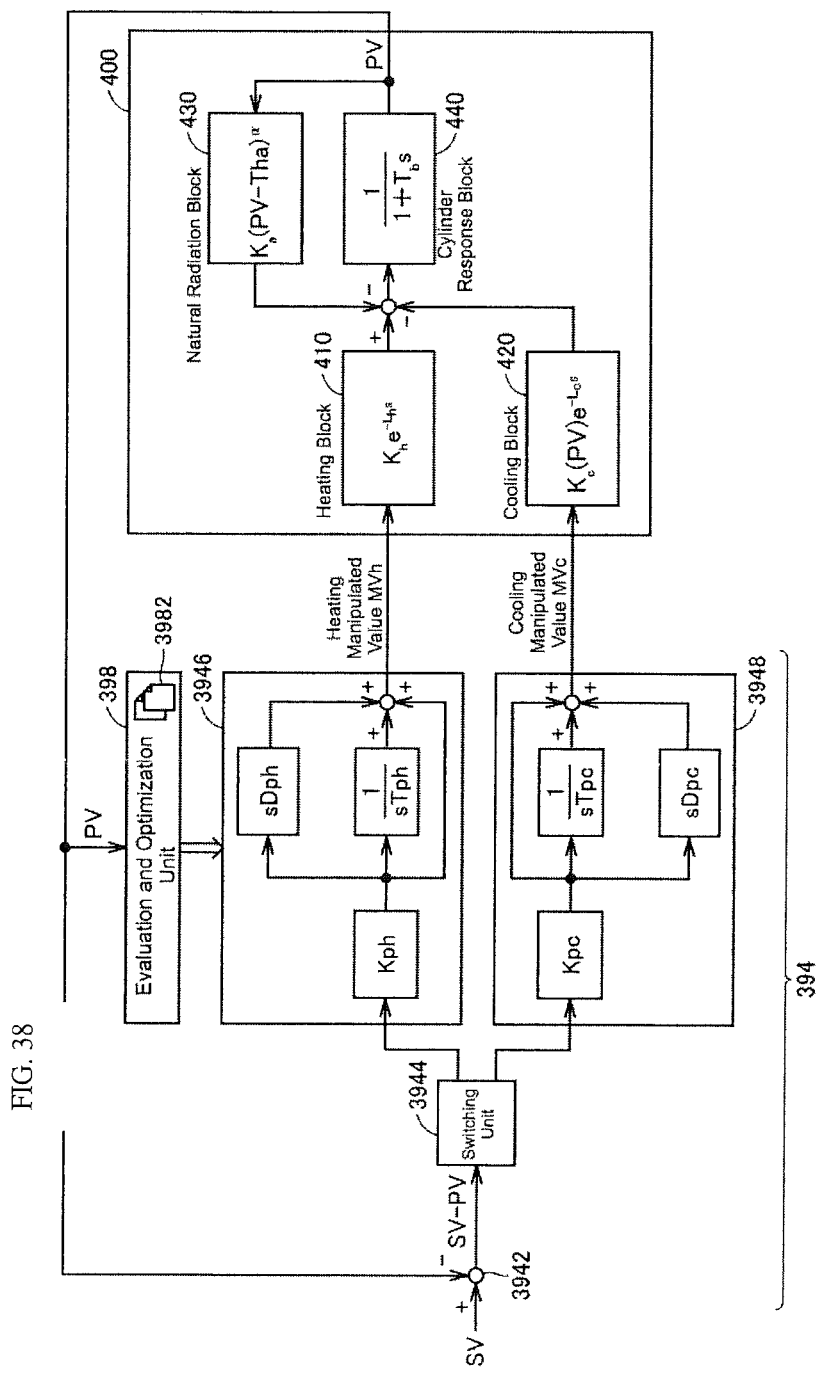
FIG. 38 is a schematic diagram representing an example simulation executed by a simulation module according to one or more embodiments of the present invention.

FIG. 38 is a schematic diagram representing an example simulation executed by a simulation module according to one or more embodiments of the present invention. FIG. 38 illustrates an example of simulating the regulator 100 controlling the controlled-device process 200. That is, a regulator model 394 representing the properties of the regulator 100 is coordinated with a controlled-device model 400 representing the characteristics of the controlled-device process 200. An evaluation and optimization unit 398 is also provided primarily to control the running of the simulation.

The regulator model 394 thus includes a subtractor 3942, a converter 3944, a heating PID model 3946, and a cooling PID model 3948. The subtractor 3942 outputs the difference between the temperature setting value SV and the temperature PV output from the controlled-device model 400. The heating PID model 3946 and the cooling PID model 3948 simulate the heating PID computing unit 166 (FIG. 37) and the cooling PID computing unit 168 (FIG. 37) respectively.

The heating PID model 3946 and the cooling PID model 3948 may be configured on the basis of the PID parameters 176 and 178 (FIG. 37) determined by the regulator 100. Alternatively, the evaluation and optimization unit 398 may set the PID parameters.

The controlled-device model 400 includes a heating block 410, a cooling block 420, a natural radiation block 430, and a cylinder response block 440. The parameters in each of the blocks may be determined according to the above-described kind of procedures.

Manipulated values from one of the heating PID model 3946 and the cooling PID model 3948 may be provided to the controlled-device model 400. An output value from the controlled-device model 400 is calculated on the basis of the manipulated value provided thereto, and the output value returned to the regulator module 394 as a temperature PV. The manipulated values are consecutively calculated in the regulator module 394 on the basis of the temperature setting value SV and the temperature PV entered. Mutually mapping the inputs and outputs between the regulator model 394 and the controlled-device model 400 in this manner thereby allows consecutive computations over a prescribed time period to be used to calculate the time-related characteristics of the regulator module 394 and the controlled-device model 400.

In this manner, the computer such as an information processing device 300 creates a controlled-device model 400 representing a real controlled device where a first manipulated value (heating manipulated value) is an input and a process value for the real controlled device 270 is an output; and the computer acquires a first time-related characteristic (heating manipulated value and/or cooling manipulated value) as input to the controlled-device model 400, and calculates a second time-related characteristic from the output from the controlled-device model with respect to the input of the first time-related characteristic.

The evaluation and optimization unit 398 measures the transient response of the temperature PV output from the controlled-device model and the like, and evaluates the control characteristics of the regulator model 394 (i.e., the control characteristics from the PID parameters established therein). The parameters used in this kind of evaluation may be for example the overshoots, the undershoot, a convergence time, or whether or not ringing was present. The evaluation and optimization unit 398 may also retain a plurality of parameter sets 3982 in advance. The evaluation and optimization unit 398 may select one parameter set from the plurality of parameter sets therein as the parameters in the heating PID model 3946 and the cooling PID model 3948, and then run a simulation to thereby evaluate each of the aforementioned parameter sets.

In other words, the information processing device 300 functioning as the simulation unit includes a means for acquiring control parameters (ND parameters) for determining the manipulated values from the regulator 100 acting as the control unit; building a regulator model 394 representing the behavior of the regulator on the basis of the control parameters acquired from the regulator 100; and simulating the control characteristics of the regulator 100 in relation to the real controlled device 230 by coordinating the regulator model with the controlled-device model.

The information processing device 300 acting as a simulation unit may also include a means for evaluating the control characteristics of regulator models 394 in relation to a real controlled device 270 through coordinating a regulator model 394 representing the behavior of the regulator 100 and the controlled-device model 400 to run a simulation thereof. The information processing device 300 acting as a simulation unit may further include a means for transmitting the optimized control parameters to the control means.

The cooling block 420 illustrated in FIG. 38 includes a cooling gain Kc(PV) that is dependent on the temperature PV. Thus, a cooling gain is determined for every cycle (step)

of the simulation. The following procedure for determining the cooling gain dynamically is uu explained below.

Figure 39A:
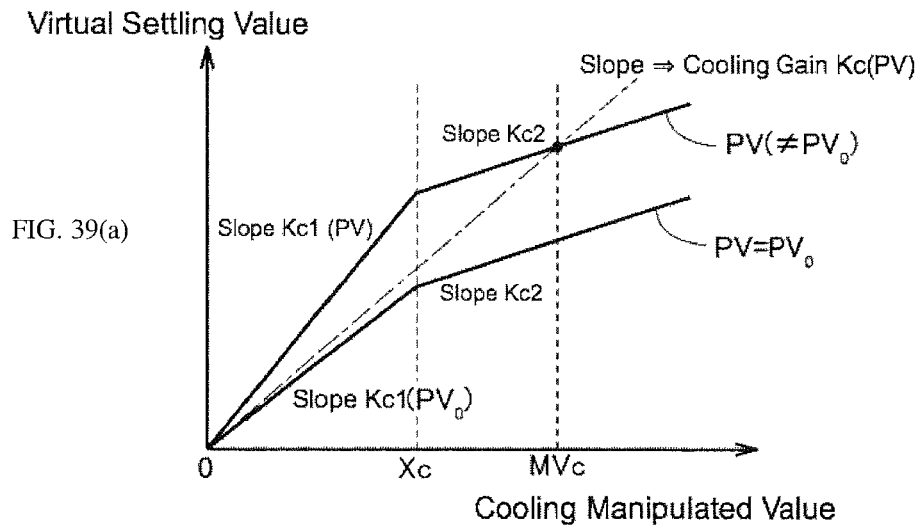
FIGS. 39A and 39B include diagrams for explaining processes for determining a cooling gain during a simulation according to one or more embodiments of the present invention.
Figure 39B:
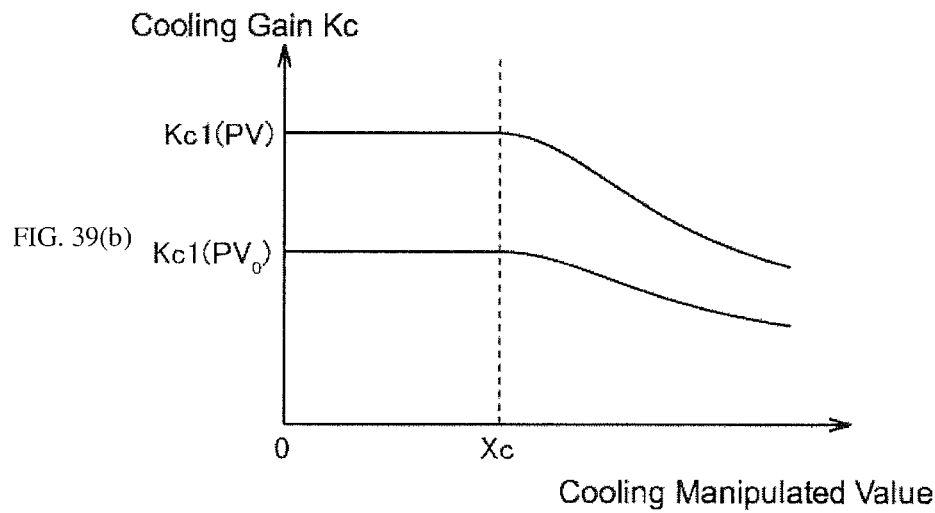

FIGS. 39A and 39B includes diagrams for explaining processes for determining a cooling gain during a simulation according to one or more embodiments of the present invention. FIG. 39A illustrates a process for determining the cooling characteristics dynamically (i.e., the virtual settling value in relation to the cooling manipulated value); and FIG. 39B illustrates a process for determining the cooling gain from the cooling characteristics illustrated in FIG. 39A.

A cooling characteristic that defines the relationship between the manipulated value and the virtual settling value (i.e., the cooling capacity) are determined as illustrated in FIG. 39A for each cycle. A cooling gain is then determined in accordance with the process value output in the cycle immediately prior thereto. As above described, the cooling characteristic according to one or more embodiments of the present invention includes a first cooling characteristic, i.e., slope Kc1(PV) in a region where the manipulated value is closer to zero than the nonlinear point Xc; and a second cooling characteristic, i.e., slope Kc2(PV) in the remaining region.

The process of determining the cooling characteristic includes shifting the approximation line (slope Kc2), which is the cooling characteristic for a reference temperature PV0, toward the cooling capacity in accordance with a difference between the process value (temperature PV) output immediately prior thereto (the previous cycle) and a reference process value (reference temperature PV0). At this point slope Kc2 is kept at the same value. Next, the first cooling characteristic is determined so that the first cooling characteristic is connected to the shifted second cooling characteristic at the nonlinear point Xc. In other words, the slope Kc1(PV) is determined so that the slope Kc1 (PV) connects at the nonlinear point Xc.

Finally the slope of a straight line connecting a point on the cooling characteristic corresponding to the previous cooling manipulated value (the value currently being output) and the origin (i.e., the dot-dash line in FIG. 39A) is selected as the cooling gain Kc(PV). An amount output by the cooling block 420 is then calculated using the cooling gain Kc(PV) selected.

The cooling characteristic in FIG. 39A is calculated according to the above Formulas (6) to (9). The cooling gain Kc(PV) can thus be determined even when the cooling characteristic is not actually shifted in relation to a reference temperature PV0, and such a method of determination also falls within the scope of the present invention.

The cooling gain Kc(PV) for a given temperature PV changes as illustrated in FIG. 39B depending on the cooling manipulated value MVc. That is, the cooling gain Kc(PV) may be considered constant while the cooling manipulated value MVc has not reached nonlinear point Xc; however, the cooling gain Kc(PV) gradually decreases once the cooling manipulated value MVc passes the nonlinear point Xc.

Thus a more suitable cooling gain Kc(PV) may be gradually determined at each simulation cycle using this kind of process.

Figure 40:
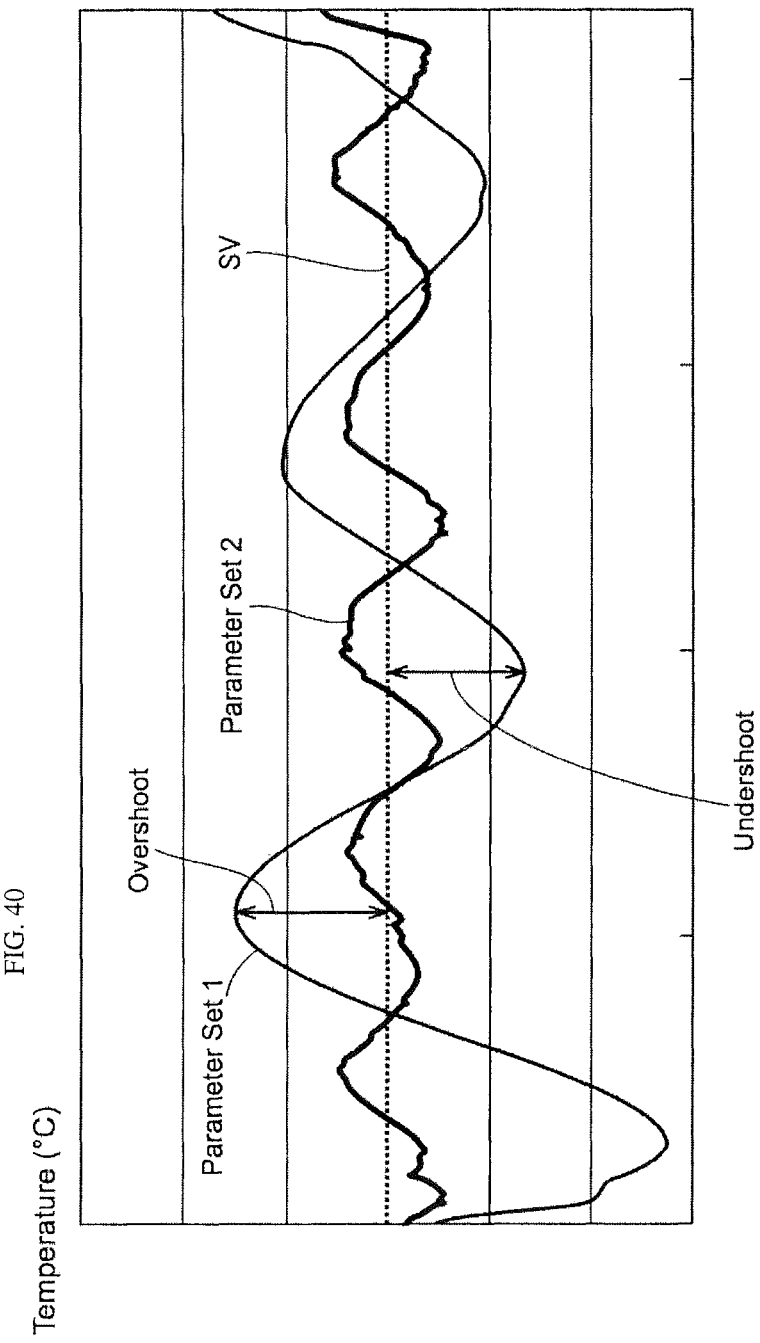
FIG. 40 illustrates an example of the results of a simulation according to one or more embodiments of the present invention.

FIG. 40 illustrates an example of the results of a simulation according to one or more embodiments of the present invention. FIGS. 41A and 41B are diagrams for explaining the process of using a simulation for optimizing PID parameters according to one or more embodiments of the present invention.

In FIG. 40, two parameter sets are used to build respective regulator models 394; the diagram provides a plot of the responses obtained when the controlled-device model 400 is controlled using each of the regulator models 394. In the example simulation the overshoot in the response when using parameter set 1 is comparatively large compared to the overshoot when using parameter set 2. Therefore, parameter set 2 may be assessed as the more suitable parameter set from the example illustrated in FIG. 40.

As illustrated in FIG. 41A, the evaluation and optimization unit 398 maintains a plurality of parameter sets 3982, and evaluates the control performance of the regulator 100 when the regulator 100 is configured according to each of the parameter sets. FIG. 41B illustrates one example of the results obtained when evaluating the parameter sets. The overshoot and the undershoot are each calculated in the evaluation results. Within the evaluation results, the overshoot and the undershoot in parameters set 4 is relatively small compared to the other parameter sets, and therefore the evaluation and optimization unit 398 assesses the parameter set 4 to be optimal and selects the parameters therein as the PID parameters.

g4: Possible Derivations in the description above, the example provided used a controlled-device model containing a heating block 410 corresponding to a heating apparatus 210. However, a controlled device model that excludes the heating block 410 but includes a cooling block 420 corresponding to a cooling apparatus 220 may be used. For instance, consider a case where the process being controlled includes a heating reaction, or a process and the like where the heating apparatus 210 is unnecessary.

in this case, the system will simulate the characteristics of the real controlled device containing a cooling apparatus 220 where the cooling value changes in accordance with the manipulated value. Here, for a controlled-device model representing a real controlled device where a manipulated value is input and a process value for the real controlled device is output, a second manipulated value is calculated as the output of the controlled-device model on input of a first manipulated value (cooling manipulated value).

Further, the parameters (such as the gain in the cooling block 420) is this kind of controlled-device model is also determined from a process-value time variance generated in the real controlled device by varying the manipulated value over time. The parameters for such a controlled-device model may be determined using the above-described techniques.

H. MODIFICATION EXAMPLES

In the above description a parameter in the controlled-device model 400 is identified on the basis of a response obtained from the regulator 100 supplying a manipulated value. Instead a manipulated value output from the regulator 100, a computer program including the same operations as the regulator 100 (for instance, a program simulating the regulator 100) may compute and supply the manipulated value. Alternatively, a predetermined pattern, such as stepped input may be supplied as a manipulated value. Moreover, a time curve created by the user may be supplied as a manipulated value.

A time curve used as a manipulated value in such a manner can be of any form so long as the time curve is suited for identifying a parameter in the controlled-device model 400. For instance, a time curve may change the temperature setting value gradually or in a substantially discrete manner. More specifically for instance, the manipulated value output from the regulator 100 and supplied to the system may be such that for the first 10 minutes the temperature setting is 100° C., and the temperature setting is changed to 400° C. for the next 10 minutes.

I. ADVANTAGES

A controlled-device model according to one or more embodiments of the present invention is configured from blocks; the natural radiation block 430 is treated independently, and thus the amount of natural radiation may be more suitably reproduced (estimated). Hereby, highly accurate simulations may be performed across broad temperature ranges.

The controlled-device model also defines the cooling capacity (based on the main cooling phenomenon) before and after a nonlinear point as different approximation lines and uses these two approximation lines to define the cooling characteristic. Moreover, the cooling characteristic may be expressed over a broad temperature range by using the linearity between the cylinder temperature and the cooling capacity.

A simulation using the controlled-device model according to one or more embodiments of the present invention facilitates various kinds of verification. For instance, the response characteristic resulting from changes to design values (as an example, changing the heat output of the electrical heater 214) can be evaluated in advance.

A simulation using the controlled-device model according to one or more embodiments of the present invention facilitates more efficient design. For instance, when the PID parameters determined from auto-tuning indicate an unsatisfactory control performance, theoretical simulations of the controlled-device model according to one or more embodiments of the present invention may be run to make minute adjustments to the parameters. Thereby, the generation of defects and the like may be prevented due to unsatisfactory control performance.

Temperature control models with relatively long response times are traditionally built using deadtime, a time constant, and a normal gain. However, given that these conventional models only simplify the characteristics being represented using low-order delay and deadtime, the criteria capable of supporting, for instance, changes to the normal gain depending on the temperature of the control object, or supporting verification of the response through simulation are limited. In contrast, a controlled-device model according to one or more embodiments of the present invention supposed simulating the characteristics of a device or process over a broad temperature range using a single model.

That is, the controlled-device model according to one or more embodiments of the present invention adds a radiation model that depends on the difference with the ambient temperature, and is capable of selecting a heating and a cooling gain for the controlled device, as well as a system time constant, and a deadtime as constants over a range of applicable temperatures. In addition, when the cooling medium is a liquid that evaporates, the controlled-device model adopts a cooling model capable of expressing the nonlinearity of the heat of vaporization. In this manner the controlled-device model renders it unnecessary to change to the normal gain for heating and cooling due to temperature changes by providing a built-in natural radiation component.

The embodiments disclosed above should be considered merely examples and not limitations as such. The scope of the present invention is not limited to the above description but to the scope of the claims, and is intended to include all equivalents and modifications allowable by the scope of the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE NUMERALS

1 Feedback control system
100 Regulator
110 Control unit
112 CPU
114 ROM
116 RAM
118 Program module
120, 308 Input unit
130 Output unit
132 Heating signal output unit
134 Cooling signal output unit
140, 310 Communication interface
150 Display unit
162 Sensor output receiver
164 User settings receiver
166 Heating PID computing unit
168 Cooling PID computing unit
170 Output selection unit
172 PID parameter computing unit
174 Auto-tuning controller
176 PID parameter
180 Switch
182 Logging unit
190 Auto-tuning module
192 Control module
194 Logging module
196 Response data
198, 390 Parameter identification module
200, 200A, 200, 200A Controlled-device process
210 Heating apparatus
212 Solid State Relay
214 Electric heater
220 Cooling apparatus
222 Cooling tube
224 Magnetic valve
226 Water temperature regulating equipment
230 Real controlled device
232 Extrusion Molder
234 Screw
236 Cylinder
238 Motor
240 Temperature sensor
242 Shaft
244 Hopper
300 Information processing device
302 Processor
304 Memory
306 Display
312 Bus
320 Hard drive
322 Device model building program
324 Simulation program
392, 400 Controlled-device model
394 Regulator model 396 Simulation module
398 Optimization unit
410 Heating block
420 Cooling block
430 Natural radiation block
440 Cylinder response block
3942 Subtractor
3944 Converter
3946 Heating PID model
3948 Cooling PID model

The invention claimed is:

1. A simulation method run on a computer simulating the characteristics of a real controlled device including a heating apparatus that changes a heating value in accordance with a first manipulated value, the simulation method comprising:
   creating, by the computer, a controlled-device model representing the real controlled device where a first manipulated value is an input and a process temperature value for the real controlled device is an output;
   acquiring, by the computer, a first time-related characteristic as input to the controlled-device model;
   calculating, by the computer, a second time-related characteristic from the output from the controlled device model with respect to the input of the first time-related characteristic; and
   calculating, by the computer, a radiation value,
   wherein the real controlled device further comprises a cooling apparatus that changes a cooling value in accordance with a second manipulated value, the cooling apparatus being an actuator separate from the heating apparatus,
   wherein the controlled-device model comprises:
      a heating component corresponding to the heating apparatus for increasing the process temperature value in accordance with the size of a first manipulated value,
      a radiation component corresponding to the natural thermal radiation occurring in the real controlled device for decreasing the process temperature value in accordance with the size of the process temperature value, and
      a cooling component corresponding to the cooling apparatus for reducing the process temperature value in accordance with the size of the second manipulated value,
   wherein the radiation component determines an amount to decrease the process temperature value in accordance with a difference between the ambient temperature of the real controlled device and the temperature of the real controlled device,
   wherein the radiation component further comprises an exponent, and
   wherein the radiation value is proportional to the difference, to the power of the exponent, between the ambient temperature of the real controlled device and the temperature of the real controlled device.

2. The simulation method according to claim 1,
   wherein the controlled-device model further comprises a heat capacity component corresponding to the heat capacity of the real controlled device,
   wherein the heat capacity component outputs the process temperature value on receiving an output from the heating component and an output from the radiation component.

3. The simulation method according to claim 2,
   wherein the heating component comprise a first gain representing a relationship between the first manipulated value and the amount used to increase the process temperature value,
   wherein the radiation component comprises a second gain representing a relationship between the difference between the temperature of the real controlled device and the ambient temperature of the real controlled device, and the amount reducing the process temperature value,
   wherein the heat capacity component comprises a time constant representing the heat capacity of the real controlled device, and
   wherein the simulation method further comprises:
      varying the first manipulated value over time to acquire a process-value time variance that occurs in the real controlled device; and
      determining the first and second gains, the exponent, and the time constant on the basis of the process-value time variance.

4. The simulation method according to claim 3, wherein the process-value time variance is acquired by varying the first manipulated value over time in accordance with a limit cycle method or step response method.

5. The simulation method according to claim 3, wherein, when determining the first and second gains, the exponent, and the time constant, the time constant is determined on the basis of the amount of process-value time variance that occurs during a period the first manipulated value is kept at a fixed value.

6. The simulation method according to claim 3, further comprising:
   when determining the first and second gains, the exponent, and the time constant:
      acquiring a plurality of amounts of process-value time variance during the period the first manipulated value is kept at a fixed value with different forms of the process temperature value; and
      determining the first gain by estimating a relationship between the plurality of acquired amounts of process-value time variance, and the difference between the ambient temperature of the real controlled device and the temperature of the real controlled device.

7. The simulation method according to claim 3, further comprising:
   when determining the first and second gains, the exponent, and the time constant:
      calculating a normal gain for different temperature setting values on the basis of the difference between the process temperature value for a temperature setting value and the ambient temperature of the real controlled device, and a settling manipulated value for the corresponding temperature setting value; and
      determining the first gain by estimating a relationship between the normal gains computed for the different temperature setting values, and the difference between the process temperature value for a corresponding temperature setting value and the ambient temperature of the real controlled device.

8. The simulation method according to claim 3,
   wherein the heating component comprises a first deadtime occurring between the first manipulated value and the amount increasing the process temperature value; and
   wherein the simulation method further comprises, when determining the first and second gains, the exponent, and the time constant determining the first deadtime on the basis of a timing at which the first manipulated value changed, and the timing at which the behavior of the process temperature value changed.

9. The simulation method according to claim 3,
wherein the heating component comprises a first deadtime occurring between the first manipulated value and the amount increasing the process temperature value; and
wherein the simulation method further comprises, when determining the first and second gains, the exponent, and the time constant, determining the first deadtime on the basis of the behavior of the process temperature value occurring after the first manipulated value is input to the real controlled device.

10. The simulation method according to claim 3, further comprising:
when determining the first and second gains, the exponent, and the time constant:
calculating a normal gain for different temperature setting values on the basis of the difference between the process temperature value for a temperature setting value and the ambient temperature of the real controlled device, and the first manipulated value;
calculating a settling manipulated value for different temperature setting values on the basis of the normal gains calculated for different temperature setting values, and the difference between a corresponding ambient temperature for the real controlled device and the temperature of the real controlled device;
calculating the radiation value for different temperature setting values on the basis of the difference between the process temperature value for a temperature setting value and the ambient temperature of the real controlled device, and the corresponding settling manipulated value; and
determining the second gain and the exponent by estimating the relationship between the difference between the temperature of the real controlled device and the ambient temperature of the real controlled device, and the radiation value calculated for different temperature setting values.

11. The simulation method according to claim 3, further comprising:
when determining the first and second gains, the exponent, and the time constant:
calculating a normal gain for different temperature setting values on the basis of the difference between the process temperature value for a temperature setting value and the ambient temperature of the real controlled device, and the first manipulated value;
calculating a settling manipulated value for different temperature setting values on the basis of normal gains calculated for different temperature setting values, and the difference between the process temperature value of a temperature setting value and the ambient temperature of a real controlled device;
calculating the radiation value for different temperature setting values on the basis of the difference between the first gain and the normal gains calculated for different temperature setting values, and settling manipulated values calculated for different temperature setting values; and
determining the second gain and the exponent by estimating the relationship between the difference between the temperature of the real controlled device and the ambient temperature of the real controlled device, and the radiation value calculated for different temperature setting values.

12. The simulation method according to claim 1,
wherein the cooling component comprises a third gain dependent on the second manipulated value;
wherein the simulation method further comprises, when determining the first and second gains, the exponent, and the time constant:
determining a nonlinear point representing the size of the second manipulated value that changes the characteristic of the amount decreasing the process temperature value, determining a first cooling characteristic in a region where the second manipulated value is closer to zero than the nonlinear point and determining a second cooling characteristic in the remaining region; and
determining the third gain on the basis of the first and second cooling characteristics.

13. The simulation method according to claim 12,
wherein the first and second cooling characteristics are defined as the relationship between the second manipulated value and a cooling capacity; and
wherein the simulation method further comprises, when determining the first and second gains, the exponent, and the time constant:
determining the first and second cooling characteristics in relation to the process temperature value for a temperature setting value,
varying the second manipulated value over time to calculate the slope of a process-value time variance in a process temperature value different from the temperature setting value on the basis of the process-value time variance that occurred in the real controlled device; and
shifting the second cooling characteristic for the temperature setting value toward the cooling capacity in accordance with a reference slope which is the slope of the process-value time variance when the process temperature value matches the temperature setting value and the slope of the process-value time variance in a process temperature value different from the temperature setting value to determine a second cooling characteristic for a process temperature value different from the temperature setting value.

14. The simulating method according to claim 13, wherein, when determining the first and second gains, the exponent, and the time constant, the first cooling characteristic for the process temperature value different from the temperature setting value is determined such that the first cooling characteristic connects to the second cooling characteristic for the process temperature value different from the temperature setting value at the nonlinear point.

15. A simulation method run on a computer simulating the characteristics of a real controlled device including a cooling apparatus that changes a cooling value in accordance with a first manipulated value, comprising:
creating a controlled-device model representing the real controlled device where a first manipulated value is an input and a process temperature value for the real controlled device is an output;
acquiring a first time-related characteristic as input to the controlled-device model; and
calculating a second time-related characteristic from the output from the controlled-device model with respect to the input of the first time-related characteristic,
wherein the real controlled device further comprises a cooling apparatus that changes a cooling value in accordance with a second manipulated value, the cooling apparatus being an actuator separate from the heating apparatus, wherein the controlled-device model comprises a gain representing a relationship between the first manipulated value and an amount decreasing the process temperature value, wherein the controlled-device model further comprises a cooling component corresponding to the cooling apparatus for reducing the process temperature value in accordance with the size of the second manipulated value, wherein the calculating the second time-related characteristic comprises:
  determining a cooling characteristic that defines a relationship between the first manipulated value and a cooling capacity; and
  determining the gain from the cooling characteristic in accordance with a process temperature value output immediately prior thereto, wherein the cooling characteristic comprises a first cooling characteristic in a region where the first manipulated value is closer to zero than a nonlinear point, and a second cooling characteristic in the remaining region, wherein the nonlinear point is a point of a largest change in a slope of a virtual settling value in relation to the second manipulated value, wherein the virtual settling value is indicative of the cooling capacity, and wherein the simulation method further comprises, when determining the cooling characteristic:
  shifting the second cooling characteristic for a reference process temperature value toward the cooling capacity in accordance with a difference between the process temperature value output immediately prior thereto and a reference process temperature value; and
  determining the first cooling characteristic so that the first cooling characteristic connects to the shifted second cooling characteristic at the nonlinear point.

* * * * *